(12) United States Patent
Senta et al.

(10) Patent No.: US 7,813,302 B2
(45) Date of Patent: Oct. 12, 2010

(54) DATA DISTRIBUTING METHOD, SYSTEM TRANSMITTING METHOD, AND PROGRAM

(75) Inventors: Yosuke Senta, Kawasaki (JP); Shinichi Sazawa, Kawasaki (JP); Yuichi Sato, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1445 days.

(21) Appl. No.: 11/043,122

(22) Filed: Jan. 27, 2005

(65) Prior Publication Data

US 2005/0195755 A1 Sep. 8, 2005

Related U.S. Application Data

(63) Continuation of application No. PCT/JP02/10026, filed on Sep. 27, 2002.

(51) Int. Cl.
*H04L 12/28* (2006.01)
(52) U.S. Cl. ..................................... 370/255
(58) Field of Classification Search ............... 370/255, 370/428, 216–220; 709/203, 205
See application file for complete search history.

(56) References Cited

U.S. PATENT DOCUMENTS

| | | | | |
|---|---|---|---|---|
| 6,163,678 | A * | 12/2000 | Murata | 455/12.1 |
| 6,347,090 | B1 | 2/2002 | Ooms et al. | |
| 2001/0022780 | A1 | 9/2001 | Mitzutani et al. | |
| 2002/0082035 | A1 | 6/2002 | Aihara et al. | |
| 2002/0147815 | A1* | 10/2002 | Tormasov et al. | 709/226 |
| 2004/0249888 | A1* | 12/2004 | Berkey et al. | 709/204 |
| 2005/0044147 | A1* | 2/2005 | Yap | 709/205 |

(Continued)

FOREIGN PATENT DOCUMENTS

EP 1063814 12/2000

(Continued)

OTHER PUBLICATIONS

Lee, S. et al., "A Performance Comparison Study of Ad Hoc Wireless Multicast Protocols", IEEE INFOCOM 2000, Mar. 29, 2000, pp. 565-574.

(Continued)

*Primary Examiner*—Ayaz R Sheikh
*Assistant Examiner*—Blanche Wong
(74) *Attorney, Agent, or Firm*—Staas & Halsey LLP

(57) ABSTRACT

When each of a plurality of peers mutually connected through a network receives connection of a new peer, each peer forms group information in which the new peer has been grouped on the basis of comparison of distances on the network among three peers of the own peer, a representative peer of an existing group, and the new peer. When the data is transmitted from the own peer, path information in which destination information of each group which has been grouped on the basis of the group information and the own peer have been registered is formed and transmitted together with the data to the representative peer of each group. When distribution information is relayed from another peer, if the own peer is included in the destination information, the reception data is fetched and the own peer is deleted, thereafter, distribution information in which the destination information of each group which has been grouped on the basis of the group information and the own peer have been registered is formed and transmitted together with the data to the representative peer of each group.

32 Claims, 57 Drawing Sheets

U.S. PATENT DOCUMENTS

| | | | |
|---|---|---|---|
| 2007/0083915 A1* | 4/2007 | Janakiraman et al. | 726/4 |
| 2007/0211651 A1* | 9/2007 | Ahmed et al. | 370/256 |
| 2007/0214249 A1* | 9/2007 | Ahmed et al. | 709/223 |
| 2007/0214250 A1* | 9/2007 | Ahmed et al. | 709/223 |
| 2007/0214259 A1* | 9/2007 | Ahmed et al. | 709/224 |
| 2007/0271508 A1* | 11/2007 | Audet | 715/530 |

FOREIGN PATENT DOCUMENTS

| | | |
|---|---|---|
| JP | 2001-036583 | 2/2001 |
| JP | 2001-36583 | 2/2001 |
| JP | 2001-285345 | 10/2001 |
| JP | 2001-285345 | 12/2001 |
| JP | 2002-44003 | 2/2002 |

OTHER PUBLICATIONS

Ohta, K. et al., "Group Communication Protocol for Community on Ad-Hoc Networks", Transactions of Information Processing Society of Japan, Jul. 15, 2001, vol. 42, No. 7, pp. 1801-1810.

Fujimoto, M. et al., "A Fundamental Experimental Evaluation of Hierarchical Routing in Ad Hoc Networks", The Institute of Electronics, Information and Communication Engineers Gijutsu Kenkyu Kokoku, IN2002-7, May 17, 2002, pp. 37-42.

Kurashima, A. et al., "A Mobile Groupware System "Nakayoshi" Supporting Local Area Collaboration", Transactions of Information Processing Society of Japen, May 15, 1999, vol. 40, No. 5, pp. 2487-2496.

* cited by examiner

| GROUP NAME | REPRESENTATIVE PEER | BELONGING PEER |
|---|---|---|
| G1 | P1 | P2, P3 |
| G2 | P4 | P5, P6, P7 |
| G3 | P8 | P9, P10 |

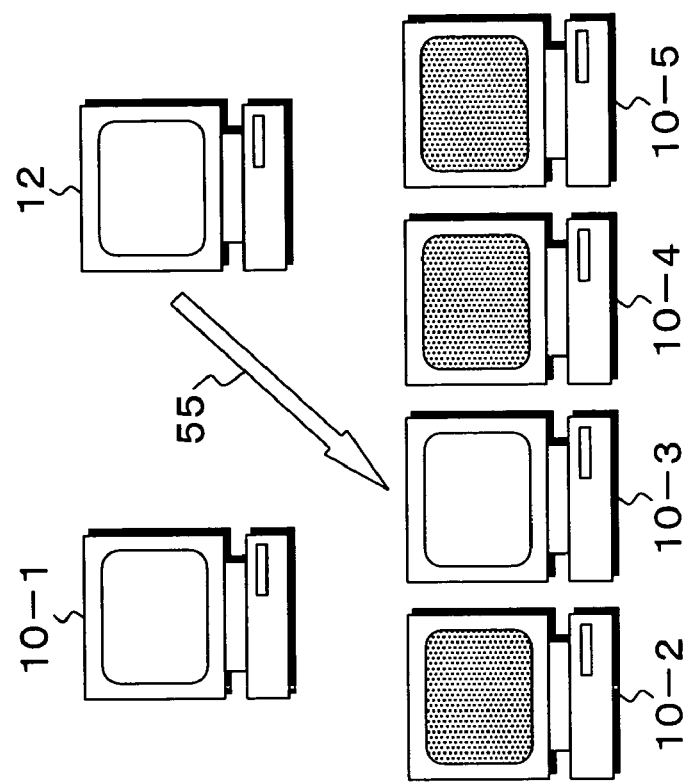
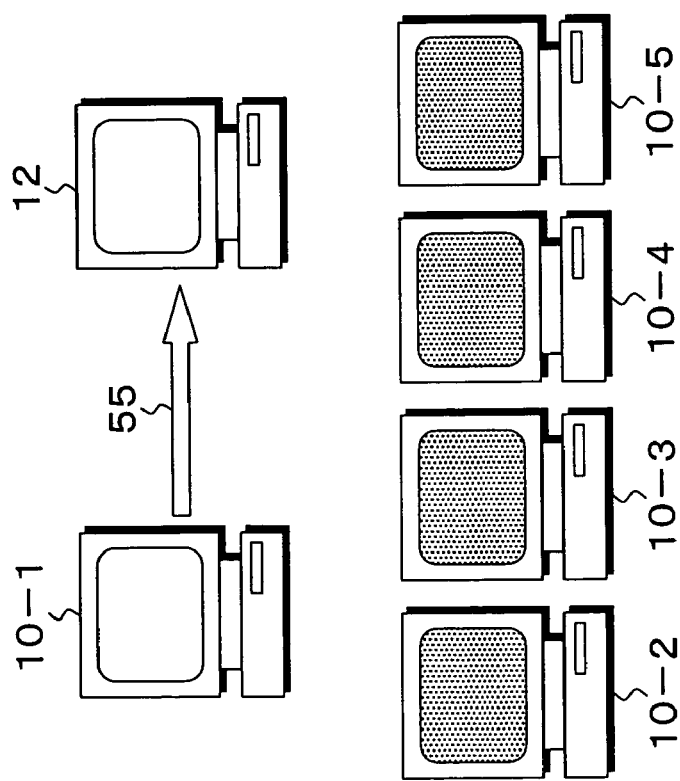

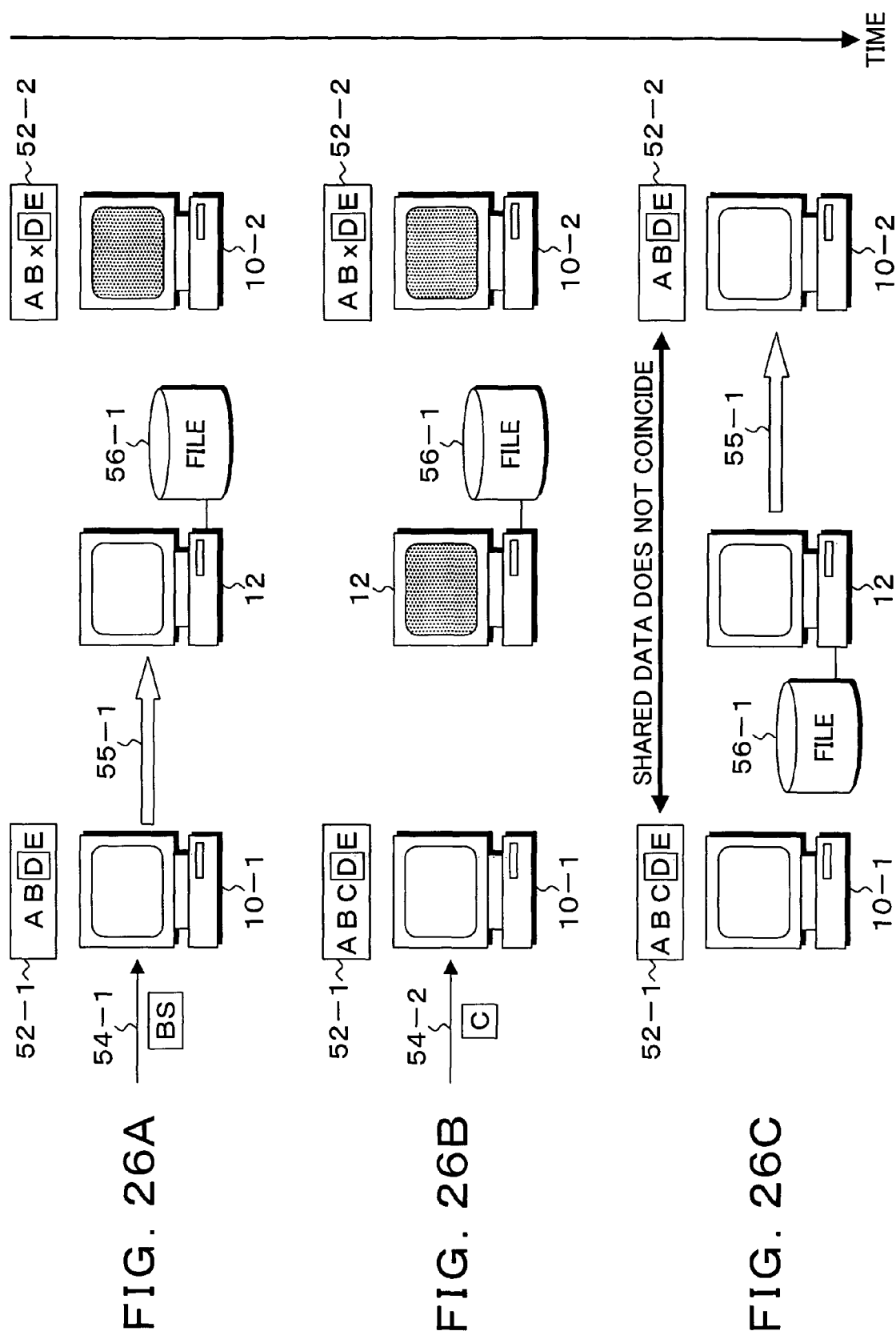

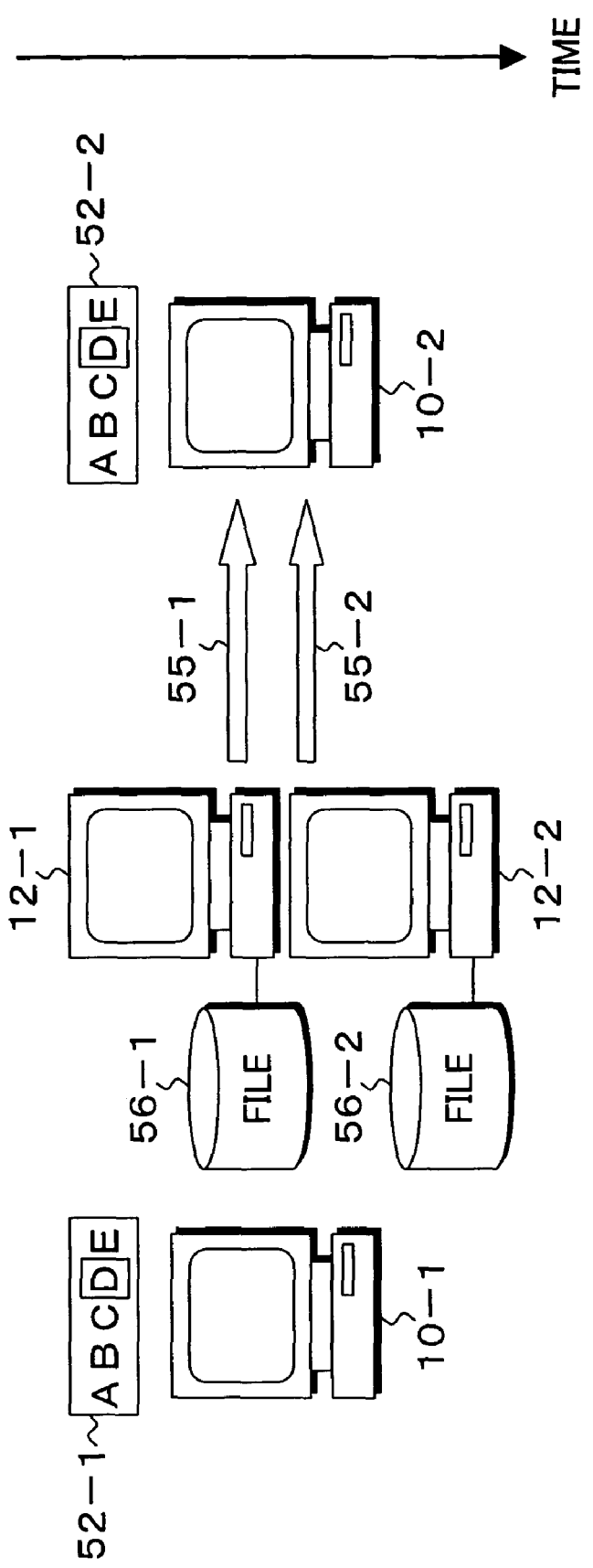

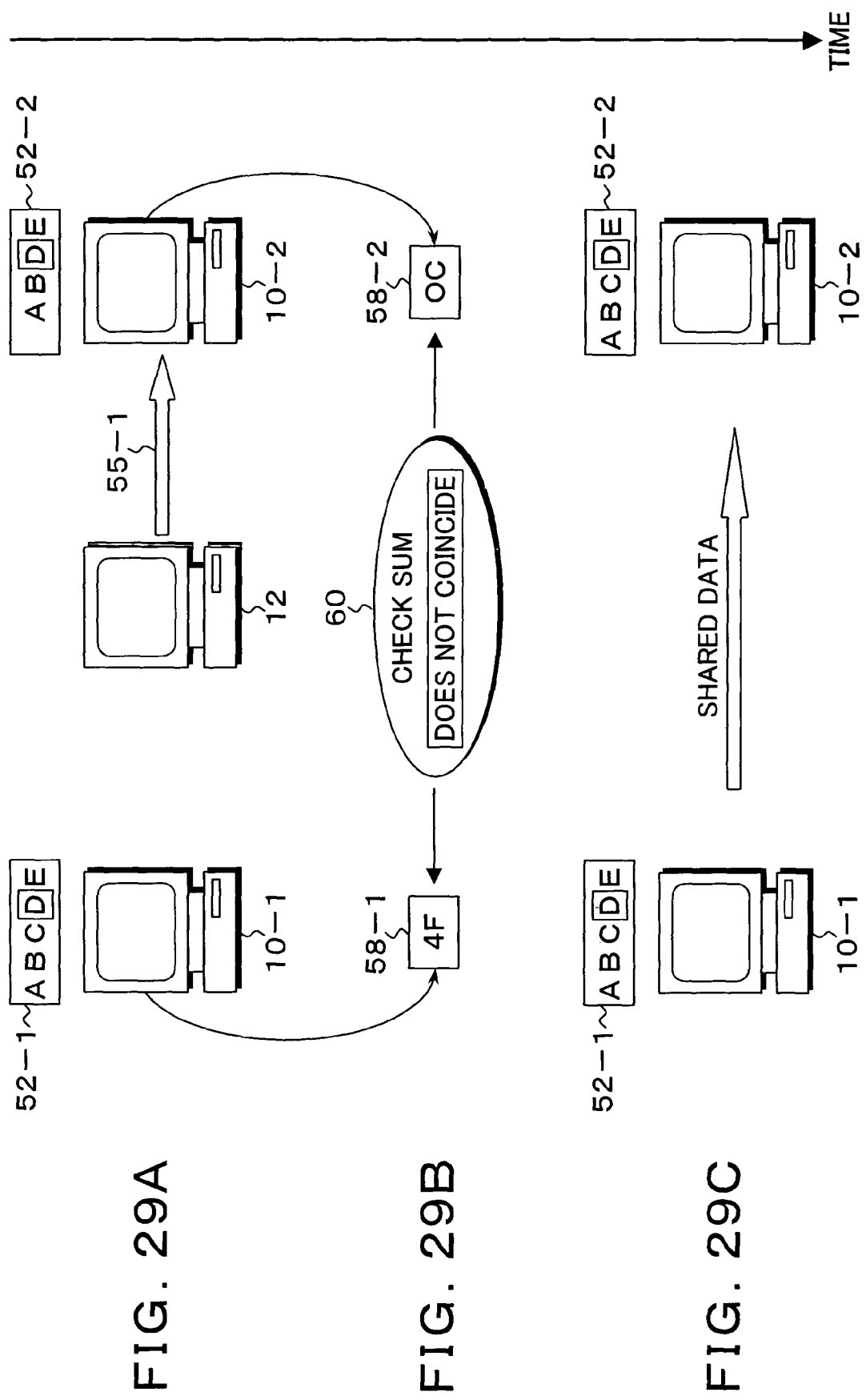

FIG. 41

|  | K | | | | | | | | p[0] | p[1] |
|---|---|---|---|---|---|---|---|---|---|---|
| R[0] | 1 | x | x | x | x | x | x | x | | |
| R[1] | 0 | 0 | x | x | x | x | x | x | | |
| R[2] | 0 | 0 | 1 | x | x | x | x | x | | |
| R[3] | 0 | 0 | 0 | 1 | x | x | x | x | | |
| R[4] | | | | | | | | | | |
| R[5] | | | | NOT RECEIVED | | | | | | |
| R[6] | | | | | | | | | | |
| R[7] | | | | | | | | | | | i ↓ l →

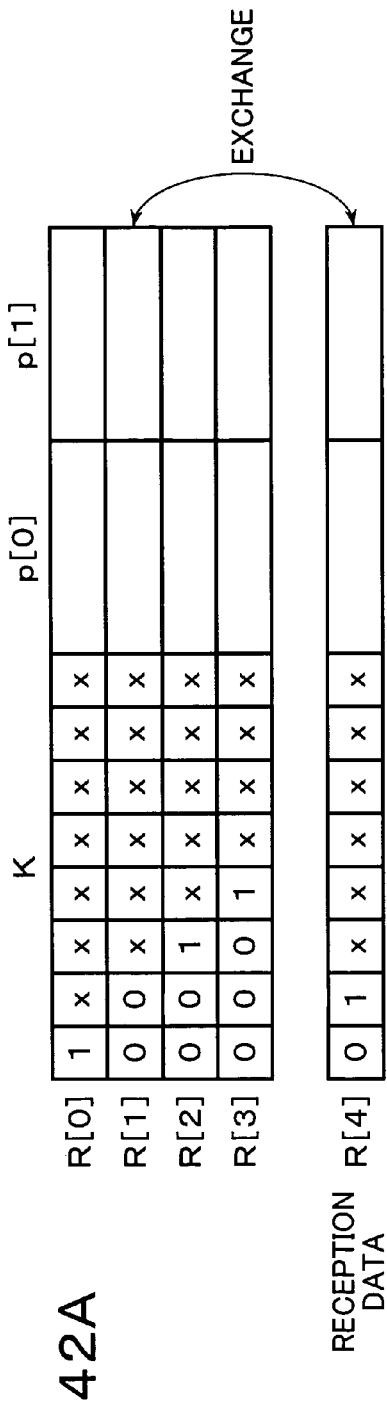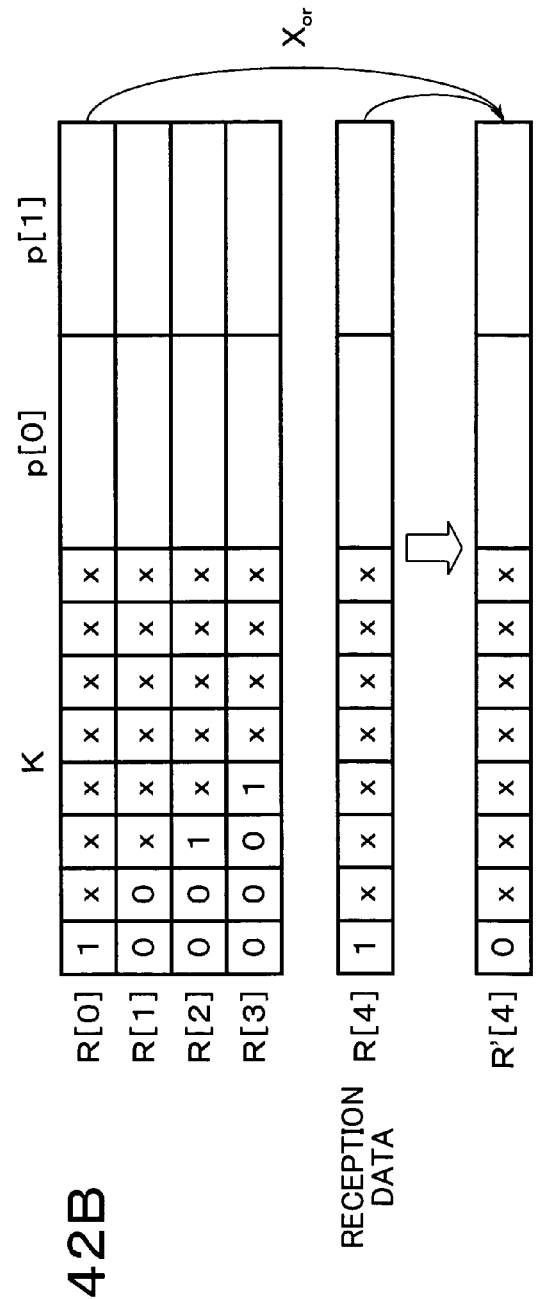

FIG. 43

|  | K | | | | | | | | p[0] | p[1] |
|---|---|---|---|---|---|---|---|---|---|---|
| R[0] | 1 | x | x | x | x | x | x | x | | |
| R[1] | 0 | 0 | x | x | x | x | x | x | | |
| R[2] | 0 | 0 | 1 | x | x | x | x | x | | |
| R[3] | 0 | 0 | 0 | 1 | x | x | x | x | | |
| R[4] | 0 | 0 | 0 | 0 | 1 | x | x | x | | |
| R[5] | 0 | 0 | 0 | 0 | 0 | 1 | x | x | | |
| R[6] | 0 | 0 | 0 | 0 | 0 | 0 | 1 | x | | |
| R[7] | 0 | 0 | 0 | 0 | 0 | 0 | 0 | 1 | | |

FIG. 44

|   | K |   |   |   |   |   |   | p[0] | p[1] |
|---|---|---|---|---|---|---|---|------|------|
| R[0] | 0 | 1 | 0 | 1 | 0 | 1 | 1 | 5a | 5a |

FIG. 45

|   | K |   |   |   |   |   |   | p[0] | p[1] |
|---|---|---|---|---|---|---|---|------|------|
| R[0] | 1 | 0 | 1 | 0 | 1 | 0 | 0 | 33 | cc |
| R[1] | 0 | 1 | 0 | 1 | 0 | 1 | 1 | 5a | 5a |

FIG. 46

|   | K |   |   |   |   |   |   | p[0] | p[1] |
|---|---|---|---|---|---|---|---|------|------|
| R[0] | 1 | 0 | 1 | 0 | 1 | 0 | 0 | 33 | cc |
| R[1] | 0 | 1 | 0 | 1 | 0 | 1 | 1 | 5a | 5a |
| R[2] | 0 | 0 | 1 | 0 | 0 | 1 | 1 | 66 | 66 |

FIG. 47

| | K | | | | | | | | p[0] | p[1] |
|---|---|---|---|---|---|---|---|---|---|---|
| R[0] | 1 | 0 | 1 | 0 | 1 | 0 | 1 | 0 | 33 | cc |
| R[1] | 0 | 1 | 0 | 1 | 0 | 1 | 0 | 1 | 5a | 5a |
| R[2] | 0 | 0 | 1 | 0 | 0 | 0 | 1 | 1 | 66 | 66 |
| R[3] | 0 | 0 | 0 | 1 | 1 | 0 | 1 | 1 | 66 | 1b |
| R[4] | 0 | 0 | 0 | 0 | 1 | 0 | 0 | 1 | 55 | aa |
| R[5] | 0 | 0 | 0 | 0 | 0 | 1 | 0 | 1 | 5a | 5a |
| R[6] | 0 | 0 | 0 | 0 | 0 | 0 | 1 | 1 | 66 | 66 | i ↓  l →

FIG. 48

| | K | | | | | | | | p[0] | p[1] |
|---|---|---|---|---|---|---|---|---|---|---|
| R[0] | 1 | 0 | 1 | 0 | 1 | 0 | 1 | 0 | 33 | cc |
| R[1] | 0 | 1 | 0 | 1 | 0 | 1 | 0 | 1 | 5a | 5a |
| R[2] | 0 | 0 | 1 | 0 | 0 | 0 | 1 | 1 | 66 | 66 |
| R[3] | 0 | 0 | 0 | 1 | 1 | 0 | 1 | 1 | 66 | 1b |
| R[4] | 0 | 0 | 0 | 0 | 1 | 0 | 0 | 1 | 55 | aa |
| R[5] | 0 | 0 | 0 | 0 | 0 | 1 | 0 | 1 | 5a | 5a |
| R[6] | 0 | 0 | 0 | 0 | 0 | 0 | 1 | 1 | 66 | 66 |
| R[7] | 0 | 0 | 0 | 0 | 0 | 0 | 0 | 0 | 00 | 00 | i ↓  l →

FIG. 49

|  | K | | | | | | | | p[0] | p[1] |
|---|---|---|---|---|---|---|---|---|---|---|
| R[0] | 1 | 0 | 1 | 0 | 1 | 0 | 1 | 0 | 33 | cc |
| R[1] | 0 | 1 | 0 | 1 | 0 | 1 | 0 | 1 | 5a | 5a |
| R[2] | 0 | 0 | 1 | 0 | 0 | 0 | 1 | 1 | 66 | 66 |
| R[3] | 0 | 0 | 0 | 1 | 1 | 0 | 1 | 1 | 66 | 1b |
| R[4] | 0 | 0 | 0 | 0 | 1 | 0 | 0 | 1 | 55 | aa |
| R[5] | 0 | 0 | 0 | 0 | 0 | 1 | 0 | 1 | 5a | 5a |
| R[6] | 0 | 0 | 0 | 0 | 0 | 0 | 1 | 1 | 66 | 66 |
| R[7] | 0 | 0 | 0 | 0 | 0 | 0 | 0 | 1 | 55 | 55 |

|  | K |  |  |  |  |  |  |  | p[0] | p[1] |
|---|---|---|---|---|---|---|---|---|---|---|
| R[0] | 1 | 0 | 0 | 0 | 0 | 0 | 0 | 0 | | |
| R[1] | 0 | 1 | 0 | 0 | 0 | 0 | 0 | 0 | | |
| R[2] | 0 | 0 | 1 | 0 | 0 | 0 | 0 | 0 | | |
| R[3] | 0 | 0 | 0 | 1 | 0 | 0 | 1 | 0 | | |
| R[4] | 0 | 0 | 0 | 0 | 1 | 0 | 0 | 0 | | |
| R[5] | 0 | 0 | 0 | 0 | 0 | 1 | 0 | 0 | | |
| R[6] | 0 | 0 | 0 | 0 | 0 | 0 | 1 | 0 | | |
| R[7] | 0 | 0 | 0 | 0 | 0 | 0 | 0 | 1 | | |

|  | K |  |  |  |  |  |  |  | p[0] | p[1] |
|---|---|---|---|---|---|---|---|---|---|---|
| R[0] | 1 | 0 | 0 | 0 | 0 | 0 | 0 | 0 | | |
| R[1] | 0 | 1 | 0 | 0 | 0 | 0 | 0 | 0 | | |
| R[2] | 0 | 0 | 1 | 0 | 0 | 0 | 0 | 0 | | |
| R[3] | 0 | 0 | 0 | 1 | 0 | 0 | 0 | 0 | | |
| R[4] | 0 | 0 | 0 | 0 | 1 | 0 | 0 | 0 | | |
| R[5] | 0 | 0 | 0 | 0 | 0 | 1 | 0 | 0 | | |
| R[6] | 0 | 0 | 0 | 0 | 0 | 0 | 1 | 0 | | |
| R[7] | 0 | 0 | 0 | 0 | 0 | 0 | 0 | 1 | | |

FIG. 51

| | K | | | | | | | | p[0] | p[1] |
|---|---|---|---|---|---|---|---|---|---|---|
| R[0] | 1 | 0 | 1 | 0 | 1 | 0 | 1 | 0 | 33 | cc |
| R[1] | 0 | 1 | 0 | 1 | 0 | 1 | 0 | 1 | 5a | 5a |
| R[2] | 0 | 0 | 1 | 0 | 0 | 0 | 1 | 1 | 66 | 66 |
| R[3] | 0 | 0 | 0 | 1 | 1 | 0 | 1 | 1 | 66 | 1b |
| R[4] | 0 | 0 | 0 | 0 | 1 | 0 | 0 | 1 | 55 | aa |
| R[5] | 0 | 0 | 0 | 0 | 0 | 1 | 0 | 1 | 5a | 5a |
| R[6] | 0 | 0 | 0 | 0 | 0 | 0 | 1 | 1 | 66 | 66 |
| R[7] | 0 | 0 | 0 | 0 | 0 | 0 | 0 | 1 | 55 | 55 |

FIG. 52

| | K | | | | | | | | p[0] | p[1] |
|---|---|---|---|---|---|---|---|---|---|---|
| R[0] | 1 | 0 | 1 | 0 | 1 | 0 | 1 | 0 | 33 | cc |
| R[1] | 0 | 1 | 0 | 1 | 0 | 1 | 0 | 0 | 0f | 0f |
| R[2] | 0 | 0 | 1 | 0 | 0 | 0 | 1 | 0 | 33 | 33 |
| R[3] | 0 | 0 | 0 | 1 | 1 | 0 | 1 | 0 | 33 | cc |
| R[4] | 0 | 0 | 0 | 0 | 1 | 0 | 0 | 0 | 00 | ff |
| R[5] | 0 | 0 | 0 | 0 | 0 | 1 | 0 | 0 | 0f | f0 |
| R[6] | 0 | 0 | 0 | 0 | 0 | 0 | 1 | 0 | 33 | 33 |
| R[7] | 0 | 0 | 0 | 0 | 0 | 0 | 0 | 1 | 55 | 55 |

FIG. 53

| | K | | | | | | | | p[0] | p[1] |
|---|---|---|---|---|---|---|---|---|---|---|
| R[0] | 1 | 0 | 1 | 0 | 1 | 0 | 0 | 0 | 33 | ff |
| R[1] | 0 | 1 | 0 | 1 | 0 | 1 | 0 | 0 | 0f | 0f |
| R[2] | 0 | 0 | 1 | 0 | 0 | 0 | 0 | 0 | 00 | 00 |
| R[3] | 0 | 0 | 0 | 1 | 1 | 0 | 0 | 0 | 00 | ff |
| R[4] | 0 | 0 | 0 | 0 | 1 | 0 | 0 | 0 | 00 | ff |
| R[5] | 0 | 0 | 0 | 0 | 0 | 1 | 0 | 0 | 0f | f0 |
| R[6] | 0 | 0 | 0 | 0 | 0 | 0 | 1 | 0 | 33 | 33 |
| R[7] | 0 | 0 | 0 | 0 | 0 | 0 | 0 | 1 | 55 | 55 |

FIG. 54

| | K | | | | | | | | p[0] | p[1] |
|---|---|---|---|---|---|---|---|---|---|---|
| R[0] | 1 | 0 | 0 | 0 | 0 | 0 | 0 | 0 | 00 | 00 |
| R[1] | 0 | 1 | 0 | 0 | 0 | 0 | 0 | 0 | 00 | 00 |
| R[2] | 0 | 0 | 1 | 0 | 0 | 0 | 0 | 0 | 00 | 00 |
| R[3] | 0 | 0 | 0 | 1 | 0 | 0 | 0 | 0 | 00 | 00 |
| R[4] | 0 | 0 | 0 | 0 | 1 | 0 | 0 | 0 | 00 | ff |
| R[5] | 0 | 0 | 0 | 0 | 0 | 1 | 0 | 0 | 0f | 0f |
| R[6] | 0 | 0 | 0 | 0 | 0 | 0 | 1 | 0 | 33 | 33 |
| R[7] | 0 | 0 | 0 | 0 | 0 | 0 | 0 | 1 | 55 | 55 |

FIG. 55

|  | K |  |  |  |  |  |  |  | p[0] | p[1] |
|---|---|---|---|---|---|---|---|---|---|---|
| R[0] | 1 | 0 | 0 | 0 | 0 | 0 | 0 | 0 | 00 | 00 |
| R[1] | 0 | 1 | 0 | 0 | 0 | 0 | 0 | 0 | 00 | 00 |
| R[2] | 0 | 0 | 1 | 0 | 0 | 0 | 0 | 0 | 00 | 00 |
| R[3] | 0 | 0 | 0 | 1 | 0 | 0 | 0 | 0 | 00 | 00 |
| R[4] | 0 | 0 | 0 | 0 | 1 | 0 | 0 | 0 | 00 | ff |
| R[5] | 0 | 0 | 0 | 0 | 0 | 1 | 0 | 0 | 0f | 0f |
| R[6] | 0 | 0 | 0 | 0 | 0 | 0 | 1 | 0 | 33 | 33 |
| R[7] | 0 | 0 | 0 | 0 | 0 | 0 | 0 | 1 | 55 | 55 |

FIG. 56

DATA DISTRIBUTING METHOD, SYSTEM TRANSMITTING METHOD, AND PROGRAM

This application is a continuation of PCT/JP02/010026, filed Sep. 27, 2002.

TECHNICAL FIELD

The invention relates to a data distributing method of a peer-to-peer type, a system, a transmitting method, and a program for making a collaboration or the like by communicating information among a plurality of peers which are mutually connected through a network and, more particularly, to a data distributing method, a system, a transmitting method, and a program for efficiently distributing information which is transmitted by a peer to another peer.

BACKGROUND ART

In association with the spread of the Internet, a collaboration system in which some object is shared between remote places has widely been used. In the conventional collaboration system, a server/client type is a mainstream. A server makes management and distribution of data as a target for collaboration. Since the server unitarily makes the management of the data, the data for the collaboration possessed by each client is held identical.

However, since a load on the server is large in the collaboration system of the server/client type, in recent years, attention has been paid to a collaboration system of a peer-to-peer type. In the peer-to-peer type, each user participating in the network is equal (Peer) and does not have a special server. A user apparatus which is used in the peer-to-peer type network is simply called a peer in the following description.

However, in such a conventional collaboration system of the peer-to-peer type, since the data for the collaboration is held in each user, there is such a problem that in the state where a specific peer does not participate in the collaboration, in the case where the residual peers update the data or the like, consistency of the data in each peer cannot be held. In the case of the server/client type, the server serving as a distributing source of the data generally can be set at a place of an excellent network environment. However, in the case of the peer-to-peer type, a distributing source of the data is each peer and there are various environments such as wireless LAN, telephone line, and the like.

There is, consequently, such a problem that in the case where the data is distributed from a transmitting peer serving as a start point to all of the other peers at a ratio of 1:n, the data cannot be efficiently transmitted in dependence on a distribution path, it takes a long communication time, and communication costs are high.

DISCLOSURE OF INVENTION

It is an object of the invention to provide a data distributing method, a system, a transmitting method, and a program of a peer-to-peer type which can form an efficient distribution path, realize consistency of data between peers, and perform efficient high-speed data transmission.

Data Distribution by Grouping

According to the invention, there is provided a data distributing method of a peer-to-peer type for communicating information among a plurality of peers which are mutually connected through a network, in which each of the peers comprises:

a group information forming step wherein when connection of a new peer is received by a group information forming unit, group information in which the new peer has been grouped is formed on the basis of comparison of distances on the network among three peers of the own peer, a representative peer of an existing group, and the new peer;

a data transmitting step wherein when data is transmitted from the own peer by a data transmitting unit, path information in which destination information of each group which has been grouped on the basis of the group information and the own peer have been registered is formed and the destination information, the path information, and the data are transmitted as distribution information to the representative peer of each group; and a data relaying step wherein when distribution information is received from another peer by a data relay unit, if the own peer is included in the destination information, the data is fetched and the own peer is deleted, thereafter, distribution information in which the destination information of each group which has been grouped on the basis of the group information and the own peer have been registered is formed, and the destination information, the path information, and the data are transmitted as distribution information to the representative peer of each group.

As mentioned above, each peer of the invention performs the grouping process on the basis of the distance on the network from the own peer to another peer and in the case of transmitting the data from the own peer or relaying the data distributed from such another peer, it is sufficient to group destination peers and distribute the data only to the representative peer in the group. As compared with the (1:n) communication, the number of distribution destinations can be sufficiently reduced in dependence on the number of groups and a distribution time can be shortened.

In the group information forming step, the representative peer whose distance from the own peer is the minimum is selected from the representative peers of the existing groups and the group information in which the new peer has been grouped is formed on the basis of the comparison of the distances among the three peers of the own peer, the representative peer of the existing group, and the new peer.

As mentioned above, the representative peer of the group seen from each peer becomes the peer existing at the minimum distance of the group, the shortest path is selected as a distribution path, and the data can be efficiently distributed. If the new peer appears, the grouping process is executed in consideration of the relations with the existing groups, and the optimum distribution path is dynamically formed in accordance with a participation situation of the peers.

For such a dynamic grouping process, in the group information forming step, as distances among the three peers of the own peer, the representative peer of the existing group, and the new peer, when the distance between the own peer and the new peer is assumed to be a first distance L, the distance between the own peer and the representative peer is assumed to be a second distance, and the distance between the representative peer and the new peer is assumed to be a third distance, if there is a first distance relation (1st distance)>(2nd distance)>(3rd distance)

among the three peers, the new peer is made to belong to the group of the representative peer and the representative peer is maintained as it is.

If there is a second distance relation (2nd distance)>(1st distance)>(3rd distance)

among the three peers, the new peer is made to belong to the group of the representative peer and the representative peer is changed to the new peer.

Further, if there is a distance relation other than the first and second distance relations, a new group is formed with respect to the new peer and this peer is set to the representative peer.

Further, in the group information forming step, if a plurality of representative peers exist, the representative peer whose distance from the own peer is the minimum is selected from them and the grouping process of the new peer based on the comparison of the distances among the three peers of the own peer, the representative peer, and the new peer is repeated.

According to the invention, there is provided a program which is executed by a peer for communicating information with other peers which are mutually connected through a network. The program allows a computer constructing the peer to execute:

a group information forming step wherein when connection of a new peer is received, group information in which the new peer has been grouped is formed on the basis of comparison of distances on the network among three peers of the own peer, a representative peer of an existing group, and the new peer;

a data transmitting step wherein when data is transmitted from the own peer, path information in which destination information of each group which has been grouped on the basis of the group information and the own peer have been registered is formed and the destination information, the path information, and the data are transmitted as distribution information to the representative peer of each group; and a data relaying step wherein when distribution information is received from another peer, if the own peer is included in the destination information, the data is fetched and the own peer is deleted, thereafter, distribution information in which the destination information of each group which has been grouped on the basis of the group information and the own peer have been registered is formed, and the destination information, the path information, and the data are transmitted as distribution information to the representative peer of each group.

Details of the program according to the invention are fundamentally the same as those in the data distributing method.

According to the invention, there is provided a peer for communicating information with other peers which are mutually connected through a network. This peer comprises: a group information forming unit which, when connection of a new peer is received, forms group information in which the new peer has been grouped on the basis of comparison of distances on the network among three peers of the own peer, a representative peer of an existing group, and the new peer; a data transmitting unit which, when data is transmitted from the own peer, forms path information in which destination information of each group which has been grouped on the basis of the group information and the own peer have been registered and transmits the destination information, the path information, and the data as distribution information to the representative peer of each group; and a data relay unit which, when distribution information is received from another peer, if the own peer is included in the destination information, fetches the data and deletes the own peer, thereafter, forms distribution information in which the destination information of each group which has been grouped on the basis of the group information and the own peer have been registered, and transmits the destination information, the path information, and the data as distribution information to the representative peer of each group. Details of the peer of the invention are fundamentally the same as those of the data distributing method.

Proxy Peer

According to the invention, there is provided a data distribution system of a peer-to-peer type for mutually communicating information among a plurality of peers which are mutually connected through a network, comprising a proxy peer which, while a requesting source peer which requested proxy is not operating, stores updating data distributed to the requesting source peer, and when the requesting source peer starts the operation, transfers the stored updating data.

By providing the proxy peer onto the network as mentioned above, if an arbitrary peer stops the operation due to a power-off or the like, since the proxy peer has stored the updating data distributed from another peer, and when the peer starts the operation by the power-on, the updating data stored in the proxy peer is sent to the recovered peer, thereby enabling consistency of the data between the peers to be guaranteed.

It is also possible to construct in such a manner that the proxy peer shares the data with the requesting source peer which requested the proxy, updates the shared data by the data distributed to the requesting source peer while the requesting source is not operating, and overwrites the updated shared data into the shared data of the requesting source peer when the requesting source peer starts the operation. The backup by the shared data can be applied to the case where the distance on the network from the proxy peer is short.

In the case where a group is formed by a plurality of peers and the distribution information received by the representative peer of the group is distributed to other peers in the group, the proxy peer is set as a representative peer, while one or a plurality of peers in the group are not operating, the updating data distributed to the peers which are not operating is stored, and the stored updating data is transferred when the peers operate. Thus, the data distributed when the operations of a plurality of peers are stopped is held by one proxy peer, thereby guaranteeing the consistency of the data.

Further, in the case where a plurality of proxy peers are provided and the operation is stopped while the updating data is being distributed to the specific proxy peer, the residual updating data is distributed to the other proxy peers which are operating. Thus, the other proxy peer is substituted in response to the stop of the proxy peer to which the data has been distributed, thereby guaranteeing the data consistency by the proxy peer.

High-Speed Data Transmission

According to the invention, there is provided a data transmitting method of packet-transmitting data. This data transmitting method comprises:

an encoding transmitting step wherein, by an encoding transmitting unit, solutions are obtained by substituting original data into simultaneous equations of a Boolean algebra together with predetermined constant data and sets of the constant data and the solutions are packet-transmitted as encoding data; and a reception decoding step wherein, by a reception decoding unit, the original data is decoded by substituting the constant data and the solutions obtained from the received encoding data into the simultaneous equations.

In this data transmitting method, UDP communication in which a response ACK is unnecessary to the reception of a transmission packet is used and a communication time can be shortened and the data can be transmitted at a higher speed as compared with those of TCP communication which needs a response. Even if a packet extinction or exchange occurs on the way of the transmission, the data can be corrected and reconstructed on the reception side and the reliability equivalent to that of the TCP communication in which the response is returned every reception of the packet is assured.

In details of the data transmitting method using a solving method of the simultaneous equations, as an encoding transmitting step, in the case where the transferring source data is assumed to be data $(b_0, b_1, b_2, b_3, \ldots, b_{m-1})$ of m bits, by substituting a data train $K=(k_{n0}, k_{n1}, k_{n2}, \ldots, k_{nm-1})$ of n series of m bits into the simultaneous equations of the Boolean algebra $$b_0 k_{n0} + b_1 k_{n2} + \ldots + b_{m-1} k_{nm-1} = P_n$$

n solutions $P_n=(p_0, p_1, p_2, \ldots, p_{n-1})$ are obtained, and the encoding data comprising sets of the data train K and the solutions $P_n$ are packet-transferred.

In the reception decoding step, the data of m bits serving as transferring source data is decoded by substituting the data train K and the solutions $P_n$ obtained from the received encoding data into the simultaneous equations.

Further, in details, the reception decoding step comprises the steps of:

forming a matrix data layout of the data train and $P_n$ in which the portion of the data train K obtained from the received encoding data becomes an upper triangle;

converting the portion of the data train K of the matrix data layout into a unit matrix; and reconstructing the transferring source data from data positions of the solutions $P_n$ in which the data train K has been converted into the unit matrix.

According to another embodiment of the data transmitting method of the invention, there is provided a data transmitting method which does not use the solving method of the simultaneous equations. This data transmitting method comprises:

a transmitting step wherein, by an encoding transmitting unit, transferring source data is divided into m division data $(D_0, D_1, D_2, \ldots, D_{m-1})$, the division data corresponding to the position of bit 1 of a data train $K=(k_{n0}, k_{n1}, k_{n2}, \ldots, k_{nm-1})$ of n series of m bits is selected, exclusive OR data is obtained, and encoding data comprising sets of the data train K and the exclusive OR data is packet-transferred; and a receiving step wherein, by a reception decoding unit, the data train K and the exclusive OR data obtained from the received encoding are arranged in a matrix shape, thereafter, the portion of the data train K is converted into a unit matrix, and the exclusive OR data after the unit matrix was formed is decoded as division data.

According to the data transmitting method which does not use the solving method of the simultaneous equations, the encoding and decoding processes are consequently simplified.

The series number (n) of the data train K in the encoding and decoding of the invention is set to a value which is equal to or larger than the number (m) of bits. For example, the series number (n) of the data train is equal to the number (m+α) obtained by adding a value α based on a packet extinction ratio of a transmission path to the number (m) of bits.

Thus, even if α or less packets are extinguished on the way of the transmission, the original data can be reconstructed by receiving the m packets.

According to the data transmitting method of the invention, the data train K which is used to form the encoding data to be transferred by n packets is set to a specific numerical value train which can be easily converted into a unit matrix on the reception side with respect to a predetermined number of packets from the first packet.

According to the invention, a numerical value train of the data train K is determined on the basis of a predetermined table or a predetermined equation and this table or equation is shared by the transmission side and the reception side, thereby making the packet transfer of the data train K unnecessary.

In the encoding transmitting step of the data transmitting method of the invention, the encoding data of one block is divided into a plurality of packets and transferred, and in the reception decoding step, when the packets of one block are received and the decoding of the original data is completed, a decoding success signal is transmitted to the transmission side, and when the decoding fails, a decoding failure signal is transmitted and the data is transmitted again. Thus, a reception response is made not on a packet unit basis but on a block unit basis according to a plurality of packets which are necessary for the data decoding. Both of the reliability and the high-speed transmission according to the reception response are satisfied.

According to the data transmitting method of the invention, a buffer is provided for the reception side, the packet data is held in the buffer, thereafter, the decoding is executed, and when the decoding fails, the packet data which was received until the retransmission is started is stored in the buffer, thereby reducing the number of packets of the block to be retransmitted.

According to the invention, there is provided a program for data transmission. This program allows a computer to execute:

an encoding transmitting step wherein solutions are obtained by substituting original data into simultaneous equations of a Boolean algebra together with predetermined constant data and sets of the constant data and the solutions are packet-transmitted as encoding data; and a reception decoding step wherein the original data is decoded by substituting the constant data and the solutions obtained from the received encoding data into the simultaneous equations.

Details of the program for the data transmission according to the invention are fundamentally the same as those of the data transmitting method.

BRIEF DESCRIPTION OF DRAWINGS

FIG. 5 is an explanatory diagram of group information which is used in a peer P0 in FIG. 4;

FIGS. 25A-25B are explanatory diagrams in the case where the proxy peer substitutes for a plurality of peers;

FIGS. 26A-26C are explanatory diagrams in the case where the proxy peer stops the operation during the data distribution;

FIG. 28 is an explanatory diagram of a data distributing method in the case where a plurality of proxy peers are arranged and is a sequel to FIG. 27;

FIGS. 29A-29C are explanatory diagrams of a method of improving the reliability of the data which was updated by the proxy peer;

FIG. 41 is an explanatory diagram of a structure of reception data which is decoded according to the invention;

FIGS. 42A-42B are explanatory diagrams of fundamental processing contents in FIG. 38;

FIG. 43 is an explanatory diagram of an upper triangle matrix of K obtained by the process in FIG. 38;

FIG. 44 is an explanatory diagram of the reception data obtained in the first packet reception;

FIG. 45 is an explanatory diagram of the reception data obtained in the second packet reception;

FIG. 46 is an explanatory diagram of the reception data obtained in the third packet reception;

FIG. 47 is an explanatory diagram of the reception data obtained in the seventh packet reception;

FIG. 48 is an explanatory diagram of the reception data obtained in the eighth packet reception;

FIG. 49 is an explanatory diagram of the upper triangle matrix obtained by the process in FIG. 38;

FIG. 51 is an explanatory diagram of data when $i=6$;

FIG. 52 is an explanatory diagram of data at the end of the process according to $i=6$;

FIG. 53 is an explanatory diagram of data at the end of the process according to $i=5$;

FIG. 54 is an explanatory diagram of data at the end of the process according to $i=0$;

FIG. 55 is an explanatory diagram of the data after completion of the unit matrix forming process serving as a target of the data extracting process in FIG. 40;

FIG. 56 is an explanatory diagram of the data in which the portions of P in FIG. 55 are extracted;

BEST MODE FOR CARRYING OUT THE INVENTION

Data Distribution by Grouping Process

Figure 1:
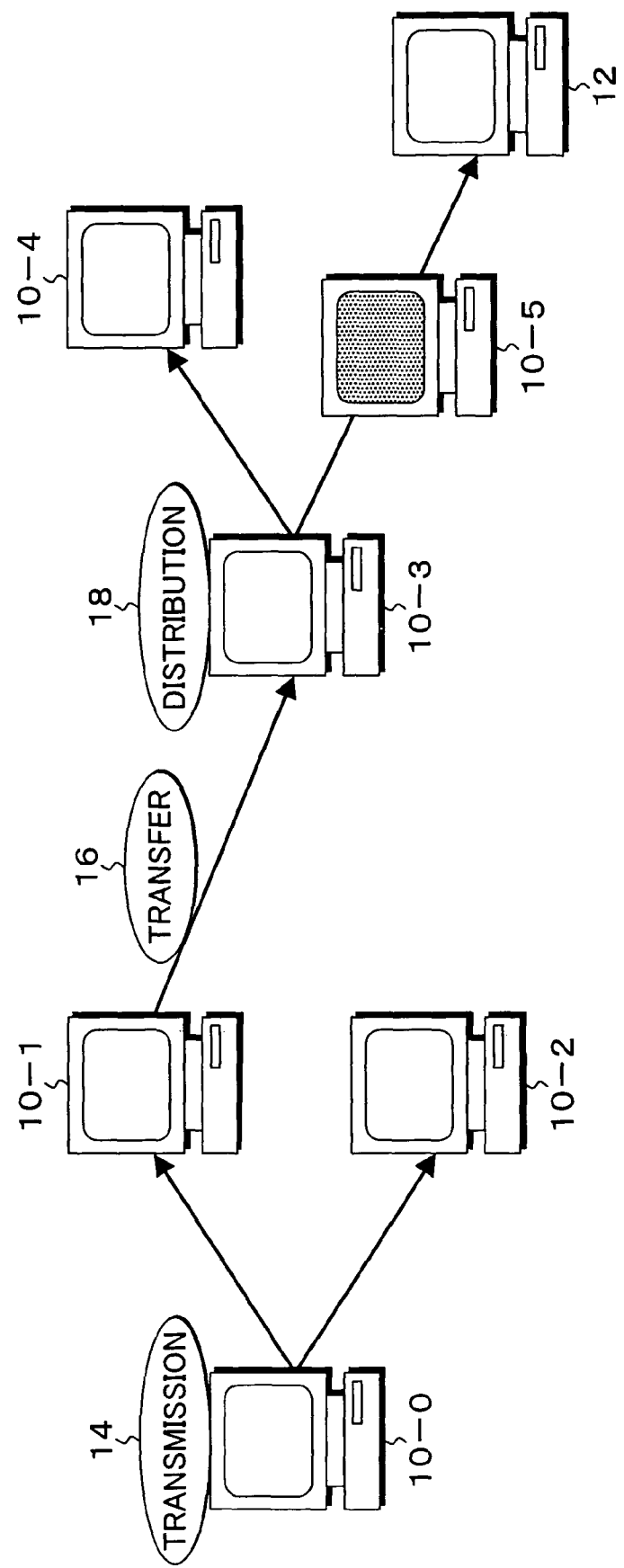
FIG. 1 is an explanatory diagram of a data distribution system of a peer-to-peer type according to the invention.

FIG. 1 is an explanatory diagram of a communication system of a peer-to-peer type which is constructed by the invention. In FIG. 1, each of peers 10-1 to 10-5 is constructed by an information processing apparatus such as personal computer, PDA, or the like and has a proper input apparatus, a proper output apparatus, and a proper communicating apparatus. An application to make, for example, a collaboration as a representative of the peer-to-peer type communication has been installed in each of the peers 10-1 to 10-4. Now, assuming that a peer 10-0 performed a data change in the collaboration, for example, inputted a chat sentence, information is transmitted from the peer 10-0 and its contents are distributed in accordance with a communication protocol of a network such as Internet or the like. At this time, if a transmission path between a group of the peers 10-0, 10-1, and 10-2 on the left side and a group of the peers 10-3, 10-4, and 10-5 on the right side is long, efficiency in the case where, for example, the information transmitted from the peer 10-0 is transferred to the peer 10-3 by transfer 16 from the peer 10-1 and, thereafter, distribution 18 to the peers 10-4 and 10-5 is executed is higher than that in the case where it is directly distributed to each of the peers 10-1 to 10-5. In the data distributing method of the invention, therefore, as will be clearly explained hereinafter, each of the peers 10-1 to 10-5 independently forms a group on the basis of comparison of distances on the network between the own peer and other peers and makes distribution control for transmitting the information to the representative peer of the group. A proxy peer 12 is provided on the communication system of the peer-to-peer type in FIG. 2. For example, when the peer 10-5 is in the stop mode because its power source is OFF, an operating program is not activated, or the like, in place of the peer 10-5, the proxy peer 12 receives the information which is transmitted to the peer 10-5 as a destination. After that, when the power source of the peer 10-5 is turned on and the operation is started, the information held in the proxy peer 12 is sent to the peer 10-5. Therefore, even if the operation of the peer is stopped, when it is activated after that, consistency (uniqueness) of the data is held.

Figure 2:
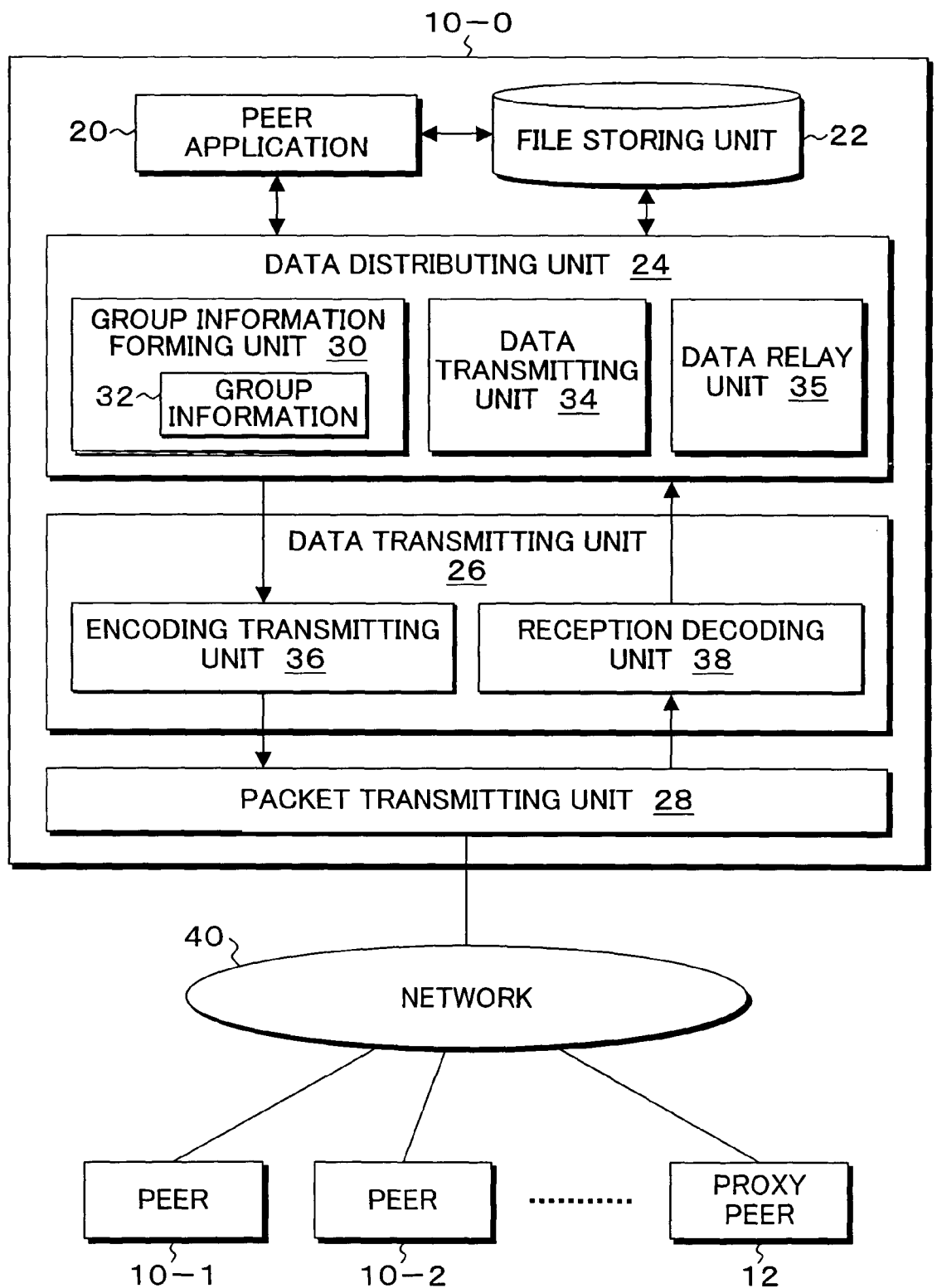
FIG. 2 is a block diagram of a functional construction of a peer which is used in the invention.

FIG. 2 is an explanatory diagram showing a functional construction with respect to the peer 10-0 in FIG. 1 as an example. In FIG. 2, a peer application 20, a file storing unit 22, a data distributing unit 24, a data transmitting unit 26, and a packet transmitting unit 28 are provided for the peer 10-0. For example, an application for collaboration is used as a peer application 20. In this case, shared data according to the collaboration is stored in the file storing unit 22. Functions of a group information forming unit 30, a data transmitting unit 34, and a data relay unit 35 are provided for the data distributing unit 24. When connection of a new peer is received through a network 40, that is, the new peer appears when it is seen from the peer 10-0, the group information forming unit 30 forms group information 32 in which the new peer has been grouped on the basis of comparison of distances on the network among three peers of the own peer 10-0, the representative peer of the existing group, and the new peer. When the own peer 10-0 transmits data of collaboration, the data transmitting unit 34 forms path information in which destination information of each group seen from the own peer 10-0 and the own peer 10-0 have been registered on the basis of the group information 32 formed by the group information forming unit 30 and transmits the destination information, the path information, and the data as distribution information to the representative peer of each group. The data relay unit 35 relays the distribution information received from another peer. That is, when the distribution information is received from another peer, if the peer 10-0 itself is included in the destination information, the reception data is fetched and the peer 10-0 itself is deleted from the destination information. After that, distribution information in which the destination information of each group and the own peer have been registered is formed on the basis of the group information 32. The destination information, the path information, and the data are transmitted as distribution information to the representative peer of each group. An encoding transmitting unit 36 and a reception decoding unit 38 are provided for the data transmitting unit 26. The data transmitting unit 26 decodes the distribution information which is outputted from the data distributing unit 24 and transmits it to the representative peer of the group serving as a destination from the packet transmitting unit 28 through the network 40 by the UDP communication. The reception decoding unit 38 executes decoding to reconstruct the distribution information from a reception packet from another peer which was received by the packet transmitting unit 28 and outputs the reconstructed distribution information to the data distributing unit 24. The reason why the UDP communication is used as a packet transmitting unit 28 is that while the TCP communication needs an ACK reception response every packet, in the UDP communication, since the reception response is unnecessary every packet, the high-speed transmission can be performed. On the other hand, in the UDP communication, since the reception response cannot be obtained every packet, an error is generated due to extinction or exchange of the packet during the transmission. Therefore, to correct it, in the invention, the distribution information is encoded so that the data can be corrected and it is transmitted, it is decoded on the reception side, and even if the extinction or exchange of the packet occurs, no error is generated.

Figure 3:
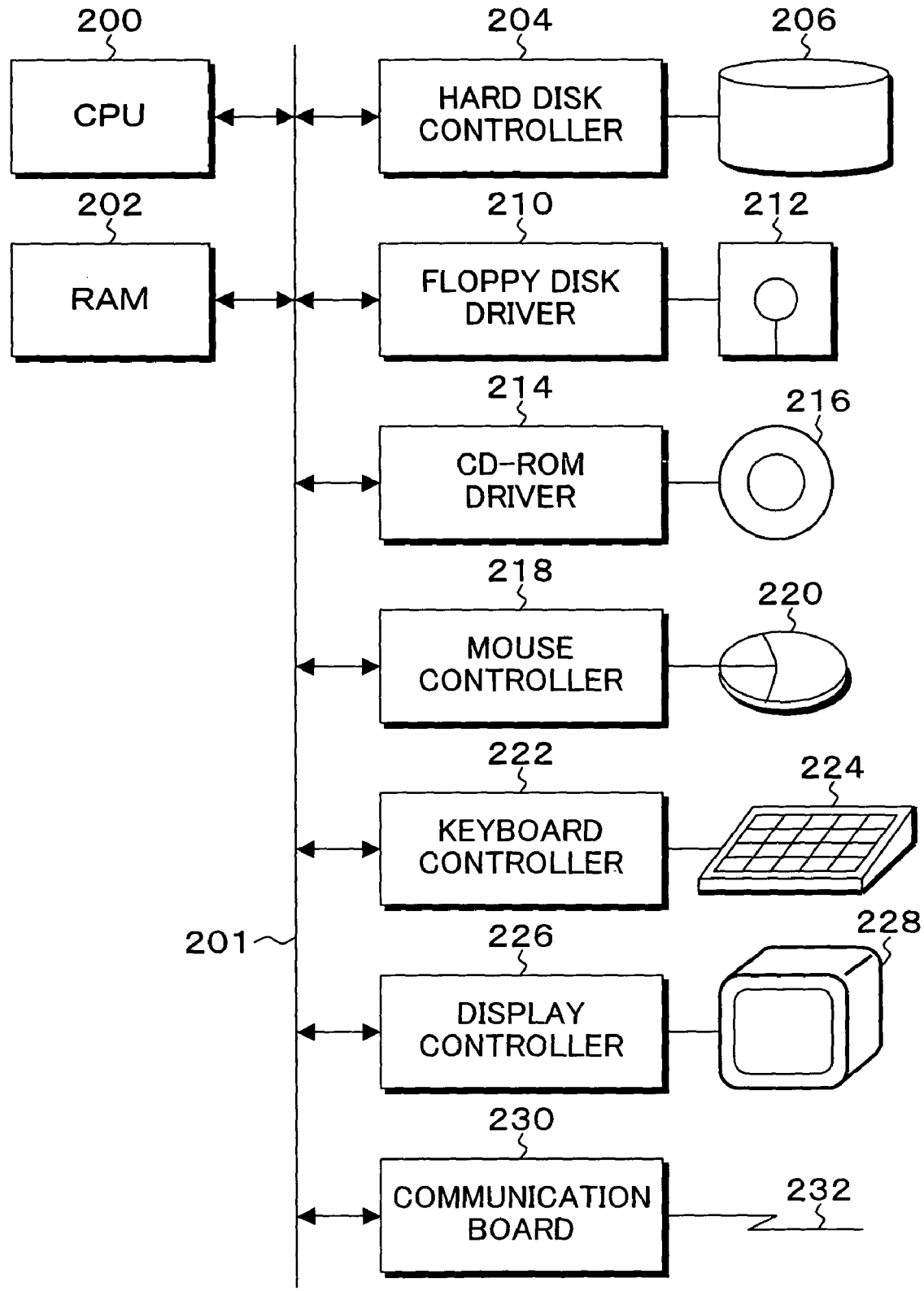
FIG. 3 is an explanatory diagram of a hardware environment of a computer which is used in the peer in FIG. 2.

The peer of the invention in FIG. 2 is realized by, for example, hardware resources of a computer as shown in FIG. 3. In the computer of FIG. 3, a RAM 202, a hard disk controller (software) 204, a floppy disk driver (software) 210, a CD-ROM driver (software) 214, a mouse controller 218, a keyboard controller 222, a display controller 226, and a communication board 230 are connected to a bus 201 of a CPU 200. A hard disk drive 206 is connected to the hard disk controller 204. Application programs to execute the data distribution system of the peer-to-peer type for collaboration according to the invention have been loaded in the hard disk drive 206. When the computer is activated, the necessary program is called from the hard disk drive 206, developed onto the RAM 202, and executed by the CPU 200. A floppy disk drive (hardware) 212 is connected to the floppy disk driver 210 and data can be written into and read out from a floppy disk (registered trademark). A CD drive (hardware) 216 is connected to the CD-ROM driver 214 and data and programs stored in a CD can be read out. The mouse controller 218 transfers the inputting operation of a mouse 220 to the CPU 200. The keyboard controller 222 transfers the inputting operation of a keyboard 224 to the CPU 200. The display controller 226 allows a display unit 228 to display. The communication board 230 communicates with another peer through the network such as Internet or the like by using a communication line 232 including wireless communication.

Figure 4A:
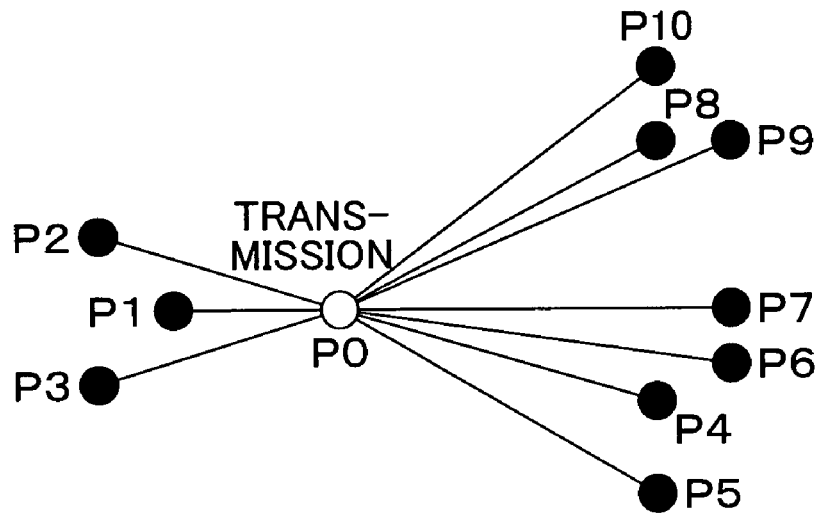
FIGS. 4A-4B are explanatory diagrams showing a distributing method according to a grouping process of the invention in comparison with a conventional distributing method.
Figure 4B:
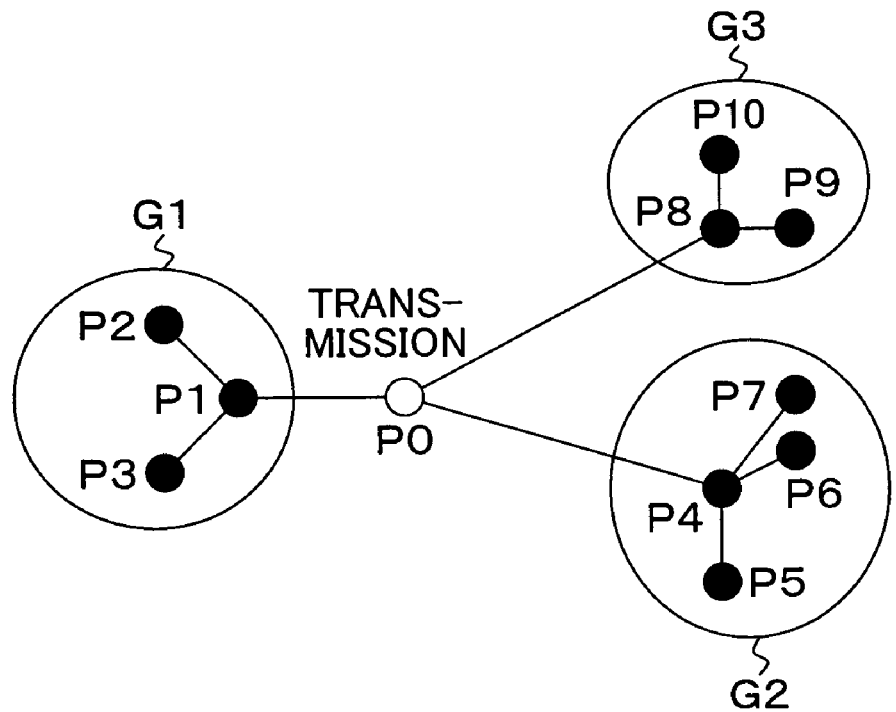

A data distributing method according to a grouping process of peers in the invention will now be described. FIG. 4A shows a conventional data distributing method according to (1:n). FIG. 4B shows a data distributing method according to the grouping process of the invention. According to the conventional data distributing method of (1:n), when a peer P0 transmits information to all other peers P1 to P10, distribution routes are formed from the peer P0 to all of the other peers P1 to P10 and the information is distributed. On the other hand, according to the data distributing method of the invention of FIG. 4B, in the case of transmitting the information from the peer P0, the peers P1 to P10 serving as destinations are divided into several groups and a distribution route to distribute the information only to the representative peer of each group is formed. First, it is assumed that a group G1 is formed by the peers P1 to P3, a group G2 is formed by the peers P4 to P7, and a group G3 is formed by the peers P8 to P10 on the basis of group information formed by seeing the other peers P1 to P10 from the peer P0 which transmits the information, respectively. It is also assumed that the group G1 has the representative peer P1, the group G2 has the representative peer P4, and the group G3 has the representative peer P8, respectively. In this case, the peer P0 forms distribution routes to the representative peers P1, P4, and P8 of the groups G1, G2, and G3 and transmits the information thereto. Therefore, although the peer P0 as a transmitting source makes the (1:10) communication in the conventional data distributing method of FIG. 4A, it makes the (1:3) communication in the data distributing method of the invention of FIG. 4B, so that the information can be efficiently transmitted from the transmitting peer P0. In this case, each of the representative peers P1, P4, and P8 which received the information transmitted from the peer P0 independently has the group information in which it has been grouped by seeing another peer from the own peer and makes a relay to transfer the received information to the representative peers of the groups in accordance with the group information. However, eventually, as shown in the diagram, the information is transmitted from the representative peers P1, P4, and P8 to the peers other than the representative peers in the groups when seen from the peer P0, respectively.

FIG. 5 is an explanatory diagram of the group information 32 held in the peer P0 in FIG. 4B. The group information 32 is constructed by a group name, the representative peer, and the belonging peers. For example, the representative peer of the group G1 is the peer P1 and the peers P2 and P3 belong to this group. In the case where the peer P0 transmits the information to all of the peers P1 to P10, the peers serving as destinations are classified into the groups G1 to G3 with reference to the group information 32 in FIG. 5. Further, the representative peer of each group is selected and set to the distributing destination, and the information is transmitted thereto.

Figure 6A:
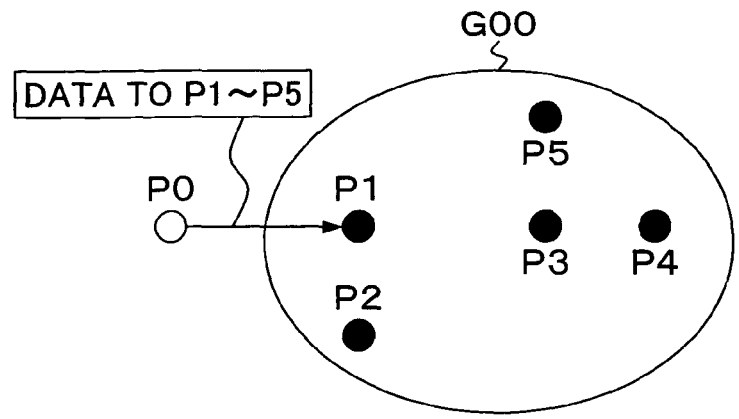
FIGS. 6A-6C are explanatory diagrams of the grouping process and a distribution route when seen from each peer of a distribution path according to the invention.
Figure 6B:
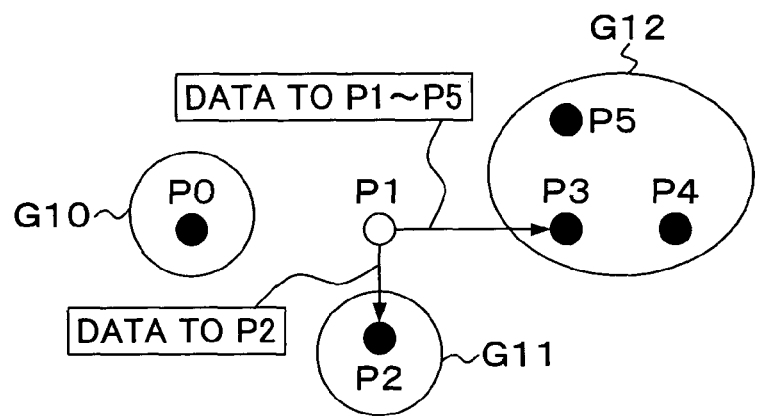

FIG. 6 is an explanatory diagram of a deciding method of the distribution route based on the group information when the information is transmitted from the peer P0 to the residual peers P1 to P5 with respect to the peers P0 to P5 as an example. FIG. 6A shows the case where the data is transmitted from the peer P0 to the residual peers P1 to P5 as destinations. At this time, the group information when seen from the peer P0 is only a group G00. Assuming that the representative peer is the peer P1, the peer P0 transmits the data whose destinations are set to the peers P1 to P5 to the representative peer P1 of the group G00. FIG. 6B shows the case where the peer P1 receives the data from the peer P0 and transmits it to other peers. At this time, the group information when seen from the peer P1 is a group G10 including the peer P0, a group G11 including the peer P2, and a group G12 including the peers P3 to P5 and it is assumed that the representative peers of the groups G10, G11, and G12 are the peers P0, P2, and P3.

Therefore, the peer P1 transmits the data to the representative peer P2 of the group G11 and the representative peer P3 of the group G12. At this time, the destinations to the representative peer P2 are only the representative peer P2. On the other hand, the destinations to the representative peer P3 include the three peers P3 to P5. Further, since the peer P0 of the group G10 does not exist in the destinations, the data is not transmitted.

Figure 6C:
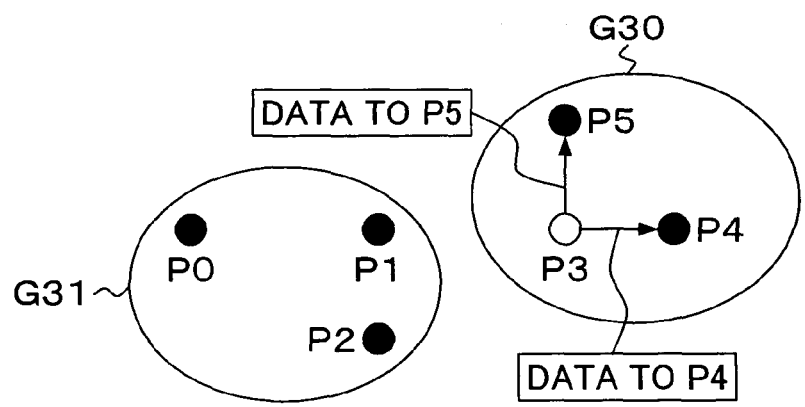

FIG. 6C shows the group information when seen from the peer P3 and it indicates a group G31 including the peers P0 to P2 and a group G30 including the peers P3 and P4. Therefore, since there is not a group any more to which the data is transferred, the peer P3 which received the data distributes it to the peers P4 and P5 in the group G30. By forming the distribution route via the representative peers of three stages in FIGS. 6A, 6B, and 6C, the data transmitted by the peer P0 can be efficiently distributed to the other peers P1 to P5.

Figure 7:
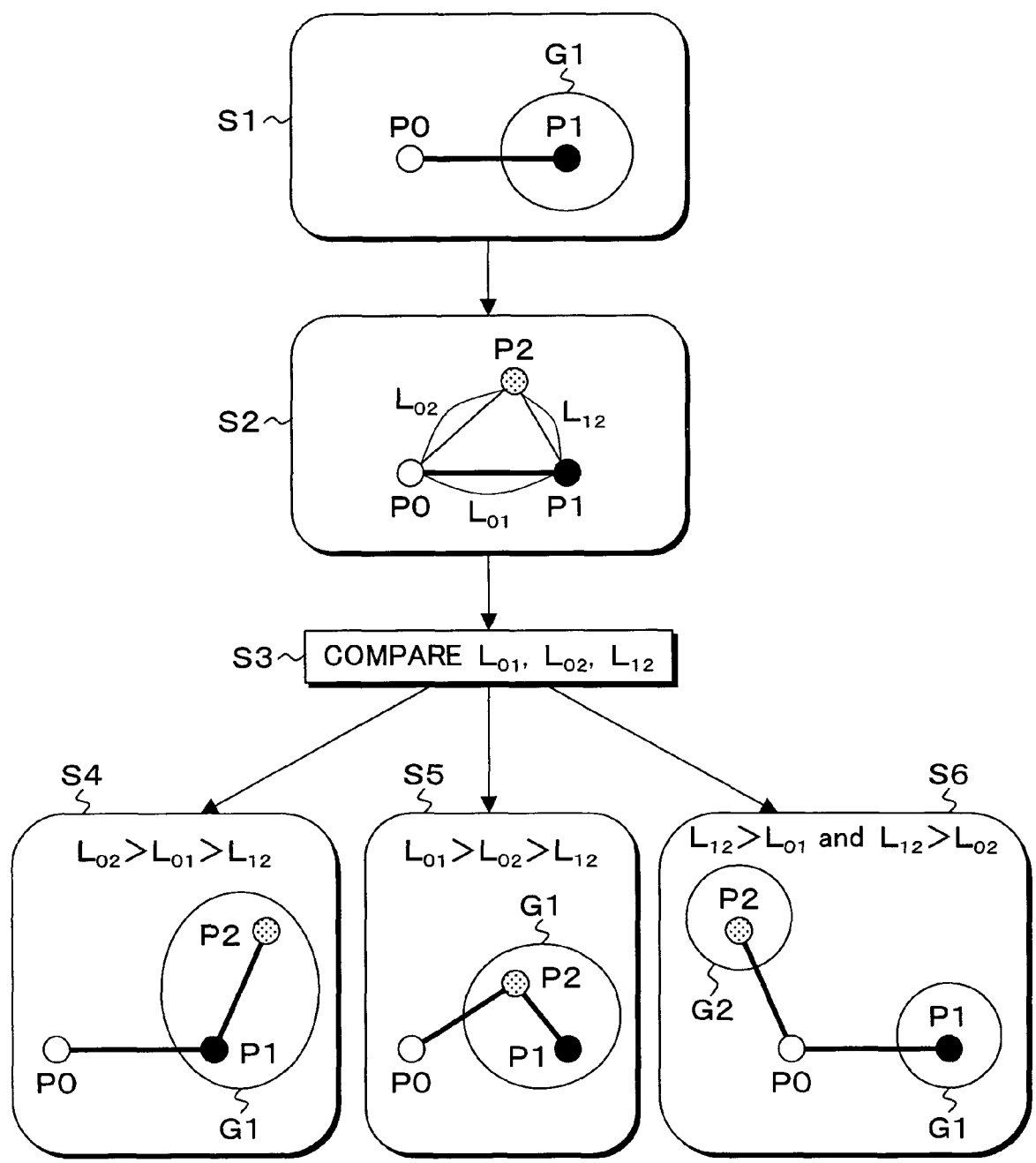
FIG. 7 is an explanatory diagram of the grouping process in the case where the third new peer appears in the state where two peers exist.

A forming method of the group information according to the grouping process by the group information forming unit 30 in FIG. 2 will now be described. In the communication system of the peer-to-peer type as a target of the invention, the peer which participates newly is not simultaneously connected to the existing peers but is certainly connected with a time difference. FIG. 7 shows a grouping method for deciding a transmission path when a new peer is connected. First, in step S1, the existing peer P1 is connected to the target peer P0, so that the group G1 is formed when seen from the peer P0 with respect to the existing peer P1. In this case, there is only one transmission path. Subsequently, assuming that the new peer P2 was connected as shown in step S2, distances $L_{01}$, $L_{02}$, and $L_{12}$ on the network among the three peers of the target peer P0, the existing peer P1, and the new peer P2 are obtained. They are compared in step S3. The distance on the network denotes response time or a line speed to "PING" and "distance is short" denotes that the data can be transmitted at a high speed. It is also possible to decide that a range where a broadcast of the IP communication reaches denotes that "distance is short". "PING" denotes a utility program which can be used in the communication protocol of a TCP/IP network. By transmitting an ICMP ECOHO packet and waiting for its response, a time required for reciprocation of the packet can be displayed. As a result of the comparison in step S3, if $$L_{02} > L_{01} > L_{12},$$

the new peer P2 belongs to the group G1 of the existing peer P1 as shown in step S4 and the peer P1 is maintained as a representative peer of this group. On the other hand, if $$L_{01} > L_{02} > L_{12},$$

the new peer P2 belongs to the group G1 of the existing peer P1 as shown in step S5. In this case, the representative peer of this group is exchanged to the peer P2 from the peer P1.

Further, in the cases other than steps S4 and S5, that is, if $$L_{12} > L_{01} \text{ and } L_{12} > L_{02},$$

the new peer P2 forms a new group G2 different from that of the peer P1 as shown in step S6 and becomes the representative peer of this group.

Figure 8:
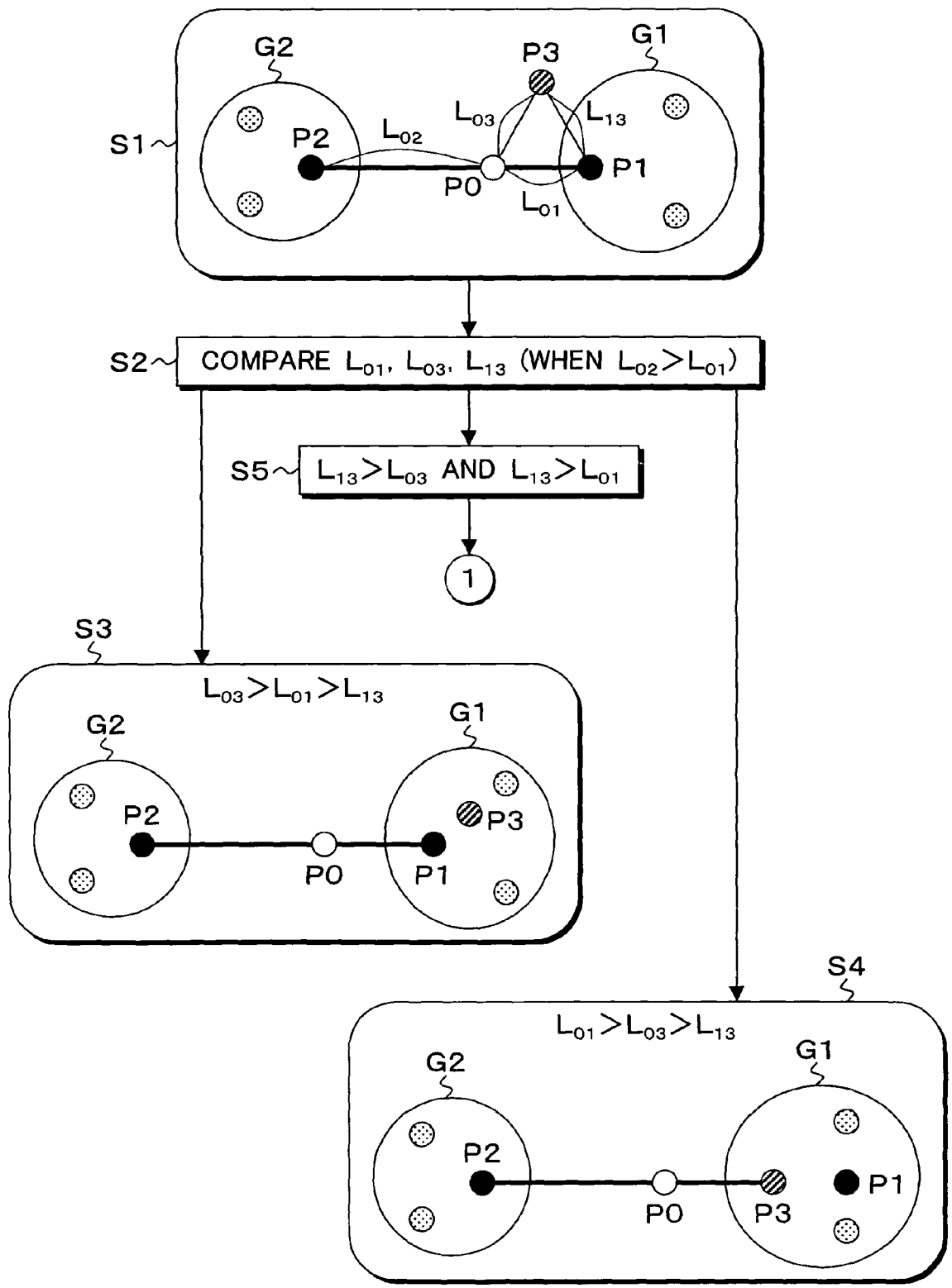
FIG. 8 is an explanatory diagram of the grouping process in the case where a new peer appears in a position near to one of two existing groups in the state where they exist.
Figure 9:
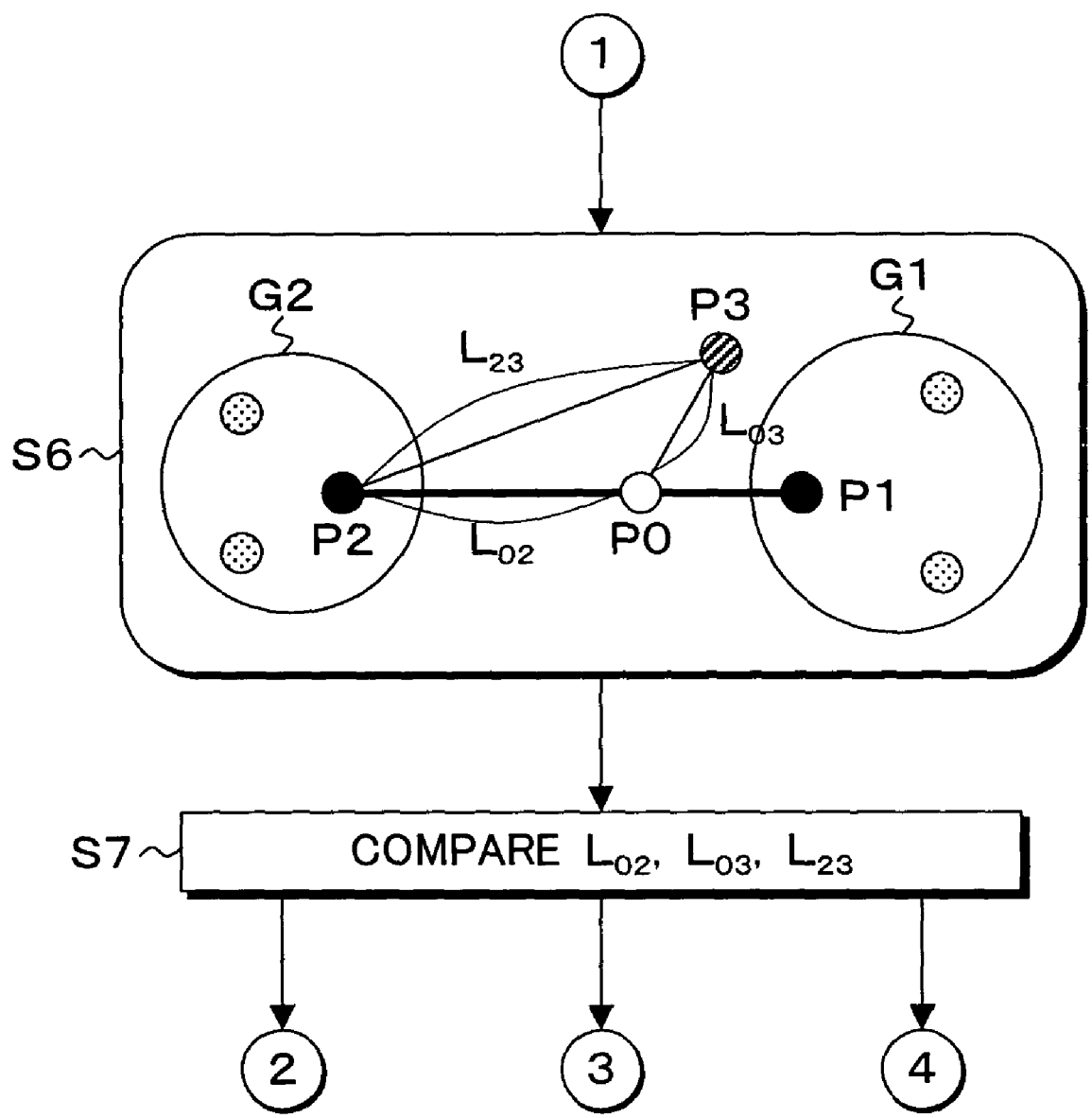
FIG. 9 is an explanatory diagram of the grouping process which is executed between the existing group at the next near position and the new peer and is a sequel to FIG. 8.
Figure 10:
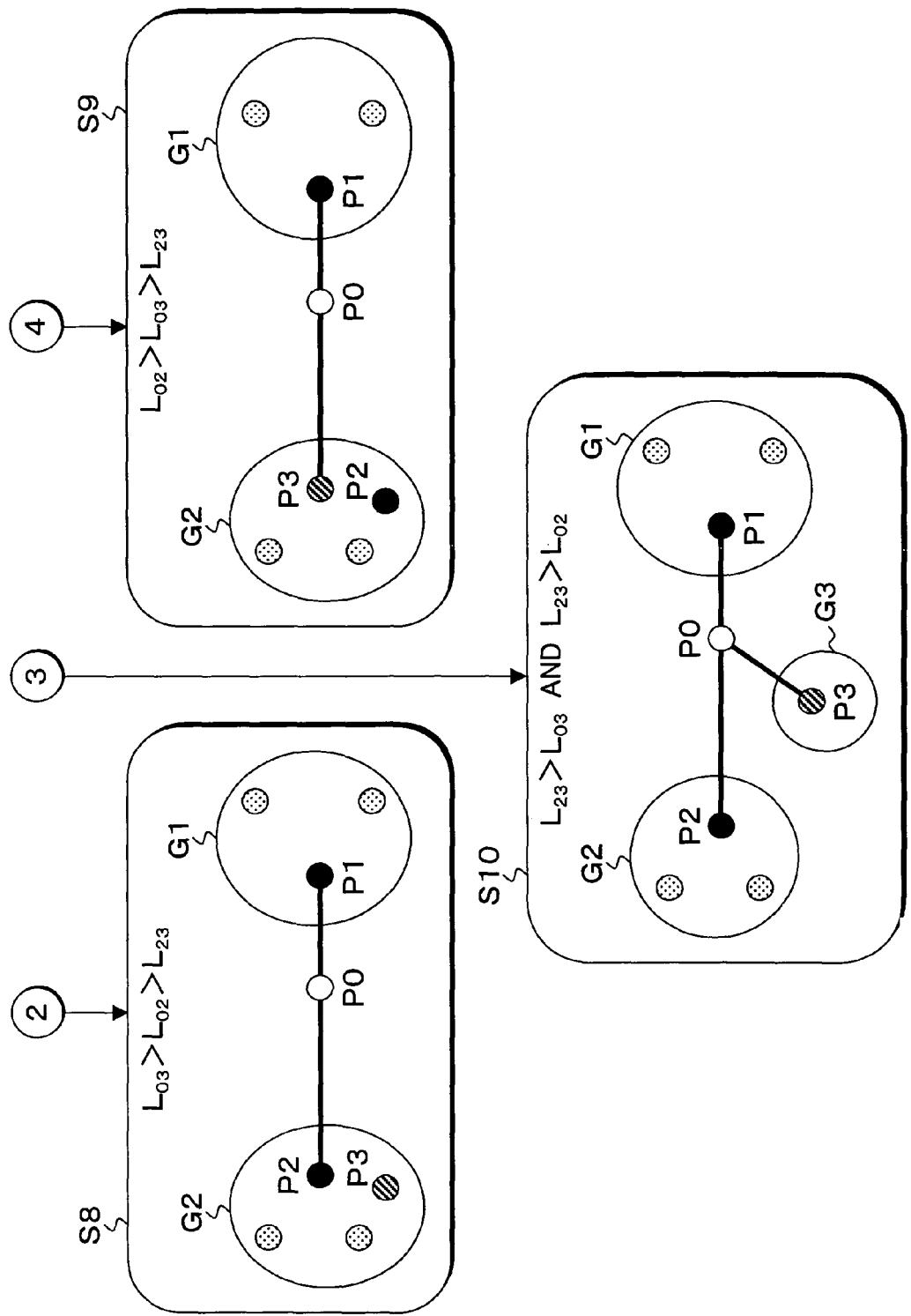
FIG. 10 is an explanatory diagram of the grouping process and is a sequel to FIG. 9.

FIGS. 8, 9, and 10 are explanatory diagrams of the deciding method of the transmission path according to the grouping process in the case where the group G1 of the representative peer P1 and the group G2 of the representative peer P2 have already been formed when seen from the target peer P0 as shown in step S1 and the new peer P3 appears in this state.

When the new peer P3 appears in step S1, the distances $L_{01}$ and $L_{02}$ from the target peer P0 with respect to the representative peers P1 and P2 of the groups G1 and G2 are compared and the representative peer that is nearer to the target peer P0, in this case, the representative peer P1 is selected. Distances $L_{01}$, $L_{03}$, and $L_{13}$ on the network among the three peers of the target peer P0, the existing peer P1, and the new peer P3 are compared in step S2. By the comparison of the distances, if $$L_{03} > L_{01} > L_{13},$$

the new peer P3 belongs to the group G1 of the existing peer P1 as shown in step S3 and the peer P1 is maintained as a representative peer of this group. On the other hand, if $$L_{01} > L_{03} > L_{13},$$

the new peer P3 belongs to the same group G1 as that of the existing peer P1 as shown in step S4. However, the representative peer is exchanged to the new peer P3 from the peer P1. Further, in the cases other than steps S3 and S4, that is, if $$L_{13} > L_{03} \text{ and } L_{13} > L_{01},$$

the processing routine advances to FIG. 9 and the grouping process is executed to the new peer P3 with respect to the representative peer P2 of the next near group G2. In this case, as shown in step S6, distances $L_{02}$, $L_{03}$ and $L_{23}$ on the network among the three peers of the new peer P3, the target peer P0, and the representative peer P2 are obtained. They are compared in step S7. By the comparison of the distances in step S7, if $$L_{03} > L_{02} > L_{23},$$

the new peer P3 belongs to the group G2 of the existing peer P2 as shown in step S8 in FIG. 10 and the peer P2 is maintained as a representative peer. On the other hand, if $$L_{02} > L_{03} > L_{23},$$

the new peer P3 belongs to the same group G2 as that of the existing peer P2 as shown in step S9. However, the representative peer is exchanged to the new peer P3 from the peer P2. Further, in the cases other than steps S8 and S9, that is, if $$L_{23} > L_{03} \text{ and } L_{23} > L_{02},$$

the new peer P3 forms a new different group G3 as shown in step S10 and becomes the representative peer of this group.

Figure 11:
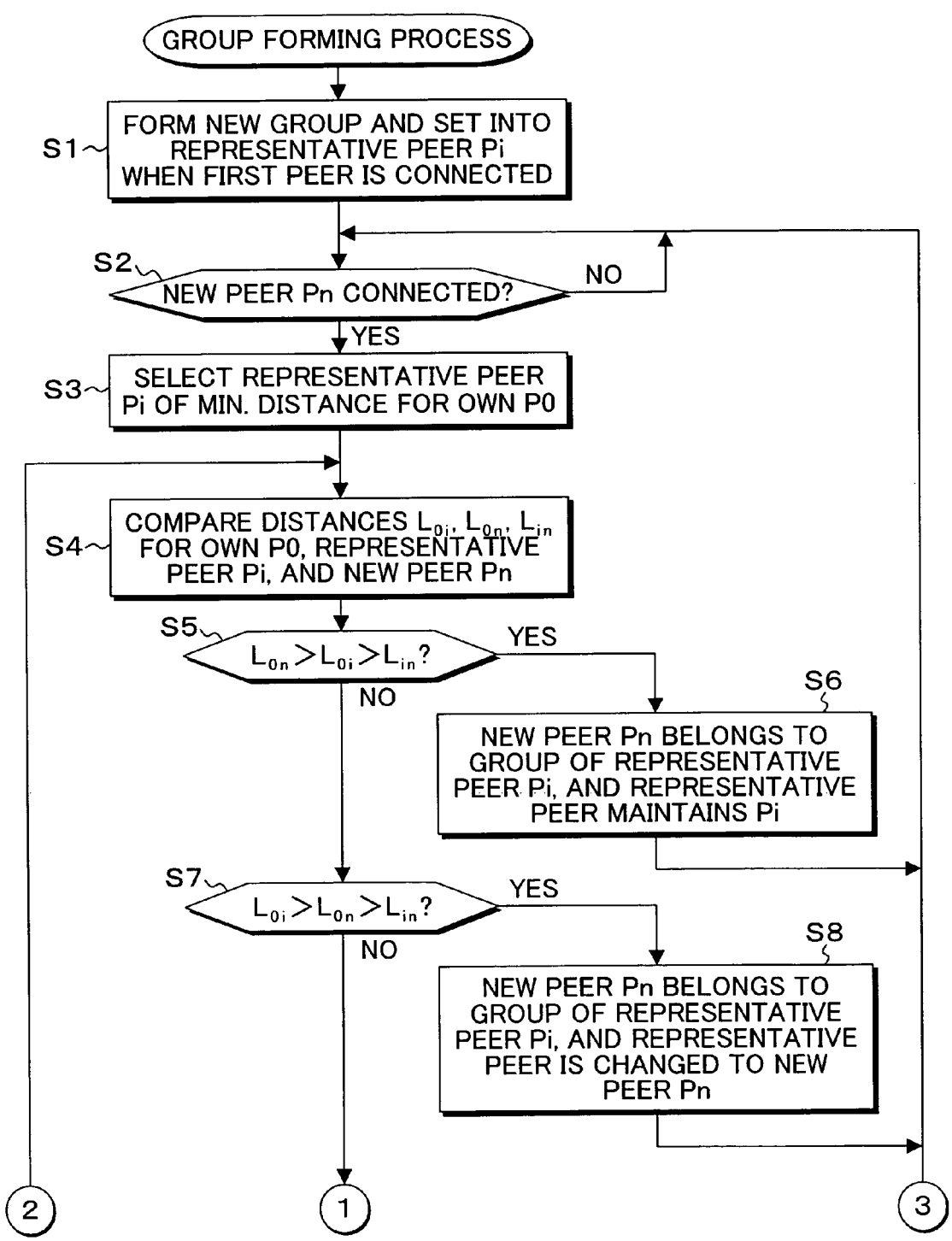
FIG. 11 is a flowchart for a group forming process according to the invention.
Figure 12:
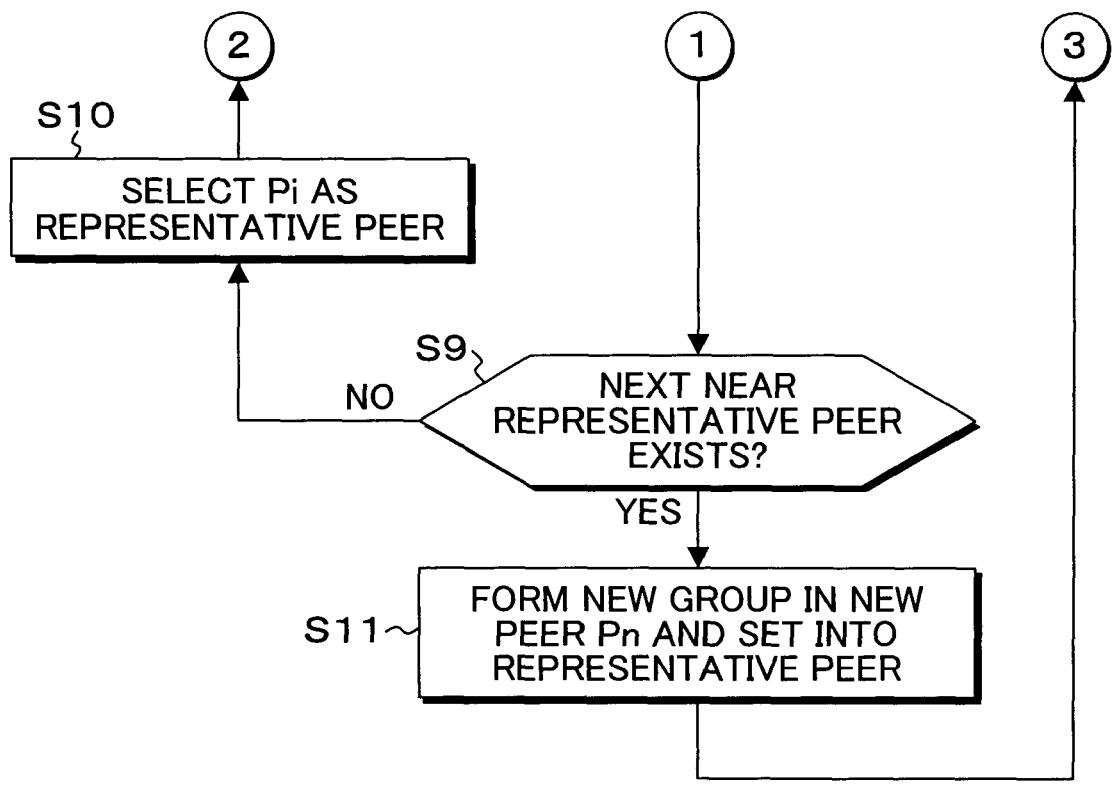
FIG. 12 is a flowchart for the group forming process and is a sequel to FIG. 11.

FIGS. 11 and 12 are flowcharts for the group forming process by the group information forming unit 30 in FIG. 2. First, in step S1, if the first peer P1 is connected to the target peer P0 serving as its own peer, a new group is formed, and this peer is set to a representative peer Pi. Subsequently, if a new peer Pn is connected in step S2, the representative peer Pi of the group whose distance from the target peer P0 serving as its own peer is the minimum is selected in step S3. Distances $L_{0i}$, $L_{0n}$, and $L_{in}$ among the own target peer P0, the representative peer Pi, and the new peer Pn are compared in step S4. If the condition of the distances in step S5 is satisfied, the new peer Pn belongs to the group of the representative peer Pi and the peer Pi is maintained as a representative peer in step S6. If the distance condition in step S5 is not satisfied, a distance condition in step S7 is discriminated. If this distance condition is satisfied, in step S8, the new peer Pn belongs to the group of the representative peer Pi and the representative peer is changed to the new peer Pn. On the other hand, if the distance condition in step S7 is not satisfied, the processing routine advances to step S9 in FIG. 12 and whether or not the representative peer of the next near group exists is discriminated. If it exists, it is selected as a representative peer in step S10 and the processes from step S4 are repeated. If it does not exist, step S11 follows, a new group is formed for the new peer Pn and the new peer Pn is set to the representative peer. The processing routine is returned to step S2 and the system waits for the connection of the next new peer.

Figure 13A:
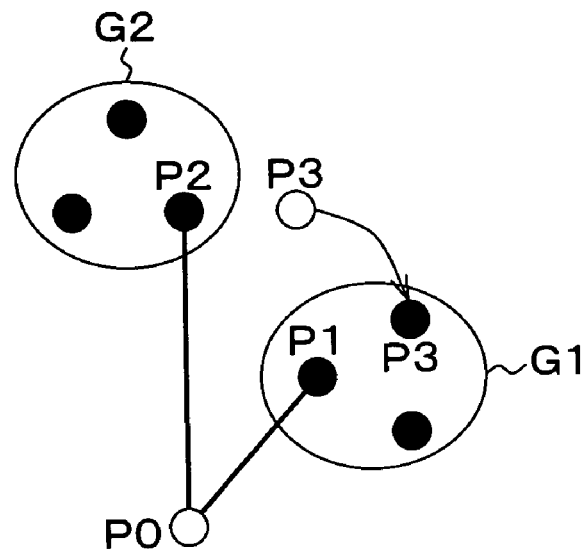
FIGS. 13A-13B are explanatory diagrams for forcedly executing recalculation of the grouping process in response to an inconvenience of dynamic group creation of the invention.
Figure 13B:
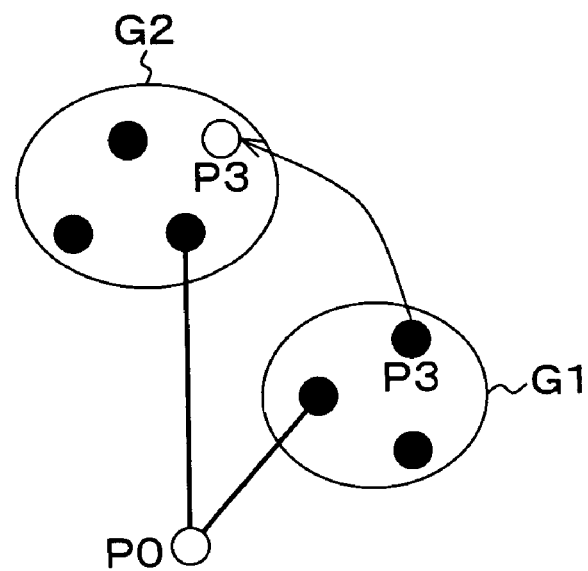

FIG. 13 is an explanatory diagram for forcedly executing recalculation of the grouping process against an inconvenience which occurs in the dynamic group creation according to the flowcharts of FIGS. 11 and 12. Although the method of finding the transmission path by executing the group forming process and deciding the representative peer each time the new peer appears like a group forming process in FIGS. 11 and 12 has such an advantage that the transmission path can be found at a high speed, there is a case where the optimum path cannot be always found in dependence on connecting order of the peers. For example, in the case where the new peer P3 appears in the state where the group G1 of the representative peer P1 and the group G2 of the representative peer P2 were formed when seen from the target peer P0 serving as its own peer as shown in FIG. 13A, the grouping process of this new peer P3 is started while, between the representative peers P1 and P2, the representative peer P1 whose distance from the target peer P0 serving as its own peer is shorter is set to the existing peer, so that this new peer P3 enters the group G1. However, the new peer P3 is close to the group G2 with respect to the distance and it is natural that it belongs to the group G2. Therefore, as shown in FIG. 13B, a process for moving the peer P3 to the group G1 in which the optimum path can be taken after the grouping process was performed once is necessary. In the invention, therefore, it is necessary to use a method whereby after an arbitrary peer is periodically removed from the group to which it belongs at present, the reprocess for grouping according to the flowcharts of FIGS. 11 and 12 is executed again. For the selection of the peer serving as a target of the reprocess in the reprocess for grouping, for example, a method of selecting it by using random numbers., a method whereby the peer which detected that its own peer has been moved requests the reprocess to all peers, or the like can be used.

Further, although the flowcharts of FIGS. 11 and 12 relate to the grouping process in the case where the peer participates in the system and is connected thereto, there is also a possibility that the peer got out of the system and is disconnected therefrom. With respect to the peer disconnected from the system, it is sufficient to simply delete it from the group information so long as it is not the representative of the group. On the other hand, if the disconnected peer is the representative of the group, the group representative disappears. Therefore, all of the peers belonging to this group are released therefrom, the released peers are set to the newly connected peers in the group forming process in FIGS. 11 and 12, and the group forming process for discriminating to which group those peers belong is executed. As a measure against the case where the disconnected peer is the representative of the group, a method whereby the peer in the group whose distance on the network from the representative peer to be deleted is short is upgraded to the new representative peer, or the like can be also used.

Figure 14:
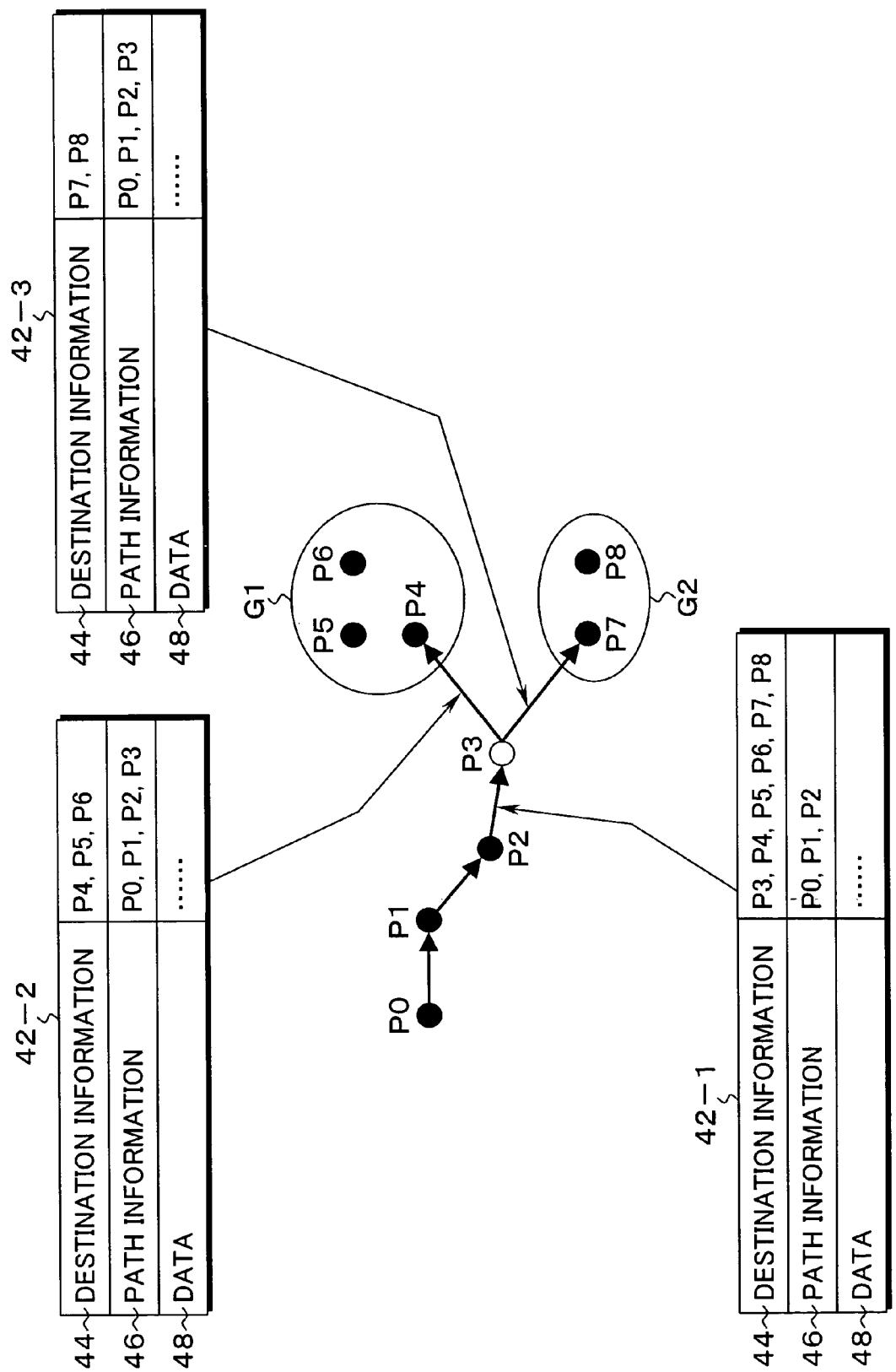
FIG. 14 is an explanatory diagram of destination information and path information which are used in data distribution of the invention.

The distribution information which is used in the data transmitting unit 34 and the data relay unit 35 in FIG. 2 and the data distribution based on such information will now be described. FIG. 14 is an explanatory diagram of a data distributing method using the distribution information according to the invention. FIG. 14 relates to the case where the peer P0 is a transmitting source of the information and the information is transmitted to all of the peers P1 to P8 as destinations. At this time, the distribution information of the peer P0 serving as a transmitting source becomes as shown in distribution information 40-0 in FIG. 15. The information 40-0 is constructed by destination information 44, path information 46, and data 48. The destination peers P1 to P8 are stored in the destination information 44. The peer P0 serving as a transmitting source is stored in the path information 46. Assuming that the data of the distribution information 40-0 from the peer P0 was distributed to the peers P1, P2, and P3 as shown in FIG. 14, the peer P3 receives distribution information 42-1 and forms distribution information 42-2 and 42-3 to be distributed to the representative peers P4 and P7 of the groups G1 and G2. That is, in the distribution information 42-1 which is received by the peer P3, the destination information 44 indicates the peers P3 to P8 and the path information 46 indicates the peers P0 to P2 through which the data has passed so far. As distribution information 42-2 which is transferred from the peer P3 to the representative peer P4 of the group G1, on the basis of the group information held in the peer P3, the peers P4 to P6 are extracted and set with respect to the destination information obtained by deleting the peer P3 itself from the received distribution information 42-1 as a target. In the path information 46, the peer P3 is newly added to the peers P1 and P2 through which the data has passed so far. On the other hand, in the distribution information 42-3 to the representative peer P7 of the group G2, the peers P7 and P8 of the group G2 are set. In the path information 46, the peer P3 is newly added to the peers P0 to P2 through which the data has passed so far.

Figure 16:
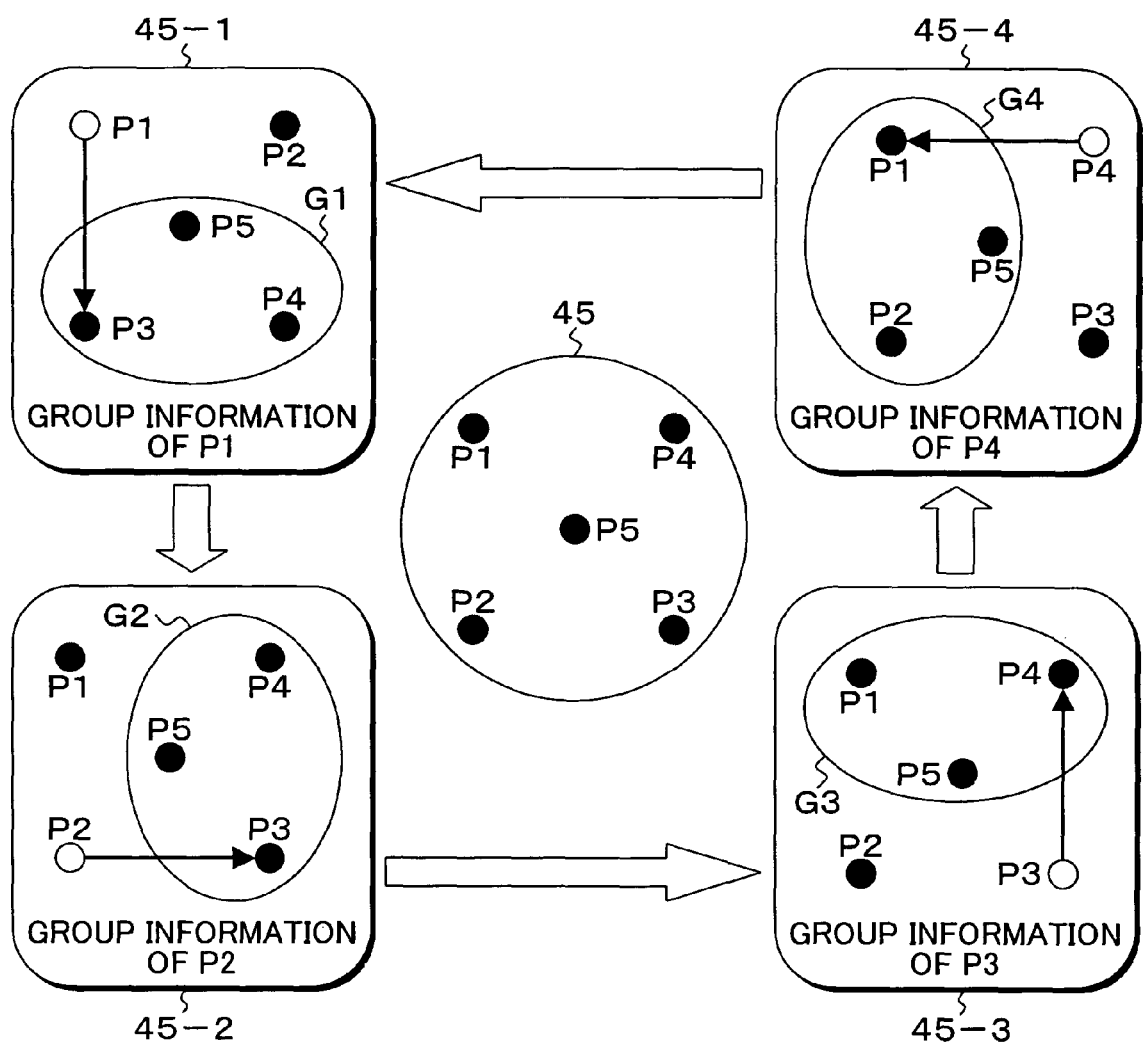
FIG. 16 is an explanatory diagram of a problem which occurs in the case where there is no path information.

The necessity of the path information included in the distribution information of the invention will now be described. FIG. 16 shows a problem in the case where no path information is included in the distribution information. In FIG. 16, it is assumed that the peers P1 to P5 exist as shown in a central network area 45 and the peers P1 to P4 have been grouped as shown in distribution routes 45-1 to 45-4. That is, the peer P1 forms the group G1 by the peers P3 to P5 and distributes the data to the representative peer P3 in accordance with the distribution route 45-1. The peer P2 forms the group G2 by the peers P3 to P5 in accordance with the distribution route 45-2 and distributes the data to the representative peer P3. The peer P3 forms the group G3 by the peers P1, P4, and P5 in accordance with the distribution route 45-3 and distributes the data to the representative peer P4. Further, the peer P4 forms the group G4 by the peers P1, P2, and P5 in accordance with the distribution route 45-4 and distributes the data to the representative peer P1. By forming such transfer routes 45-1 to 45-4 in the peers P1 to P4 as mentioned above, there is also considered a case where if the peers do not have the path information, the information is mutually distributed among the peers P1, P2, P3, and P4 and does not reach the peer P5 permanently. In this case, although there is a problem that the information does not reach the peer P5, further, the data distribution is permanently repeated among the peers P1, P2, P3, and P4 and a load on the peer increases remarkably. Such a problem in FIG. 16 can be solved by allowing the path information to be included in the distribution information. That is, in the case where the data distribution is executed to the peers P1, P2, P3, and P4 in order of the distribution routes 45-1 to 45-4, since the peers P1, P2, P3, and P4 have been formed as path information at the stage of the transfer route 45-4 and only the peer P5 of the destination information remains in this state, the data can be distributed to the last residual destination P5.

Figure 15:
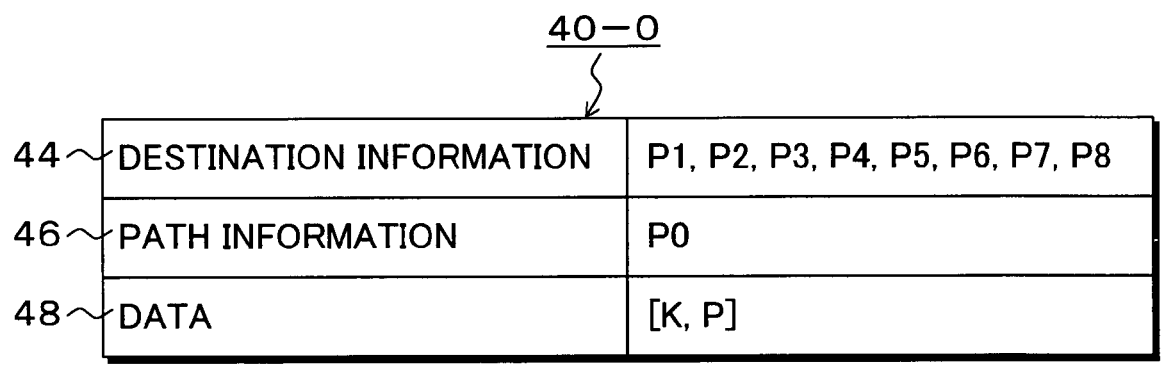
FIG. 15 is an explanatory diagram of distribution information comprising the destination information, path information, and data.
Figure 17:
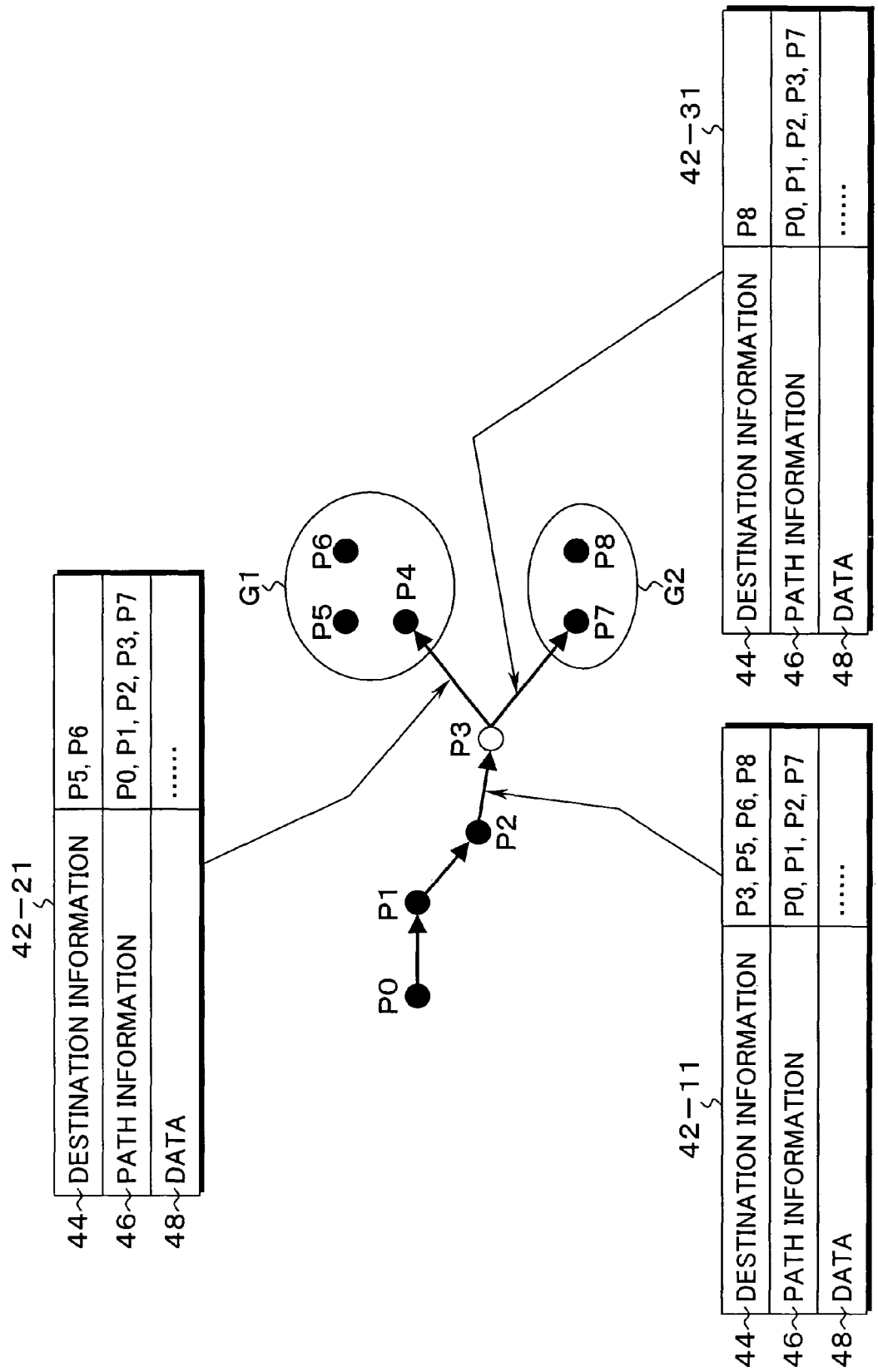
FIG. 17 is an explanatory diagram of another example of destination information and path information which are used in data distribution of the invention.

FIG. 17 shows a data distributing method according to the different destination information regarding the same peers P0 to P8 as those in FIG. 15. In this example, the destination information of distribution information 42-11 received by the peer P3 indicates the peers P3, P5, P6, and P8, the peers P4 and P7 are dropped out, and it will be understood that the data has already been distributed to the peer P7 when seeing the path information. Therefore, although the representative peer of the group G2 when seen from the peer P3 is the representative peer P7, since it will be understood from the path information 46 that data distribution to the representative peer P7 has already been finished, the destination information 44 is set to the peer P8 as distribution information 42-31, the peer P3 is included in the path information, and the information is directly distributed to the peer P8. In the data distribution to the representative peer P4, as distribution information 42-21, the destination information 44 is set to the peers P5 and P6, the peer P3 is included in the path information 46, and the information is distributed to the peers P5 and P6 through the representative peer P4.

Figure 18:
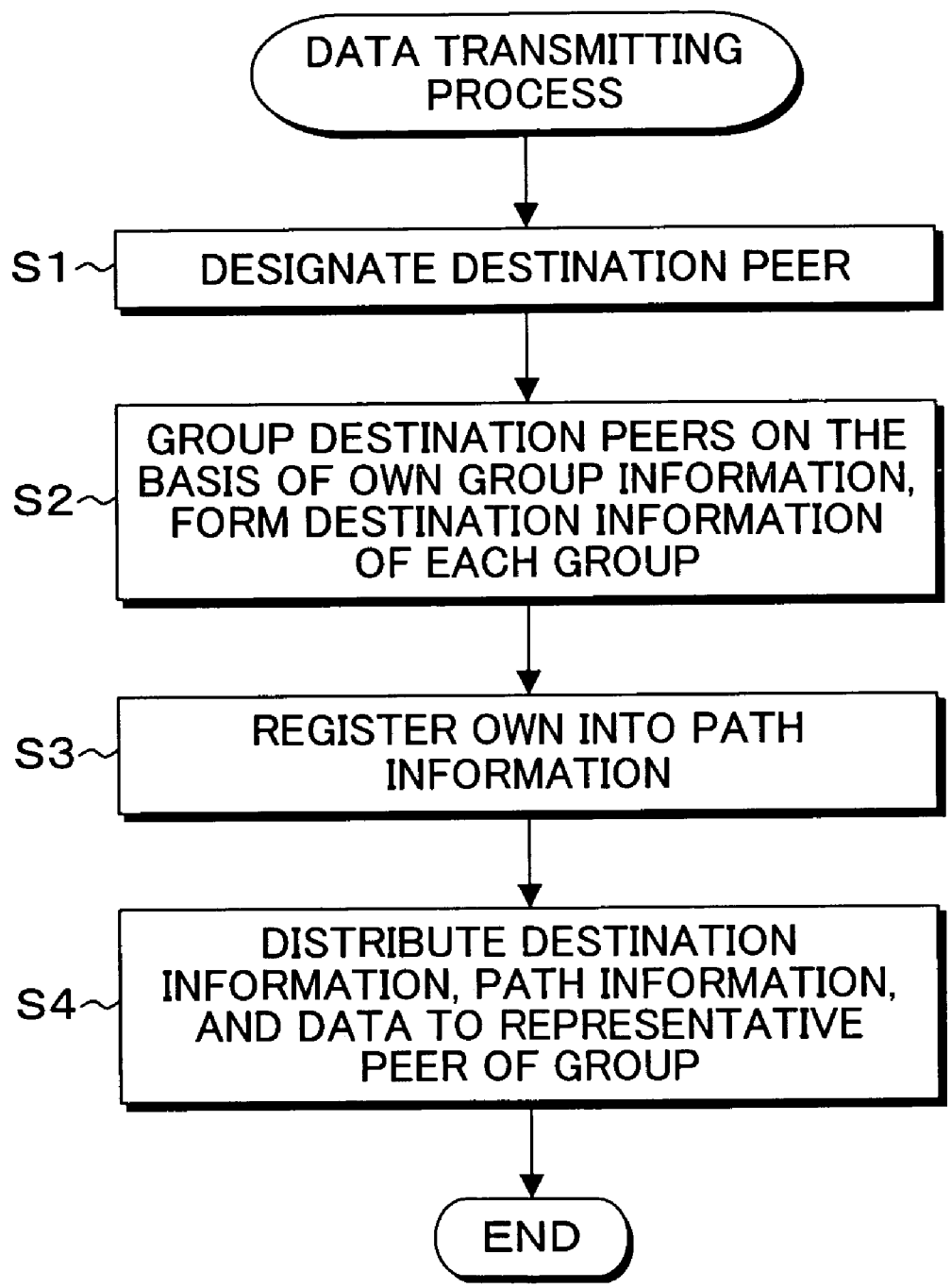
FIG. 18 is a flowchart for a data transmitting process according to the invention.

FIG. 18 is a flowchart for the data transmitting process by the data transmitting unit 34 in FIG. 2. In this data transmitting process, the destination peers are designated in step S1. In step S2, the designated destination peers are grouped on the basis of the own group information and destination information of each group is formed. Subsequently, the own peer is registered into the path information in step S3. After that, the distribution information in which the destination information, the path information, and the data formed every group have been added is distributed to the representative peer of the group in step S4.

Figure 19:
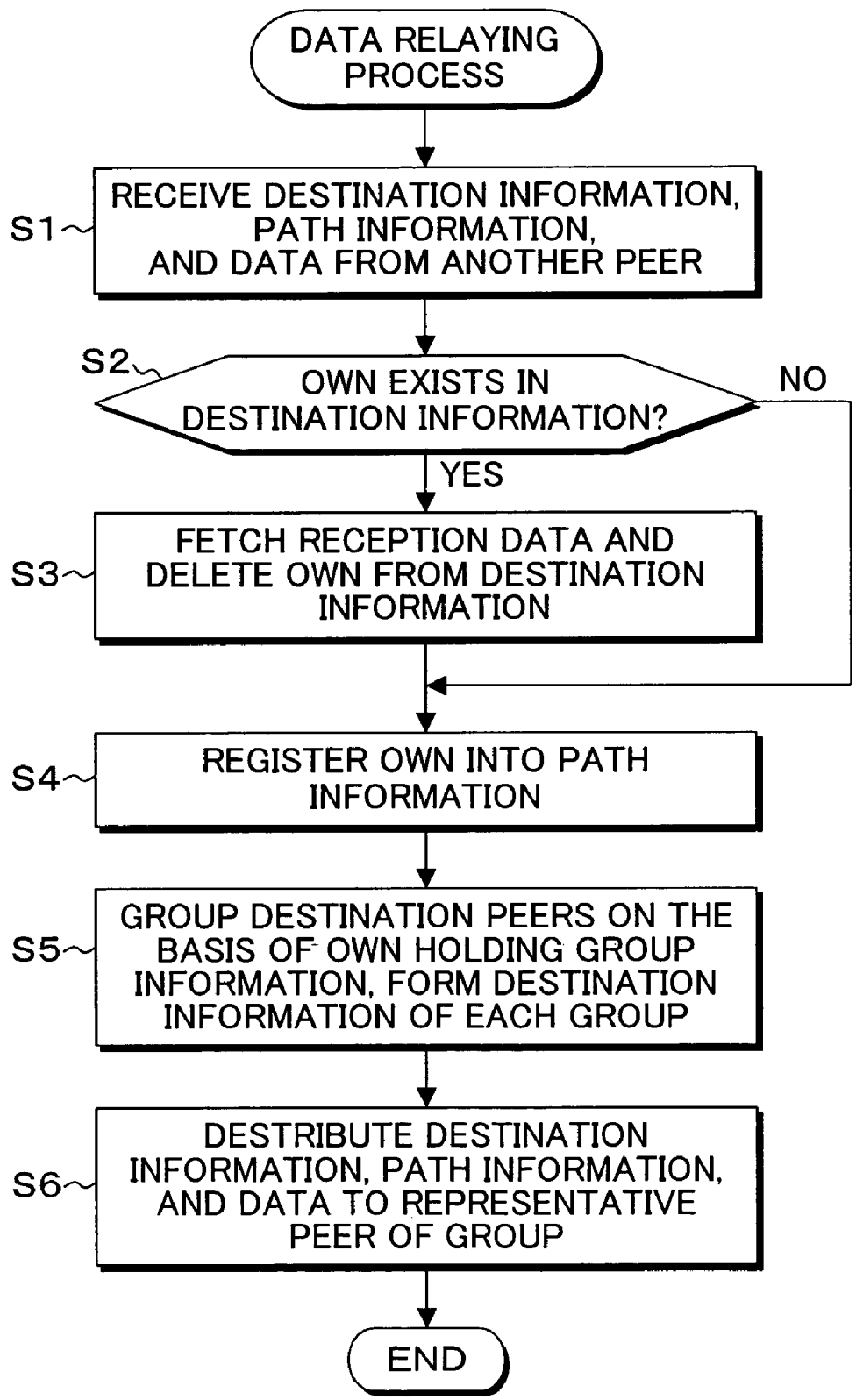
FIG. 19 is a flowchart for a data relaying process according to the invention.

FIG. 19 is a flowchart for the data relaying process by the data relay unit 35 in FIG. 2. In this data relaying process, when the destination information, the path information, and the data are received from another peer in step S1, whether or not the own peer exists in the destination information is discriminated in step S2. If it exists, the reception data is fetched and the own peer is deleted from the destination information in step S3. If the own peer does not exist in the destination information in step S2, the fetching of the reception data in step S3 is not executed. Subsequently, the own peer is registered in the path information in step S4. After that, the destination peers are grouped on the basis of the group information possessed in the own peer and the destination information of each group is formed in step S5. The destination information, the path information, and the data are distributed to the representative peer of the group in step S6. Naturally, if the data has already been distributed to the representative peer of the group in step S6, the data is directly distributed to the peer serving as a destination of the group.

Proxy Peer

Figure 20A:
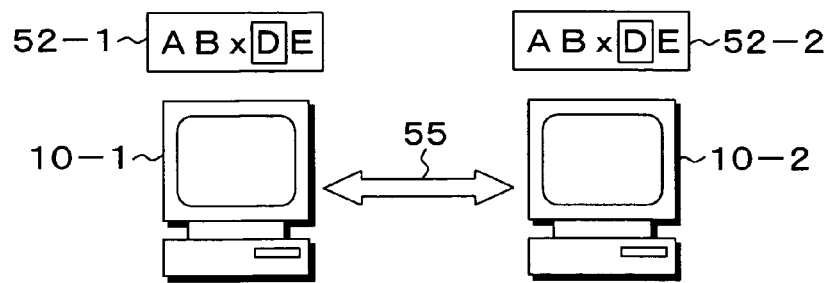
FIGS. 20A-20D are explanatory diagrams of a problem due to a data sharing method in the case where a peer of the data distribution destination side does not operate.
Figure 20B:
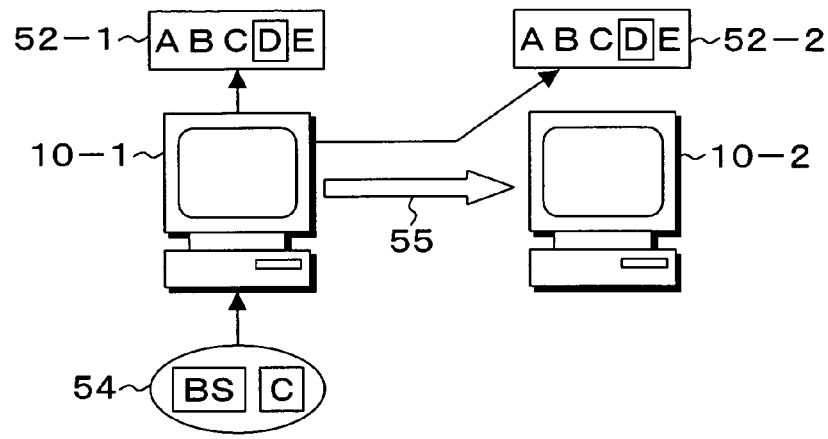
Figure 20C:
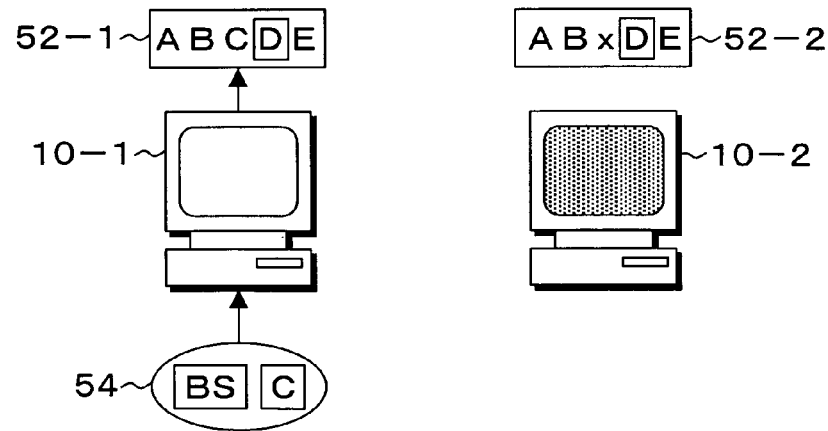

The proxy peer which is used in the communication system of the peer-to-peer type as a target of the invention will now be described. FIG. 20 shows a data sharing method in the collaboration in the case where no proxy peer exists. First, as shown in FIG. 20A, it is assumed that the peers 10-1 and 10-2 possessed shared data 52-1 and 52-2 each comprising a text file and the like. In this state, in the peer 10-1, a cursor is set to "D" in the shared data 52-1 and a "back space key (hereinafter, abbreviated to "BS")" is operated as a key input 54 as shown in FIG. 20B. After that, a key "C" is operated and "C" is inserted to a position before the cursor of the shared data 52-1. When such an updating operation of the shared data 52-1 in the peer 10-1 is executed, updating data 55 is sent from the peer 10-1 to the peer 10-2. The updating data 55 is key control data of the BS key and the C key which were executed as a key input 54. In response to it, the operation to insert "C" to a position before the cursor of the shared data 52-2 is executed in the peer 10-2. The uniqueness of the shared data 52-1 and 52-2 of the peers 10-1 and 10-2 is guaranteed. However, as shown in FIG. 20C, when the key input 54 to operate the C key subsequent to the BS key is executed in the peer 10-1, if the peer 10-2 has been stopped due to the power-off, even if the shared data 52-1 in the peer 10-1 is updated, the shared data 52-2 of the stopped peer 10-2 is not updated.

Figure 20D:
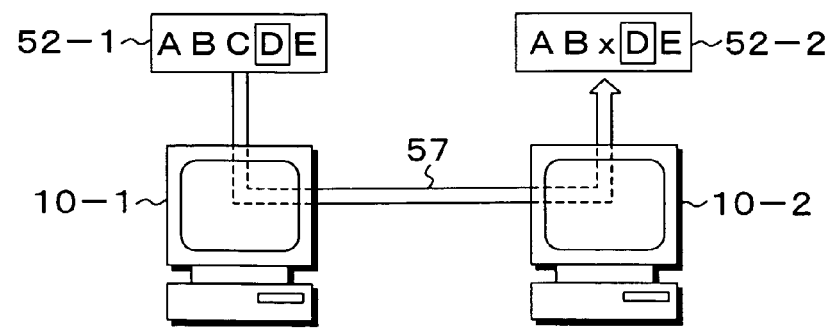

Therefore, as shown in FIG. 20D, when the peer 10-2 is activated after that and participates in the collaboration, it receives shared data transfer 57 for getting all of the shared data 52-1 from the shared data 52-1 possessed by the peer 10-1 and overwrites the shared data 52-2, thereby holding the consistency. Naturally, when the peer 10-2 is activated in FIG. 20D, the updating data as key control data showing the operation contents of the key input 54 can be received from the peer 10-1. However, in the case where the number of peers is large and each peer repeats the connection and disconnection, it is not practical to discriminate up to which updating data all of the peers have received and execute the processes in the cases other than the case where the distances on the network are short. In the method whereby, as shown in FIG. 20D, when the peer 10-2 stopped due to the power-off is activated, it receives the shared data 52-1 possessed by the peer 10-1 at this time from the peer 10-1 and overwrites it onto its own shared data 52-2, there are the following problems.

(1) When an amount of data of the collaboration increases, it takes a time to receive the data.
(2) When the peer 10-2 participates in the collaboration, the peer 10-1 has to participate in the collaboration.

In the invention, therefore, as shown in FIGS. 1 and 2, the proxy peer 12 is provided in the communication system of the peer-to-peer type, while the specific peer is stopped due to the power-off, the proxy peer 12 receives the transfer information from another peer and stores it, and when the peer which was stopped due to the power-off participates, the stored data is sent from the proxy peer 12, thereby updating the shared data.

Figure 21A:
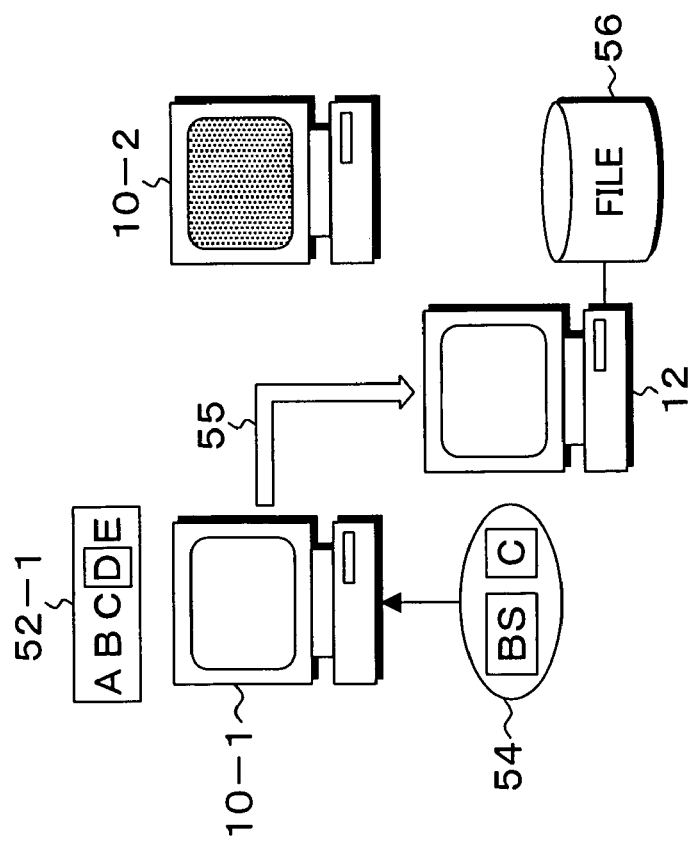
FIGS. 21A-21B are explanatory diagrams of a data buffering method according to the proxy peer of the invention.
Figure 21B:
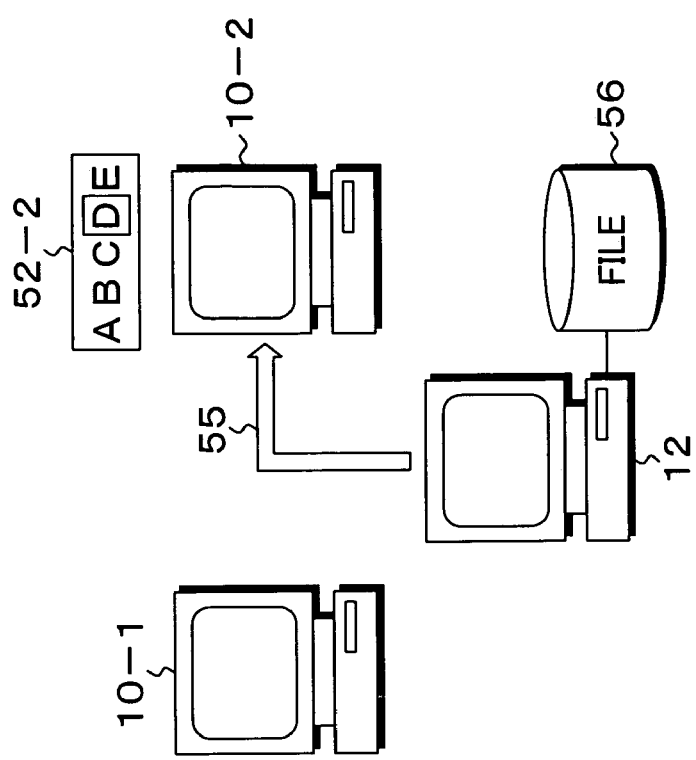

FIG. 21 is an explanatory diagram of a processing method of the proxy peer in the invention. In FIG. 21A, it is assumed that the proxy peer 12 is provided for the peers 10-1 and 10-2 and the key input 54 to press the C key subsequent to the BS key is executed in the peer 10-1 in the state where the power source of the peer 10-2 was turned off. In this case, the updating data 55 from the peer 10-1 to the peer 10-2 is distributed to the proxy peer 12 and buffered into a file 56. After that, as shown in FIG. 21B, when the power source of the peer 10-2 is turned on and the peer 10-2 is activated and participates in the collaboration, the proxy peer 12 sends the updating data 55 from the peer 10-1 buffered in the file 56 to the activated peer 10-2 and updates shared data 52-2 by the updating data 55. Thus, the uniqueness of the shared data 52-1 of the peer 10-1 and the shared data 52-2 of the peer 10-2 which was temporarily stopped due to the power-off can be guaranteed.

Figure 22:
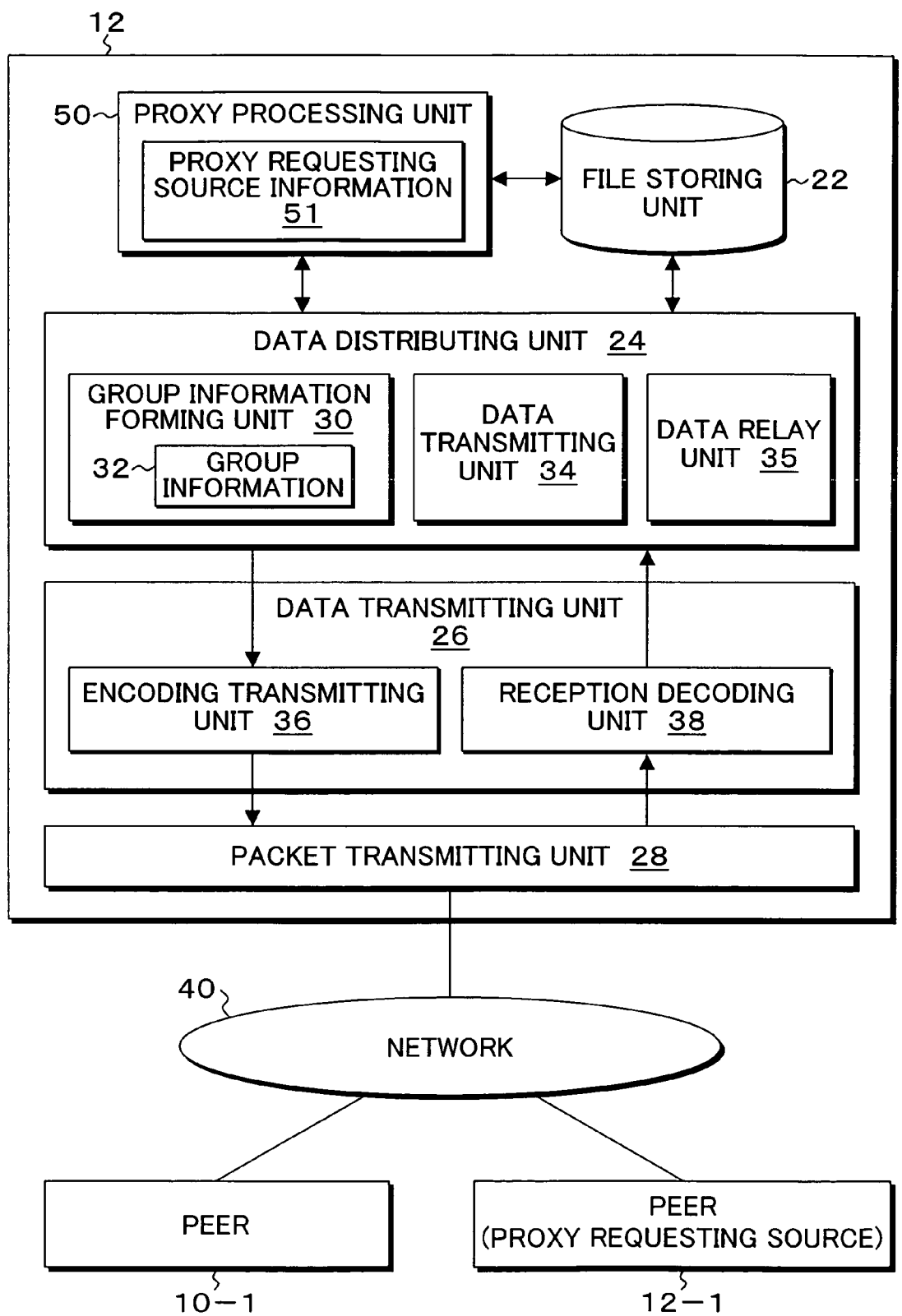
FIG. 22 is a block diagram of a functional construction of a proxy peer which is used in the invention.

FIG. 22 is a block diagram of a functional construction of the proxy peer 12 which is used in the invention. The proxy peer 12 differs from the peer 10-0 in FIG. 2 with respect to a point that a proxy processing unit 50 is provided. Proxy requesting source information 51 is provided for the proxy processing unit 50. A peer 12-1 which makes proxy has been registered in the proxy requesting source information 51. Although the number of peers which make proxy is fundamentally equal to one, a plurality of peers can be registered as proxy requesting sources as will be clearly explained hereinafter. Constructions and functions of the other data distributing unit 24, data transmitting unit 26, and packet transmitting unit 28 are the same as those in the embodiment of FIG. 2.

Figure 23:
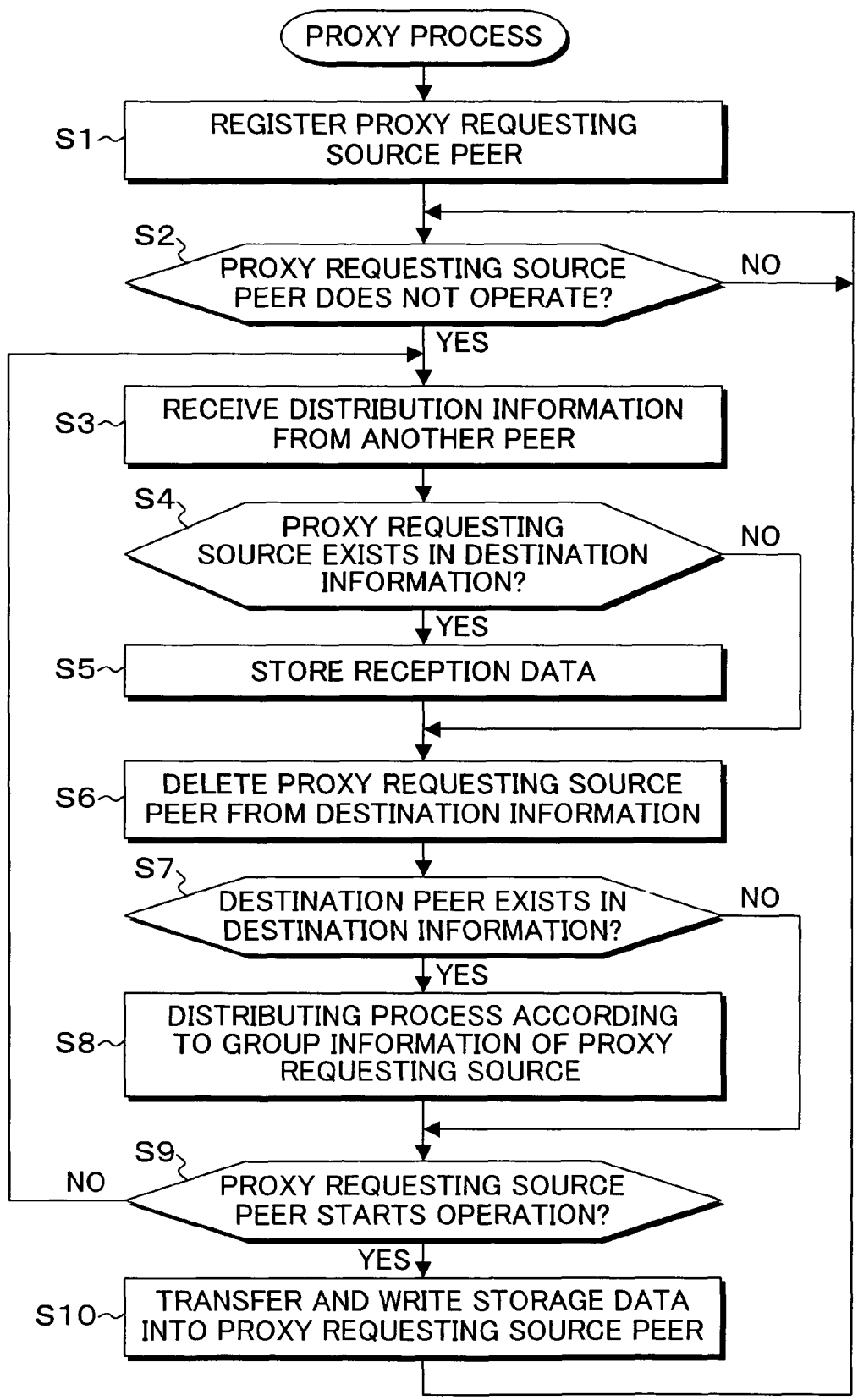
FIG. 23 is a flowchart for a proxy process by the proxy peer of the invention.

FIG. 23 is a flowchart for a proxy process of the proxy peer 12 in FIG. 22. First, in step S1, a proxy requesting source peer is registered. After that, whether or not the proxy requesting source peer is not operating is discriminated in step S2. When it is recognized that the proxy requesting source peer is not operating due to the power-off or the like, when the distribution information from another peer is received in step S3, whether or not the proxy requesting source exists in the received destination information is discriminated in step S4. If it exists, the reception data is stored in step S5. Subsequently, the proxy requesting source peer is deleted from the destination information in step S6. After that, if the destination peer remains in the destination information in step S7, a distributing process according to the group information of the proxy requesting source is executed in step S8. If the destination peer does not exist in the destination information, the distributing process according to the group information in step S8, that is, the information distribution to the representative peers of other groups is not executed.

Subsequently, whether or not the proxy requesting source peer has started the operation is discriminated in step S9. If it does not start the operation, the processes from step S3 are repeated. If it is determined in step S9 that the proxy requesting source peer has started the operation, step S10 follows. The stored data is transferred to the proxy requesting source peer and written therein.

Figure 24B:
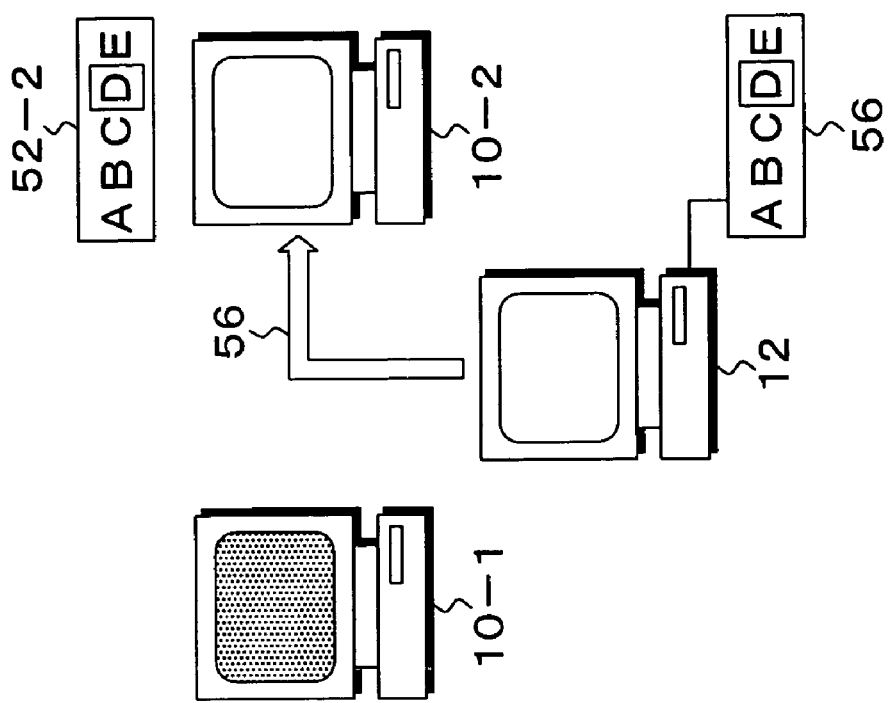
FIGS. 24A-24B are explanatory diagrams of a data sharing method by the proxy peer of the invention.
Figure 24A:
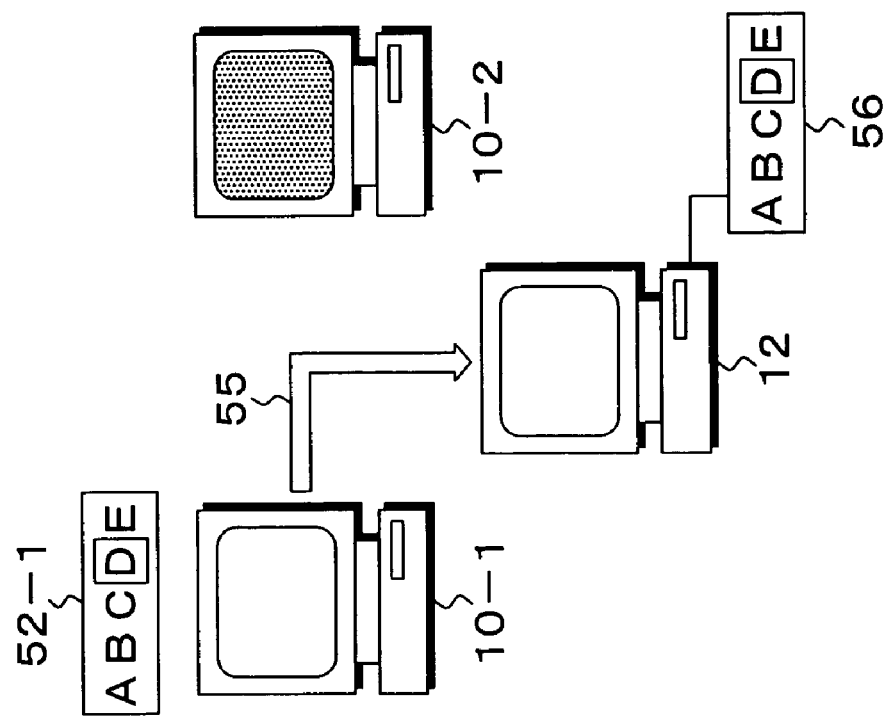

FIG. 24 shows another embodiment of the processing method by the proxy peer in the invention. In this embodiment, the shared data is held in the proxy peer and this shared data is updated by the updating data and sent to the proxy requesting source. In FIG. 24A, the proxy peer 12 is provided for the peers 10-1 and 10-2 and the peer 10-2 is stopped due to the power-off. In this case, the proxy peer 12 has the same shared data 56 as the shared data 52-1 of the peer 10-1. When the operation such as a key input or the like is executed in the peer 10-1, the updating data 55 associated with it is distributed to the proxy peer 12 and the shared data 56 is updated on the basis of the updating data 55. After that, when the peer 10-2 is activated and participates in the collaboration as shown in FIG. 24B, the proxy peer 12 sends the shared data 56 possessed by itself to the activated peer 10-2 and overwrites the shared data 52-2 which had been held, thereby assuring the uniqueness of the shared data. Although the peer 10-1 is stopped due to the power-off at this time, the proxy peer 12 receives the updating data in the peer 10-2 after that and updates the shared data 56. When the peer 10-1 is activated, the proxy peer 12 similarly sends the shared data 56 and overwrites. Such a data sharing method whereby the proxy peer 12 holds the shared data, and the proxy peer 12 sends it to the peer activated after the power is turned off and overwrites in FIG. 24 is suitable for the case where the proxy peer 12 exists in the near position where the distances on the network from the proxy peer 12 to the peers 10-1 and 10-2 are short. On the contrary, when the distances on the network are long, a data sharing method whereby the updating data showing the contents of the key input is buffered by the proxy peer and transferred to the activated peer as shown in FIG. 21 is suitable.

FIG. 25 shows another embodiment of the data sharing method by the proxy peer in the invention. In this embodiment, one proxy peer makes proxy for a plurality of peers. In FIG. 25A, the proxy peer 12 makes proxy for the peers 10-1 to 10-5, only the peer 10-1 among them is operating, and the peers 10-2 to 10-5 are stopped due to the power-off or the like. Therefore, the updating data 55 of the shared data in the peer 10-1 is sent to the proxy peer 12 and buffered. FIG. 25B shows the state where the stopped peer 10-3 is activated and participates in the collaboration. The proxy peer 12 transmits the buffered updating data 55 to the activated peer 10-3 and updates the shared data in the peer 10-3. As a proxy peer in the invention, the proxy peer of each group in the data distributing method according to the grouping process can be purposely set to the proxy peer. This is because, generally, an old computer is recycled and used as a personal computer which is used as a proxy peer, there are not any other operations to be executed in many cases, and a possibility that the proxy peer is disposed in a good network environment is high. Therefore, by purposely setting the proxy peer to the representative peer of the group, the representative peer in which it is presumed that the load is concentrated by the data distribution of the peer-to-peer type is also used as a proxy peer, so that a burden which is caused since the proxy peer in the ordinary peer is selected can be reduced. As a method of setting the proxy peer to the representative peer of the group, it is possible to use a method whereby the proxy peer is unconditionally set to the group representative, a method whereby a minus offset is added to the distance on the network of the proxy peer and, when the distance on the network is measured, the proxy peer is inevitably selected as a group representative, or the like. In the method of adding the minus offset to the distance of the proxy peer, for example, it is also possible to construct in such a manner that in the case where the proxy peer has been disposed in a position of an inferior network environment, by adding a plus offset with respect to this proxy peer, it is not selected as a proxy peer on the contrary.

FIG. 26 shows a problem in which even if a proxy peer is provided for the communication system of the peer-to-peer type, the uniqueness of the shared data of each peer cannot be guaranteed. In FIG. 26A, the proxy peer 12 is provided for the peers 10-1 and 10-2 and the peer 10-2 is stopped due to the power-off. When the operation of the back space key is executed as a key input 54-1 to the peer 10-1 in this state, updating data 55-1 is sent to the proxy peer 12 and buffered into a file 56-1. Subsequently, as shown in FIG. 26B, it is assumed that the proxy peer 12 is stopped due to the power-off or the like at timing when the operation of the C key is executed as a key input 54-2 and the updating data associated with the key input 54-2 cannot be buffered into the file 56-1. There is a case where such a stop of the proxy peer 12 is caused by a communication impossible state due to a failure or the like of a router on the network, a power failure, or the like. When the proxy peer 12 and the peer 10-2 are activated as shown in FIG. 26C after the stop of the proxy peer 12 as mentioned above, only the buffered updating data 55-1 is sent from the file 56-1 of the proxy peer 12, that is, only the updating data corresponding to the key input 54-1 in the peer 10-1 in FIG. 26A is sent to the peer 10-2 and updates the shared data 52-2. However, since the updating data associated with the key input 54-2 in FIG. 26B is missing, the shared data 52-1 of the peer 10-1 and the shared data 52-2 of the peer 10-2 do not coincide. To avoid such dissidence of the shared data at the time of the stop of the proxy peer due to the communication impossible state or the power-off as mentioned above, in the invention, a plurality of proxy peers are provided as shown in FIGS. 27 and 28.

Figures 27A, 27B:
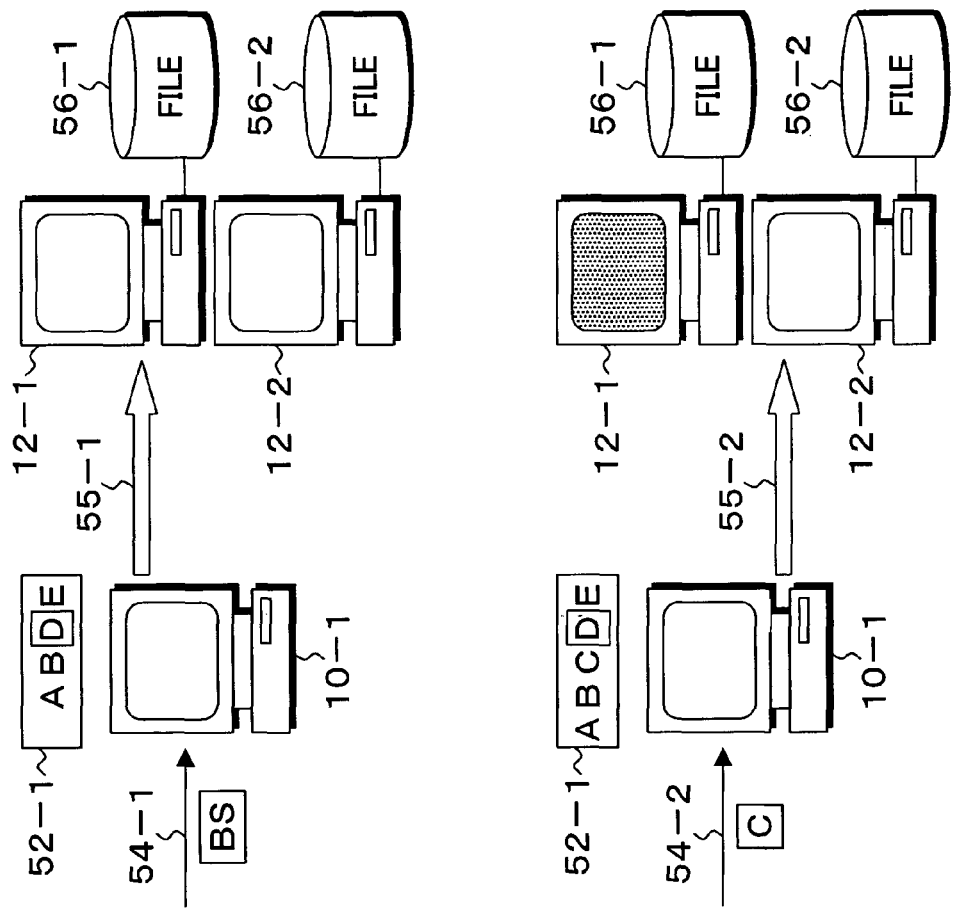
FIGS. 27A-27B are explanatory diagrams of a data distributing method in the case where a plurality of proxy peers are arranged.

In FIG. 27A, two proxy peers 12-1 and 12-2 are provided for the peers 10-1 and 10-2. In this case, the peer 10-2 is stopped due to the power-off and the updating data 55-1 from the peer 10-1 to the peer 10-2 has been buffered in the file 56-1 of the peer 12-1. Assuming that the proxy peer 12-1 has been stopped due to the power-off in this state as shown in FIG. 27B, the updating data 55-2 by the key input 54-2 is sent to the proxy peer 12-2 and buffered into a file 56-2. After that, assuming that the proxy peer 12-1 and the peer 10-2 have been activated by the power-on as shown in FIG. 28C, the updating data 55-1 corresponding to the key input 54-1 is sent from the proxy peer 12-1 to the peer 10-2. The updating data 55-2 corresponding to the key input 54-2 is sent from the proxy peer 12-2 to the peer 10-2. The shared data 52-2 of the peer 10-2 is normally updated and can be made coincident with the shared data 52-1 of the peer 10-1. As another data sharing method by the proxy peers in the invention, the following methods can be used.

(1) By adding updating time to each of the updating data 55-1 and 55-2 which is sent to the proxy peers 12-1 and 12-2 in FIGS. 27 and 28, it is enabled to easily merge the data in the peer 10-2.

(2) In the case where a plurality of proxy peers are provided, the updating data is sent to all of the proxy peers.

(3) When a part of a plurality of proxy peers are stopped and activated after that, communication is made among the proxy peers and the updating data is mutually communicated, thereby allowing all of the proxy peers to have the same updating data.

(4) A plurality of proxy peers are allowed to have the shared data in place of the updating data.

FIG. 29 is an explanatory diagram of a data sharing method of maintaining the consistency of the shared data among the peers without providing a plurality of proxy peers. FIG. 29A shows the state where the proxy peer 12 was activated after the power source of the proxy peer 12 had been turned off before in a manner similar to FIG. 26C, that is, the state where the updating data 55-1 held in the proxy peer 12 is sent to the peer 10-2 and updates the shared data 52-2. However, since the proxy peer 12 does not have the updating data of the key input 54-2 in FIG. 26B at this time, the shared data 52-1 of the peer 10-1 and the shared data 52-2 of the peer 10-2 do not coincide. Therefore, as shown in FIG. 29B, a check sum comparing process 60 to compare a check sum 58-1 of the shared data 52-1 and a check sum 58-2 of the shared data 52-2 is executed between the peers 10-1 and 10-2, thereby recognizing dissidence of the check sums. The shared data 52-1 is sent from the peer 10-1 to the peer 10-2 and overwritten onto the shared data 52-2 as shown in FIG. 29C. Data of each of the check sums 58-1 and 58-2 themselves is ordinarily equal to a few to tens of bytes and extremely smaller than that of the shared data. A load on the process for discriminating the coincidence or dissidence of the shared data is sufficiently small. By the verification of the shared data by the comparison of the check sums, the uniqueness of the shared data in each peer can be certainly guaranteed without providing a plurality of proxy peers.

High-Speed Data Transmitting Method

Figure 30:
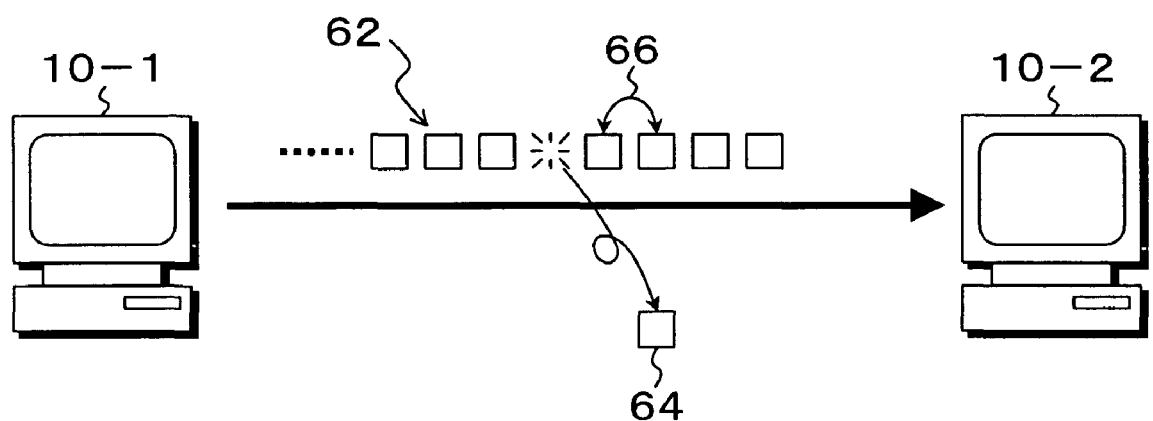
FIG. 30 is an explanatory diagram of packet extinction and exchange which is caused in the data transmission of the invention.

A method of the high-speed communication of the data by the encoding transmitting unit 36 and the reception decoding unit 38 in the data transmitting unit 26 provided for the peer 10-0 in FIG. 2 will now be described. FIG. 30 shows an outline of ordinary network communication (IP communication) and data is transferred from the peer 10-1 to the peer 10-2. In the data transfer, the data is usually divided into small units of packets 62 each consisting of about 1500 bytes and transmitted. However, according to the nature of the network, there is a possibility that extinction 64 in which a certain packet is extinguished or exchange 66 in which the order of the packets is changed occurs on the transfer path. In the network communication (IP communication), there are two kinds of communication such as UDP communication in which such extinction or exchange is permitted and TCP communication in which the packets are numbered and, when the packet does not reach, it is retransmitted. The TCP communication is generally made for the communication such as data transfer or the like in which the high reliability is required. However, in the TCP communication, there is such a problem that since the reliability of the data is assured, if the distance on the network becomes long, RTT (Round Time Trip) as a reciprocating time of the data increases and a valid communication speed decreases.

Figure 31B:
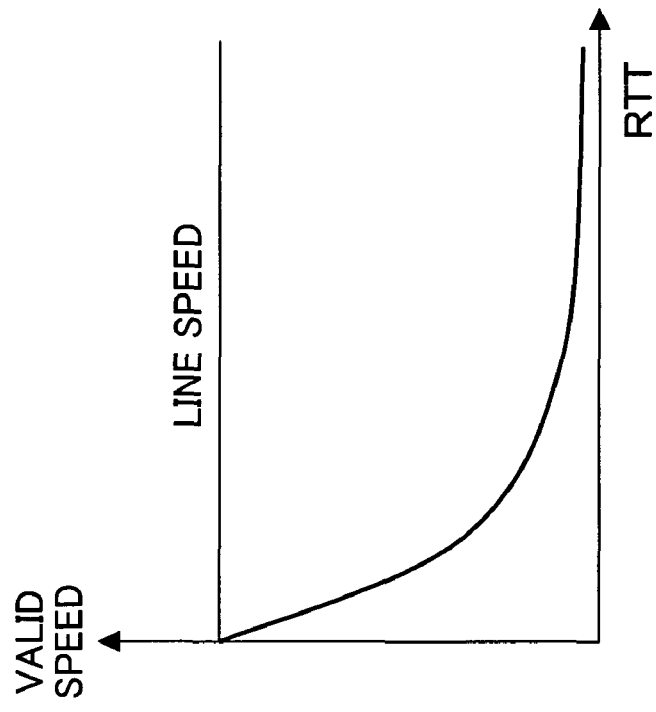
FIGS. 31A-31B are explanatory diagrams of a problem in the TCP communication.
Figure 31A:
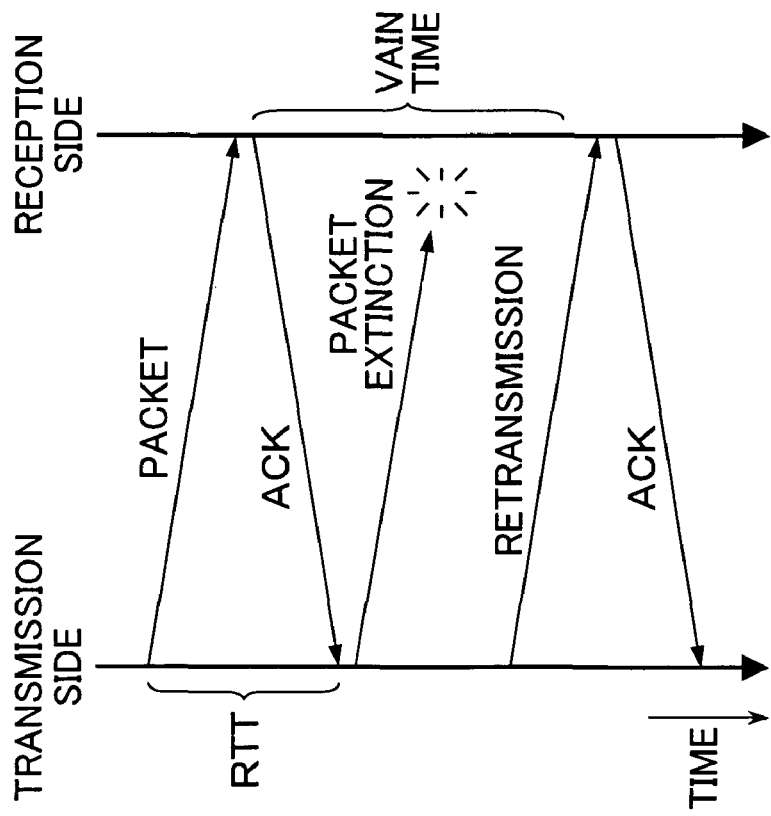

FIG. 31A shows the TCP communication. When the packet is transmitted from the transmission side, the reception side returns a reception acknowledgment signal called ACK. When the transmission side confirms the arrival of the packet by the reception acknowledgment signal ACK, it transmits the next packet. When the packet is extinguished on the way, since the reception acknowledgment signal ACK is not returned, the same packet is retransmitted for a predetermined period of time. Therefore, in the TCP communication, as shown in FIG. 31B, when the RTT increases, a vain time occurs, a valid speed decreases as compared with a predetermined line speed, and the inherent speed of the line cannot be made the most of. To solve such a problem, a protocol called "Vegas" or "Reno" of the TCP time has been examined.

Figure 32:
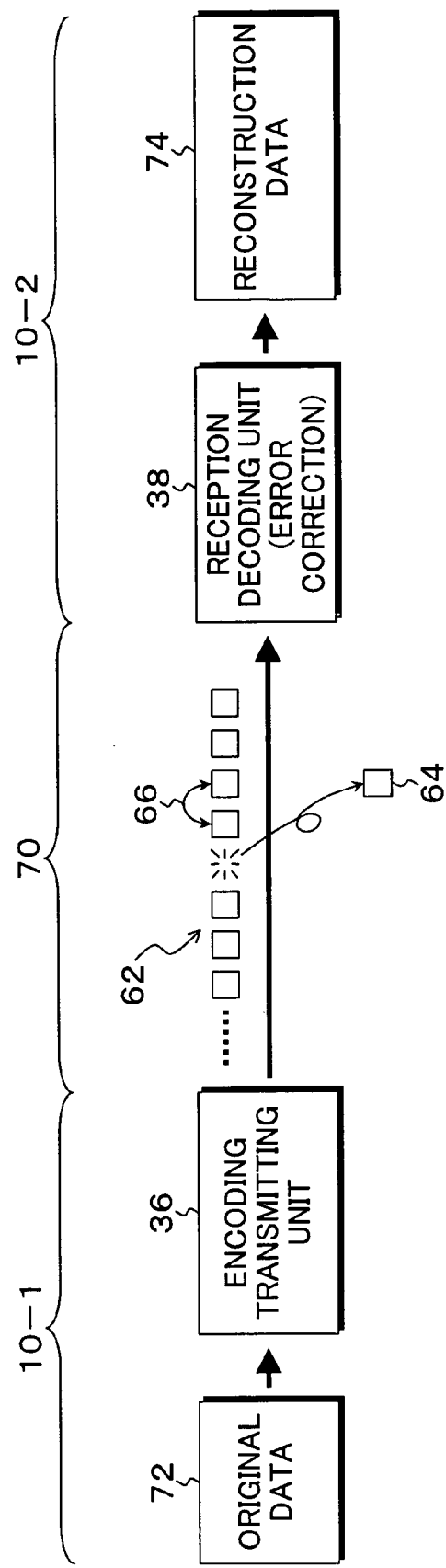
FIG. 32 is an explanatory diagram of a data transmitting method by the UDP communication and data correction according to the invention.

In the invention, therefore, as shown in FIG. 32, the packet transfer by the UDP communication is used, the data is encoded and transmitted by the transmission side, thereby enabling errors to be corrected on the reception side. In FIG. 32, in the transmission side peer 10-1, original data 72 is encoded by the encoding transmitting unit 36 and transferred as a packet 62 to a transmission path 70. In the reception side peer 10-2, even if the extinction 64 or exchange 66 occurred on the transmission path 70, reconstruction data 74 can be obtained by the error correction by the reception decoding unit 38. Thus, the high-speed communication by the UDP communication is made and the data is encoded on the transmission side and decoded on the reception side against the packet extinction or exchange, thereby guaranteeing the reliability of the data by the error correction.

Figure 33:
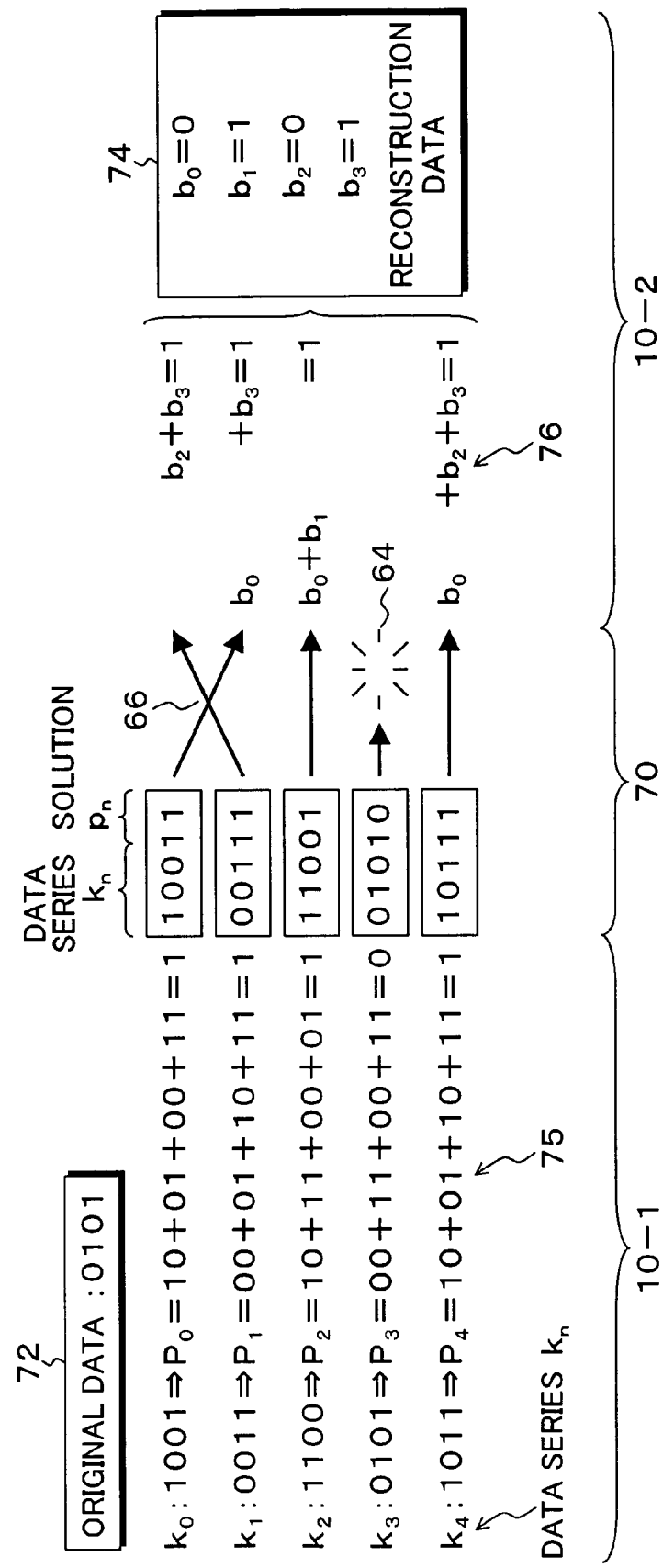
FIG. 33 is an explanatory diagram in which the data transmitting method of the invention using the solving method of the simultaneous equations according to the Boolean algebra is shown with respect to the transmission of 4-bit data as an example.

FIG. 33 shows a principle of the data communicating method of a high speed and high reliability according to the invention with respect to the transfer of data of m=4 bits as an example. The data transmitting method of the invention is based on the solving method of the simultaneous equations according to the Boolean algebra. Now, assuming that the original data 72 to be transferred is m-bit data $(b_0, b_1, b_2, b_3)$, solutions $P_n = p_0, p_1, p_2, p_3, \ldots, p_{n-1}$ of simultaneous equations $$b_0 k_{n0} + b_1 k_{n1} + b_2 k_{n2} + b_3 k_{n3} = P_n \quad (1)$$

where, n: integer of m or more n=0, 1, 2, . . .

are obtained by using $(k_{n0}, k_{n1}, k_{n2}, k_{n3})$ as a data train $K_{nm}$ of proper m bits and n series. Sets of the data train $K_{nm}$ and the solutions $P_n$ of the simultaneous equations are continuously transmitted as packets $K_p$. That is, the n packets $K_p = (K_0 p_0, K_1 p_1, K_2 p_2, \ldots, K_n p_3)$ are transmitted. On the reception side, the original data $(b_0, b_1, b_2, b_3)$ of m bits are reconstructed by solving the simultaneous equations by substituting a data train $K_{nm}$ $(k_{n0}, k_{n1}, k_{n2}, k_{n3})$ of m bits obtained from the received packets $K_p = (K_0 p_0, K_1 p_1, K_2 p_2, \ldots, K_n p_3)$ and the solutions $P_n = (p_0, p_1, p_2, p_3)$ into the equations (1). The example of FIG. 31 relates to the case where binary data 0101 of m bits is transmitted as original data 72. At this time, $k_0$=1001
$k_1$=0011
$k_2$=1100
$k_3$=0101
$k_4$=1011 are determined as a data train $K_n$. An encoding process 75 is executed by substituting the original data 72 and the data train $K_n$ into the simultaneous equations (1). The encoding process 75 obtains the solutions $P_n = (p_0, p_1, p_2, p_3, p_4)$ by adding the AND of each term. When sets of the data train $K_n$ and the solutions $P_n$ obtained by the encoding process 75 by the encoding for obtaining the solutions of the simultaneous equations are assumed to be the packets $K_0 p_0$, $K_1 p_1$, $K_2 p_2$, $K_3 p_3$, and $K_4 p_4$, respectively, and they are transferred to the peer 10-2 on the reception side as shown on the transmission path 70. It is now assumed that, for example, the exchange 66 has occurred in the first and second packets on the transmission path 70 and the extinction 64 has occurred in the fourth packet. In the peer 10-2 on the reception side, there is executed a decoding process 76 for forming simultaneous equations in which a data bit corresponding to bit 1 in the data train $K_n$ of the reception packets $K_0 p_0$, $K_1 p_1$, $K_2 p_2$, $K_3 p_3$, and $K_4 p_4$ is validated and a data bit corresponding to bit 0 is deleted and solving those equations. By solving the four simultaneous equations formed by the decoding process 76, the reconstruction data 74 of 4-bit data $(b_0, b_1, b_2, b_3) = (0101)$ can be obtained. In the calculation of the simultaneous equations (1) corresponding to the encoding process 75 in the peer 10-1 on the transmission side, since it is sufficient to merely calculate the AND of each bit bn and the data train $K_n$ in the Boolean algebra and count the number of 1, that is, check parity bits, they can be solved at a very high speed by a computer. Also in the process for solving the simultaneous equations in the peer 10-2 on the reception side, they can be solved at a very high speed by using the exclusive OR (XOR). The encoding process 75 and the decoding process 76 in the invention can be easily realized by hardware in an electronic circuit as well as by a program processing of a computer. Although the above embodiment has been described with respect to the small data such as 4-bit data for simplicity of explanation, generally, the bit number of 8 bits, 16 bits, 32 bits, or 64 bits is used as the number of bits which provides the high reliability as a computer. It is now assumed to be m bits. Although the solutions $P_n$ of the simultaneous equations of one bit have been used for the data train $K_n$ of m bits in the transfer packets, a proper integer j can be used. In this case, an amount of data which can be transferred is equal to (jm) bits. In this case, the equations (1) are modified as follows.

$$b_0 k_{n0} + b_1 k_{n1} + \ldots + b_{m-1} k_{nm-1} = P_{n0} \quad (2)$$
$$b_m k_{n0} + b_{m+1} k_{n1} + \ldots + b_{2m-1} k_{n2m-1} = P_{n1}$$
$$\vdots$$
$$b_{(j-1)} k_{n0} + b_{(j-1)m+1} k_{n1} + \ldots + b_{jm-1} k_{njm-1} = P_{nj-1}$$

Figure 34:
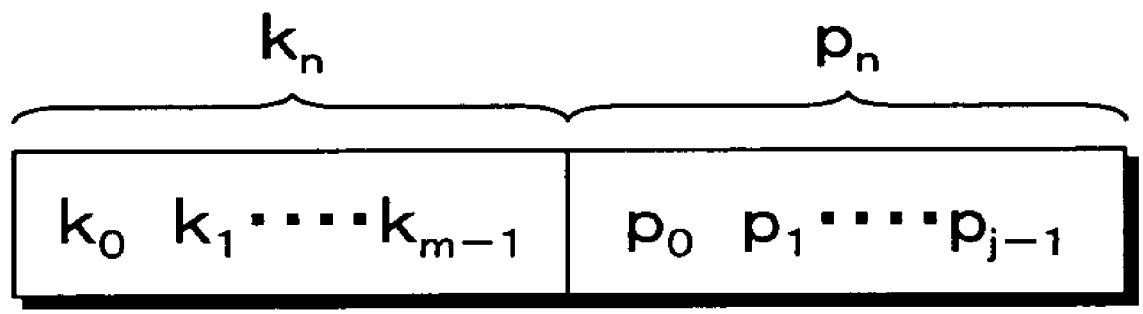
FIG. 34 is an explanatory diagram of a format of a general form of encoding data which is transmitted according to the invention.

FIG. 34 shows a format of the data packets which are sent by the data transmitting method of the invention. That is, one data packet has a combination of the data train $K_n$ and the solutions $P_n$ obtained by substituting the data train $K_n$ into the simultaneous equations.

Figure 35:
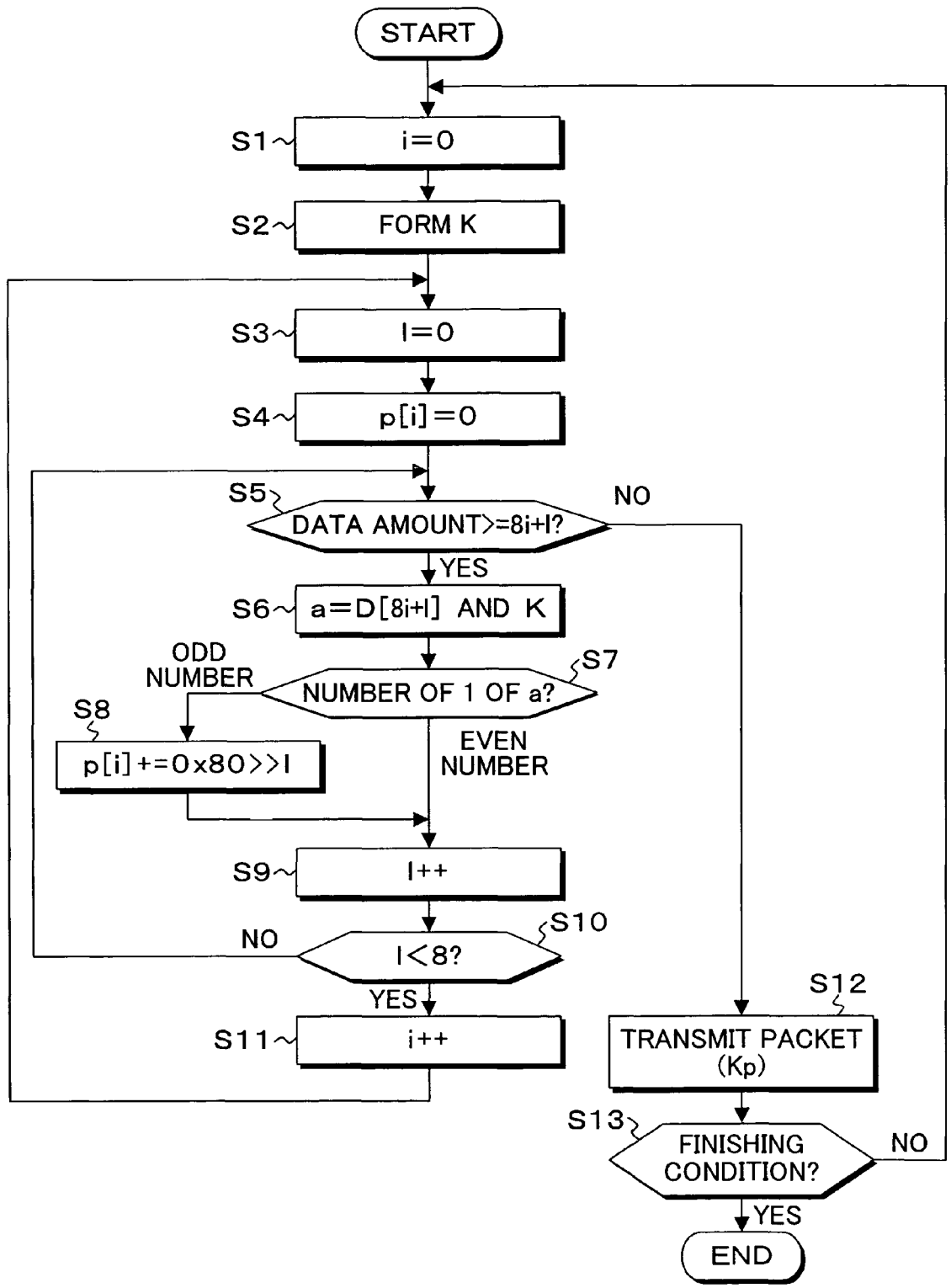
FIG. 35 is a flowchart for an encoding process of the invention with respect to 8-bit data as a target.

FIG. 35 is a flowchart for the encoding process by the encoding transmitting unit 36 provided in the data transmitting unit 26 in FIG. 2. In the encoding transmission, until a finishing condition is satisfied, K is formed and encoding data is formed on the basis of K and sent to the partner side.

Figure 36:
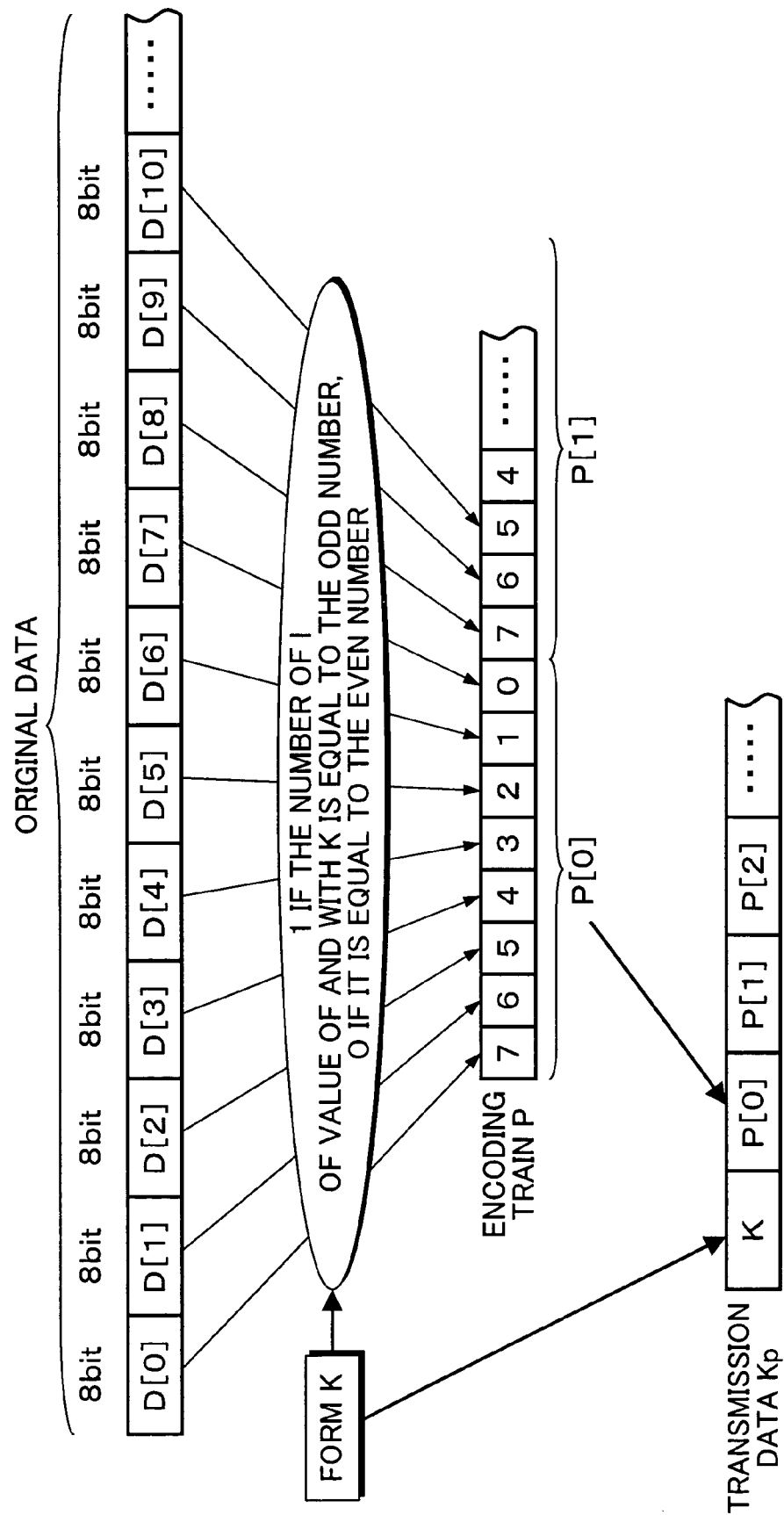
FIG. 36 is an explanatory diagram of an outline of a decoding process according to the invention.

FIG. 36 shows an outline of the decoding process. First, the original data is divided every 8 bits (1 byte) and the AND of the 8-bit data and the formed data train K is calculated. If the number of 1 of the calculated AND is equal to an even number, 0 is arranged and if it is equal to an odd number, 1 is arranged in order to an encoding train P. The data obtained by adding K to the encoding train P becomes transmission data (transmission packet) Kp.

The encoding process in the flowchart of FIG. 35 will now be described with respect to the case of encoding data of 16 bytes as an example (00 01 02 03 04 05 06 07

08 09 0a 0b 0c 0d 0e 0f)

(1) First, steps S1 to S3 just after the start of the process relate to an initializing operation. It is now assumed that the data train K is equal to 55 (01010101 as a binary number) for convenience of explanation.

(2) Step S4 also relates to a part of the initializing operation. This process is merely executed here to prevent 0 from being substituted in the case where the number of 1 is equal to the even number in step S7.

(3) Step S5 relates to discrimination of the data amount. Since the data amount is equal to 16 bytes and both "i" and "l" are equal to 0 at present, the processing routine advances to step S6.

(4) In step S6, the AND of the data train K and the data is calculated and substituted into a variable "a". Since $8i+1=0$ at present and D[0] (the 0th data among the data) is equal to 00, a=55 and D[00]=00.

(5) In step S7, the number of 1 of the AND of "a" and the data is counted. Since the AND of "a" and the data is equal to 00 and the number of 1 is equal to 0, that is, an even number at present, the processing routine advances to step S9.

(6) In steps S9 and S10, 1 is added to "l" and whether or not the value of the resultant "l" is less than 8 is discriminated. Thus, "1" is equal to 1 and less than 8. Therefore, the processing routine is returned to step S5.

(7) In subsequent step S6, a=K and D[1]=55 and 01=01. It is expressed by 00000001 as a binary number and since the number of "1" is equal to an odd number, the processing routine advances to step S8.

(8) ">>" in step S8 denotes a notation of C Language and indicates a right shift command. Specifically speaking, 80 as a hexadecimal number (10000000 as a binary number) is shifted to the right. Since "l" is equal to 1 at present, by shifting the data train to the right once, it becomes 01000000 as a binary number (40 as a hexadecimal number) and is added to p[i]. However, since "i" is equal to 0 at present by step S1 and p[0] is also equal to 0 by step S4, p[0]=40.

(9) It is assumed that l=7 by repeating such a loop of steps S5 to S10 and the processing routine has reached step S9 (p[0] is equal to 01011010 at present and equal to 5a as a hexadecimal number). Since "l" is equal to 8 in step S9, the processing routine advances to step S11, "i" is equal to 1, and the processing routine advances to step S3.

(10) In steps S3 and S4, "l" is equal to 0 and p[1] is also equal to 0.

(11) Since "i"=1 and "l"=0 at present, the discrimination of the data amount of step S5 is skipped. In step S6, a=K and D[8]=55 and D[8]=00.

(12) Since the number of 1 is equal to the even number, the processing routine does not pass through step S8 but p[1]=00 is held.

(13) Similarly, by repeating a loop of steps S5 to S10, p[1]=5a is obtained at last.

(14) At this stage, the discriminating answer about the data amount of step S5 is NO. Since K=55 according to the above process (1), p[0]=5a according to the above process (9), and p[1]=5a according to the above process (13), a packet "55 5a 5a" is sent by step S12.

(15) If the finishing condition is not satisfied in step S13 after that as well, the initialization is performed in step S1, a new data train K is formed, and the encoding is executed by using this data train K.

Figure 37:
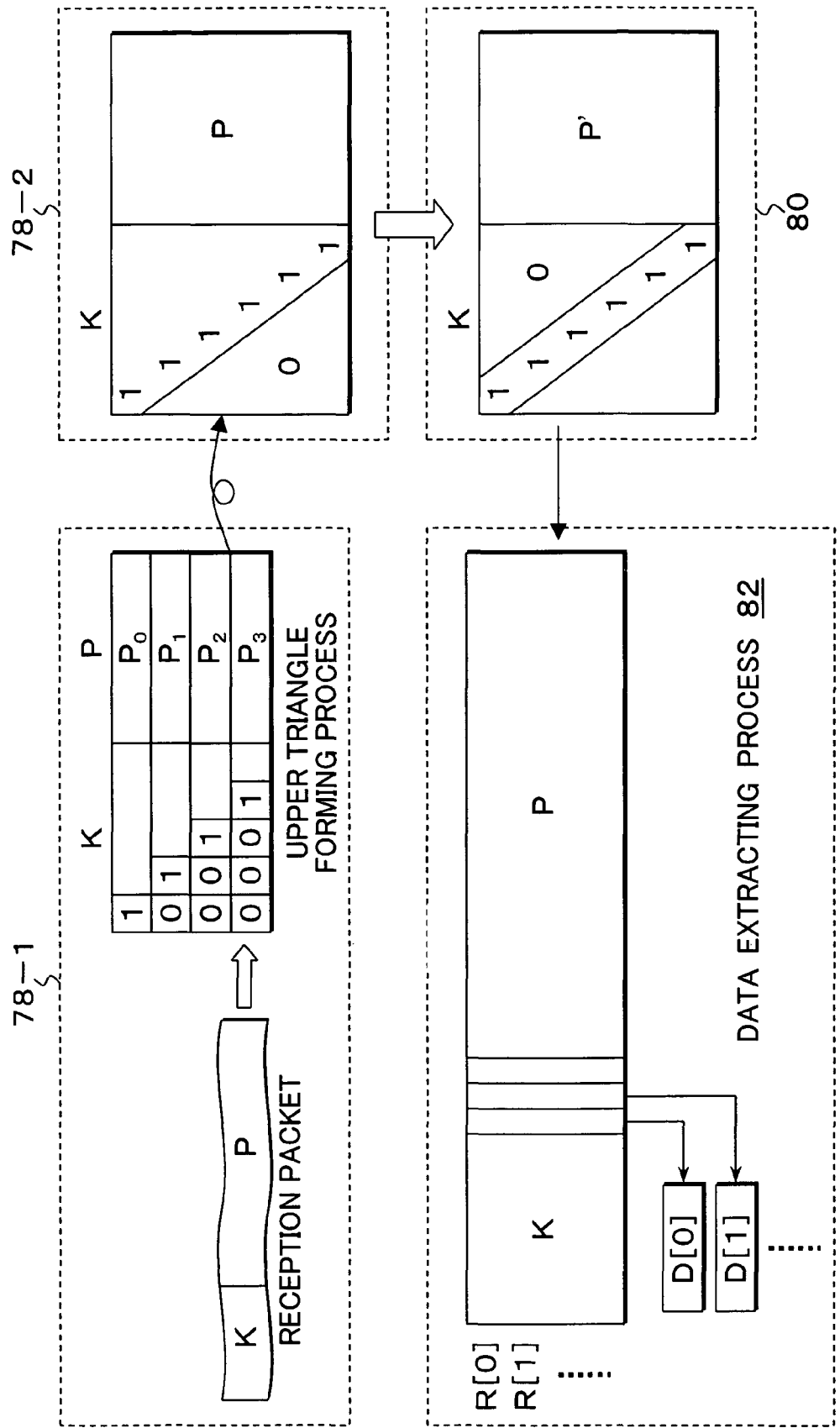
FIG. 37 is an explanatory diagram of a fundamental concept of a decoding process based on the reception of the encoding data transmitted in FIG. 35.

FIG. 37 is an explanatory diagram of the decoding process by the reception decoding unit 38 in FIG. 2. In FIG. 37, as a decoding process, while the reception packets are being received, an upper triangle forming process 78-1 and a unit matrix forming process 78-2 are executed to the portion of K. According to the unit matrix forming process 78-2, with respect to the portion of K in the matrix layout obtained by the upper triangle forming process, bit 1 is arranged in the diagonal direction and all other elements are set to 0. However, in the unit matrix forming process 78-2 associated with the reception of the reception packets, the process is executed in the direction corresponding to the packet receiving order. Therefore, a unit matrix forming process in which all positions of the lower left width are set to 0 to the layout of the bit positions serving as a unit matrix is executed.

After completion of the unit matrix forming process 78-2, unit matrix conversion 80 is executed in the opposite direction. That is, with respect to the portion of the data train K in the matrix layout, the unit matrix forming process in the opposite direction in which all elements of the right oblique upper half are set to 0 is executed. In the unit matrix forming process 78-2 and the unit matrix forming process 80 in the opposite direction, to the unit matrix forming positions serving as bit positions in a target row with respect to each of data trains $K_0$ to $K_3$ in each position, an exclusive OR calculation associated with the exchange with the columns locating on the lower side is executed so that the bits before those positions are set to 0. In association with the exchange and the exclusive OR calculation in the portion of the data train K, the exchange and the exclusive OR calculation are also similarly executed with respect to the subsequent portions of the solutions P. When the unit matrix forming process is completed as mentioned above, a data extracting process 82 is executed. Since the reconstructed data bits already exist in the portions of P by the unit matrix forming process, the extracting process in which merely by solving the equations, data D[0] and D[1] are extracted is executed in the data extracting process 82.

Figure 38:
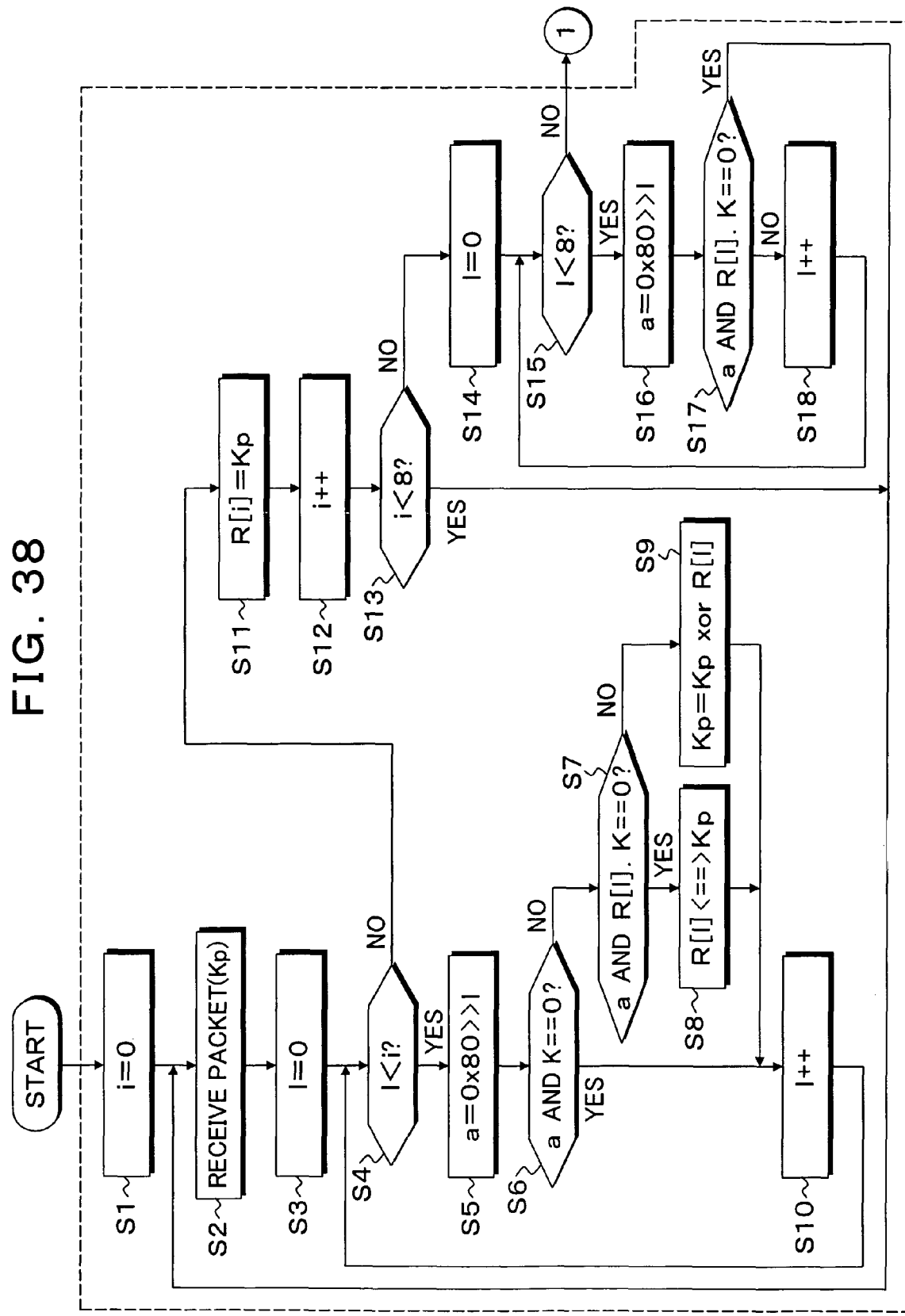
FIG. 38 is a flowchart for a triangle forming process and a unit matrix forming process based on the reception packet in FIG. 37.
Figure 39:
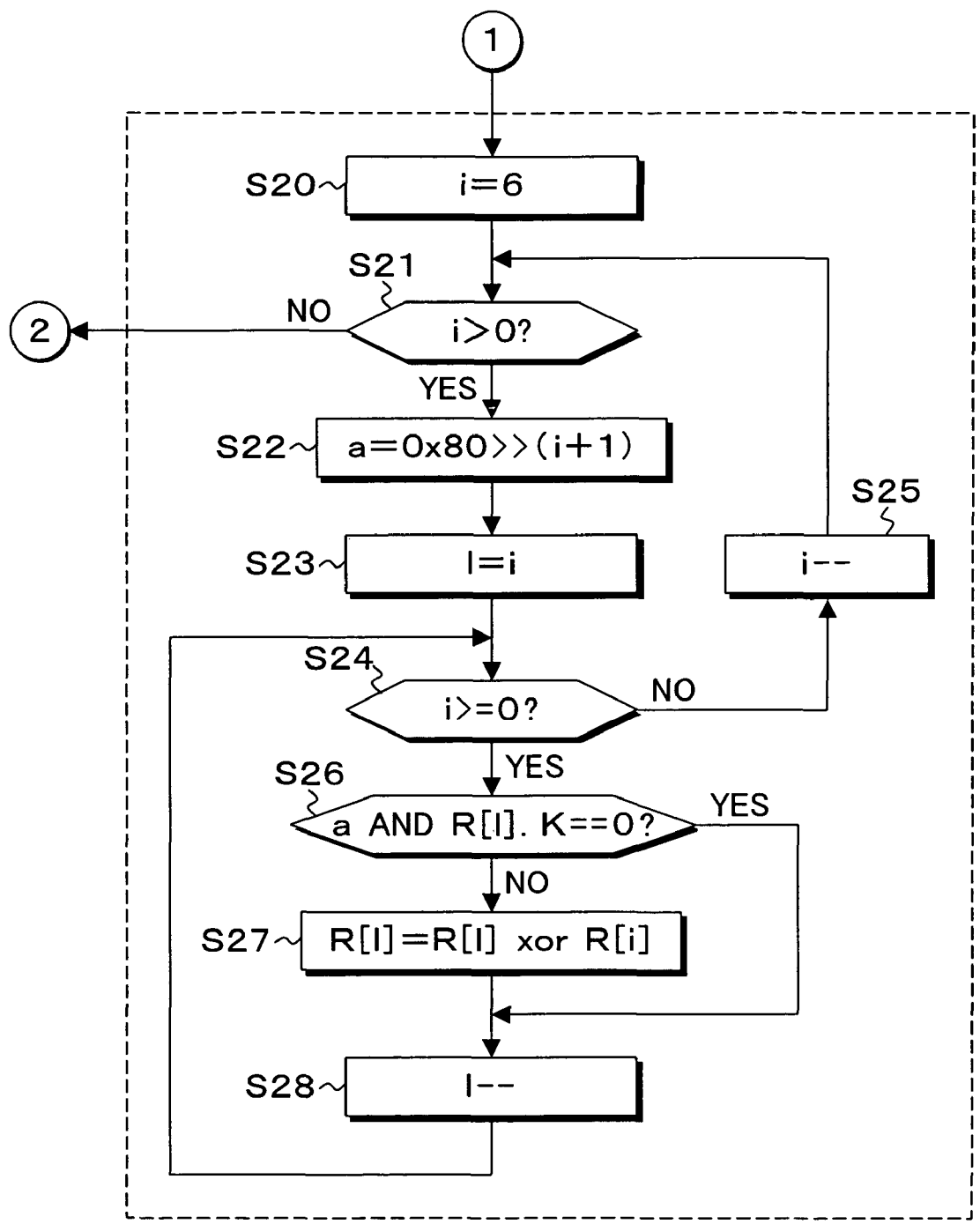
FIG. 39 is a flowchart for a reverse direction unit matrix forming process in FIG. 37.
Figure 40:
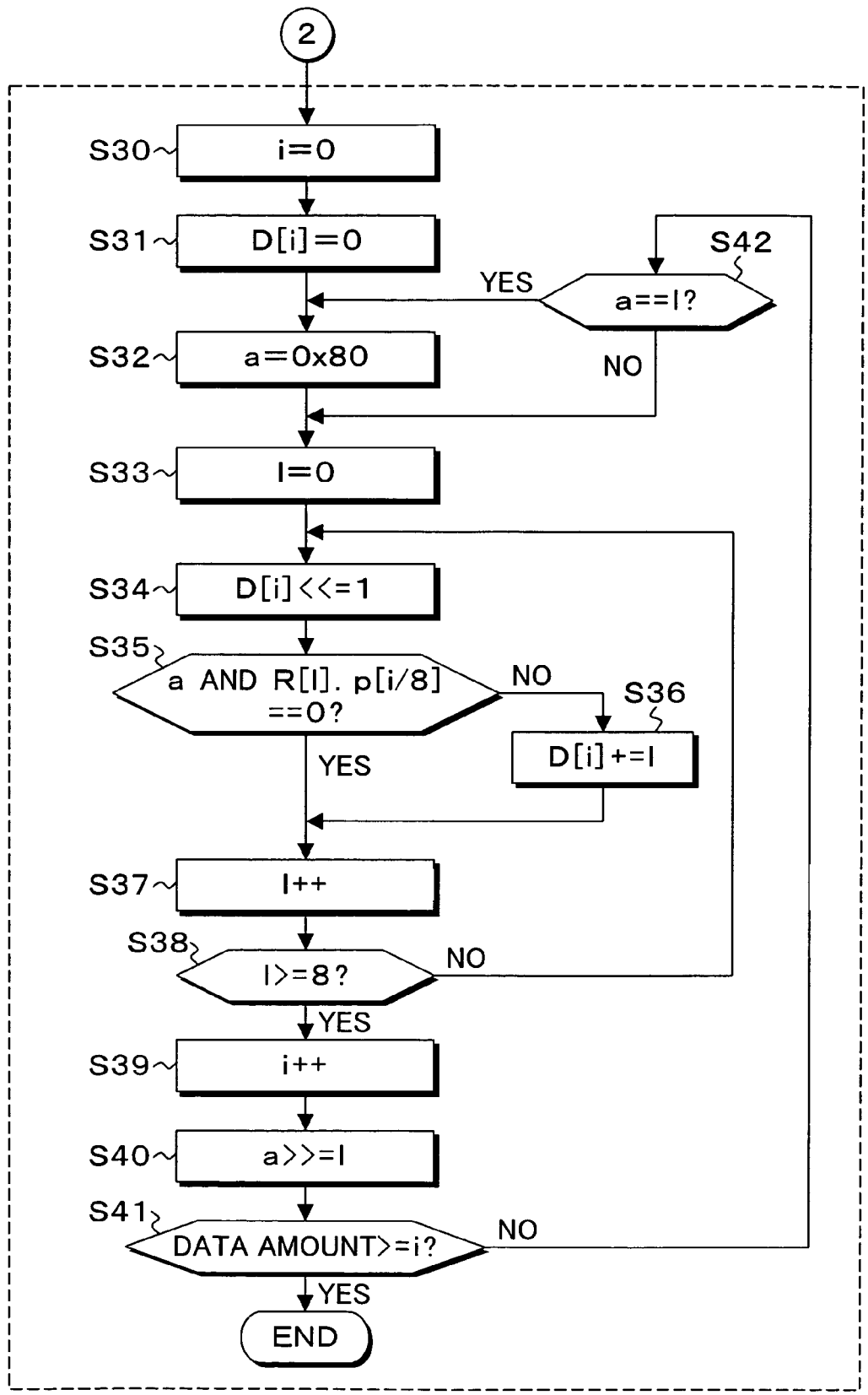
FIG. 40 is a flowchart for a data extracting process in FIG. 37.

FIGS. 38, 39, and 40 are flowcharts for a reception decoding process of the invention. The decoding in the invention is divided into three processes: a process for obtaining an upper triangle matrix of the data train K while receiving the packets in FIG. 38; a process for obtaining a unit matrix of X in FIG. 39; and a process for obtaining decoding data in FIG. 40.

FIG. 41 shows a data structure of reception data R[n] which is obtained on the reception side of the packets Kp. Reception data R[0] to R[3] of four packets are received at present. In the diagram, x denotes that either 1 or 0 can be set. Eight reception data R[n] in which the packets Kp are inserted as mentioned above are prepared.

In the process in the flowchart of FIG. 38, it is executed in such a manner that while the packets are being received, the portions of K of each reception data becomes an upper triangle matrix as much as possible, that is, as shown in FIG. 41, the 7th bit of K of R[0] is equal to 1, the 7th bit of K of R[1] is equal to 0 and the 6th bit is equal to 1, and the 7th and 6th bits of K of R[2] are equal to 0 and the 5th bit is equal to 0.

An outline of this process is shown in FIG. 42. FIG. 42 shows the state where after the reception data R[0] to R[3] by the 0th to 3rd packets are received, the reception data R[5] by the 5th packet is newly received.

First, as shown in FIG. 42A, in the reception data R[0] to R[3] which were received in the past, when the bit to be equal to 1 is equal to 0 and the relevant bit of the new reception data R[4] is equal to 1, both of them are exchanged. That is, in the reception data R[0] to R[3] which were received in the past, when the 6th bit to be equal to 1 in the reception data R[1] is equal to 0 and the 6th bit of the new reception data R[4] is equal to 1, both of them are exchanged. As shown in FIG. 42B, when the bits to be equal to 0 in the new reception data R[4] are equal to 1, that is, since the packet is the 5th packet, when the 7th to 4th bits are equal to 1, the exclusive OR (XOR) with the packet in which they are equal to 1, for example, the reception data R[0] in which the 7th bit is equal to 1 is calculated, and 1 is deleted as shown in reception data R'[4]. By such a process, a data train in which K becomes the upper triangle matrix as shown in FIG. 43 is finally formed. The process in the flowchart of FIG. 38 will now be described as follows.

(1) After the variable "i" in which the number of data which has already been received is held is initialized in step S1 just after the start of the process, the reception packets Kp are received. It is assumed here that 55 5a 5a have been received.

(2) After "l" is set to 0 in step S3, step S4 follows. Since "l" is also equal to l=0 at present, the condition is not satisfied. The processing routine advances to step S11.

(3) Since the processing routine advances to steps S11 and S12, the reception packets are substituted into the reception data R[0] and "i" is set to i=1. Since "i" is less than 8 in step S13, the processing routine is returned to step S2. The present data is as shown in FIG. 44.

(4) Subsequently, it is assumed that aa 33 cc have been received in step S2. Since l=0 is smaller than i=1 in step S4, the processing routine advances to step S5.

(5) In step S5, "a" is equal to 80 as a hexadecimal number (10000000 as a binary number). On the other hand, since K is equal to aa as a hexadecimal number and is equal to 10101010 as a binary number, a result of the calculation (a and K) in step S6 becomes 10000000 and is not equal to 0. Therefore, the processing routine advances to step S7.

(6) Since the reception data R[0] is equal to 55 5a 5a at the present stage and the element R[0].K of K in the reception data R[0] is equal to 55, a result of the calculation (a and R[1].K) in step S7 becomes 0. Thus, the processing routine advances to step S8 and the reception data R[0] and the new reception data R[1] are exchanged.

(7) Since "l" is set to l=1 in step S10 and the condition is not satisfied in step S4, the processing routine advances to steps S11 and S13. The present data becomes as shown in FIG. 45.

(8) Subsequently, it is assumed that 89 55 aa have been received in step S2. Since the condition in step S4 is satisfied, step S5 follows.

(9) Since l=0 at the present stage, "a" in step S5 becomes 80.

(10) Since K of the reception packets is equal to 89, step S7 follows. Since "l" is equal to 0 and R[0] is equal to aa at present, step S9 follows.

(11) In an arithmetic operation of step S9, since the reception packets Kp are equal to 89 55 aa and the reception data R[0] is equal to aa 33 cc, the new reception packets Kp become 23 66 66 in which the 7th bit has been deleted.

(12) Subsequently, the processing routine advances to steps S10 and S4 and "a" becomes 40. Since K is equal to 23 at present, a result of the arithmetic operation of step S6 is equal to 0. The processing routine advances to steps S10, S4, S11, and S13 and a data structure as shown in FIG. 46 is obtained.

(13) It is assumed that by repeating such a loop, the data is as shown in FIG. 47 at present and new packets 56 3c 3c have reached in step S2. "i" is equal to 7 at present.

(14) By repeating the loop of steps S3 to S10, Kp becomes 00 00 00 at the stage where the processing routine advances to step S12. The processing routine advances to step S14 while a data structure as shown in FIG. 48 is held.

(15) Whether or not K is an upper triangle matrix is discriminated in step S14 and subsequent steps. That is, the processing steps are looped while shifting "a" from 10000000 to 00000001 one by one in step S16. Whether or not the relevant bit is equal to 1 is discriminated in step S17. It is guaranteed by the preprocess that all bits on the left side of the relevant bit are equal to 0. In the present example, since the relevant 0th bit in R[7] is not equal to 1, the processing routine is returned to step S2.

(16) When K becomes the perfect upper triangle matrix as mentioned above, the processing routine can advance to the flowchart of FIG. 38. At this time, the data becomes as shown in FIG. 49.

Figures 50A, 50B:
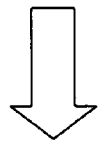
FIGS. 50A-50B are explanatory diagrams of fundamental processing contents of a unit matrix according to FIG. 39.

In the flowchart of FIG. 39, a unit matrix forming process-to convert the upper triangle matrix obtained in FIG. 38 into a unit matrix is executed. In this unit matrix forming process, if the bit which should inherently be equal to 0 with respect to a certain element is equal to 1, the exclusive OR of such an element and another element to be equal to 1 is calculated and 1 is deleted. For example, if the 2nd bit which should inherently be equal to 0 is equal to 1 like an element R[3] in FIG. 50A, the exclusive OR of such an element and an element R[6] to be equal to 1 is calculated and 1 is deleted as shown in FIG. 50B. The unit matrix forming process in FIG. 39 will now be described.

(1) In step S20, "i" is set to i=6 in order to process upwardly from the bottom. Since "i" is equal to or larger than 0, the processing routine advances to step S22 through step S21. It is assumed that the present data is as shown in FIG. 51.

(2) Since i+1=7 in step S22, "a" is equal to 01 as a hexadecimal number and is equal to 00000001 as a binary number.

(3) Since "l" is also equal to l=6 in step S23 and larger than 0, the processing routine advances to step S26 through step S24.

(4) Since R[6].K is equal to 03 at present and "a" is equal to 1, the AND in step S26 is not equal to 0, so that step S27 follows.

(5) R[6] is equal to 02 33 33 by the arithmetic operation of the exclusive OR of step S27.

(6) In step S28, 1 is subtracted from "l", so that l=5. The processing routine is returned to step S24. Since the processing routine advances through steps S26 and S27, R[5] also changes to 04 0f f0.

(7) By repeating the loop of steps S24 to S28, "l" is equal to −1. When the processing routine advances to step S25, the 0th bits of K of all of R[0] to R[6] are equal to 0 and the data becomes as shown in FIG. 52.

(8) In step S25, "l" is equal to 5. In step S22, "a" is equal to 02.

(9) Similarly, if the 1st bits of the X elements of R[0] to R[5] are equal to 1 in the loop of steps S24 to S28, specifically speaking, the exclusive OR between it and R[0], R[2], R[3], and R[6] is calculated and the relevant bit is set to 0. Actually, the data becomes as shown in FIG. 53.

(10) When "i" is equal to 0 by repeating such arithmetic operations, the data in which K is a unit matrix as shown in FIG. 54 is obtained.

Figure 56:
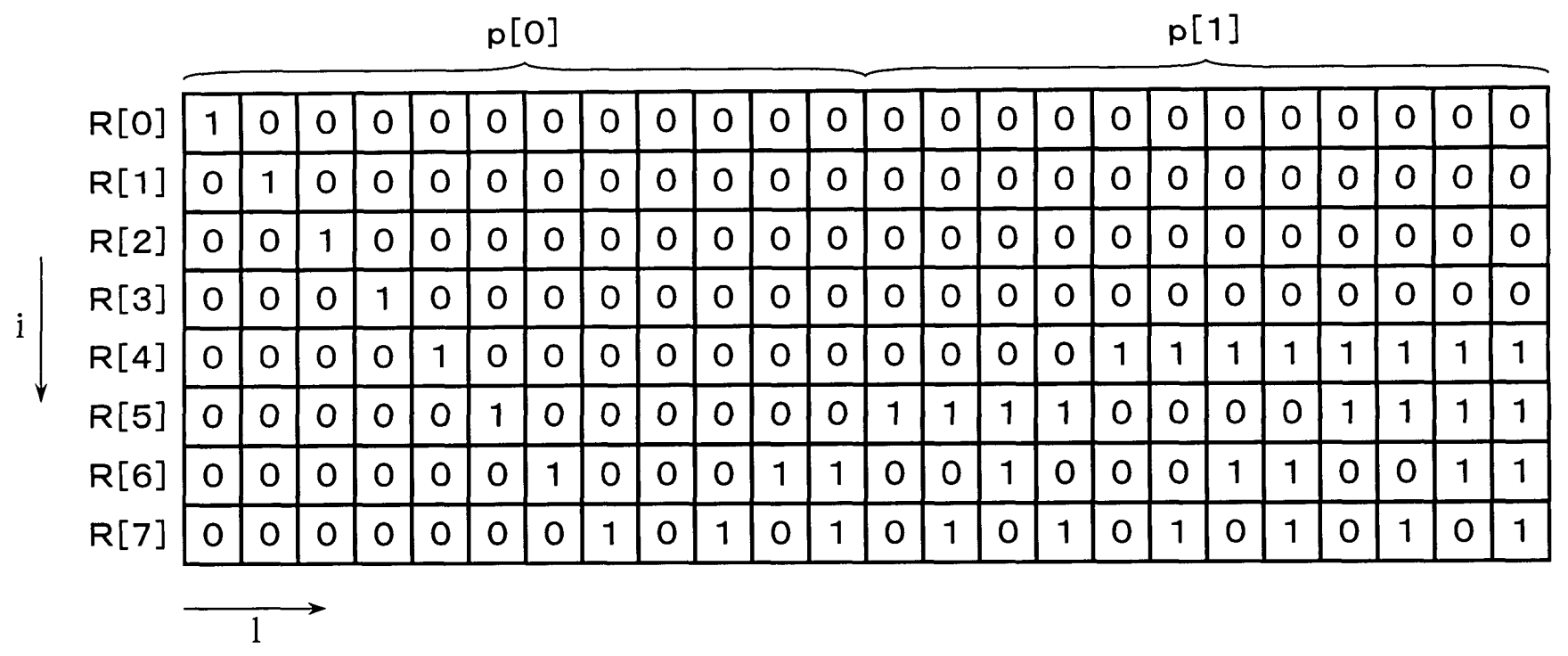

In the flowchart of FIG. 40, the data is reconstructed by rearranging the elements of p converted at the stage of obtaining the unit matrix of K in FIG. 39. It is now assumed that the present data is as shown in FIG. 55 by the unit matrix forming process in FIG. 39. The portion of p is expressed by binary numbers as shown in FIG. 56. Processes in FIG. 40 will now be described with respect to the elements p in FIG. 56 as an example.

(1) In step S30, "i" is initialized. In step S31, D[0] is also initialized. The reason why it is initialized in step S31 is to advance to step S37 without executing anything when a condition of step S35 is satisfied. If the relevant bit is cleared on the contrary to step S36, this process is unnecessary.

(2) In step S32, "a" is set to 80. "l" is set to l=0 in step S33.

(3) An arithmetic operation "<<=1" shown in step S34 denotes that the bit is shifted to the left by one. Since D[0] is equal to 0 at present, even if the bit is shifted, its value is held to 0.

(4) In step S35, since "i" is equal to or less than 7, i/8 is equal to 0. Therefore, whether or not the 7th bit of P[0] of R[0] is equal to 1 is discriminated. Since its value is equal to 0, step S37 follows.

(5) In step S37, 1 is added to "l". In step S38, whether or not "l" is equal to or less than 7 is discriminated. Since "l" is equal to 1 at present, the processing routine is returned to step S34.

(6) As mentioned above, in steps S34 to S38, the 7th bits of P[0] of R[0] to R[7] are discriminated. In the present data, since all of the 7th bits of P[0] are equal to 0, the processing routine advances to step S39 without passing through step S36 at all. That is, D[0] is held to 0 set in step S31.

(7) In step S39, "i" is equal to 1. In step S40, "a" is shifted to the right by one and equal to 40. The processing routine is returned to step S33 and enters a loop to check the 6th bit of P[0].

(8) In this loop (i=1), since the 6th bit of P[0] of R[7] is equal to 1 at the stage where "l" is equal to 7, "l" is substituted into D[1].

(9) Further, in the next loop (i=2), since the 5th bit of P[0] of R[6] is equal to 1 at the stage where "l" is equal to l=6, 1 is substituted into D[2].

(10) In this loop, since 1 is added to "l", "l" is equal to 7 in step S37. Since the condition of step S38 is not satisfied, the processing routine is returned to step S34. In step S34, D[2] is shifted to the left, it is equal to 2 and the processing routine advances to steps S35, S37, S38, and S39 (however, when l=7, the processing routine does not pass through step S36) and further advances to steps S41, S42, and S33.

(11) When "i" is equal to 8 by repeating a loop as mentioned above, "a" is equal to 1. Therefore, the processing routine advances to step S32 and after "a" is equal to 80, the processing routine advances to a next loop.

(12) In the next loop (i=8 to 15), since i/8 is equal to 1 in step S35, 1 and 0 of the respective bits of the P[1] elements of R[0] to R[7] are discriminated.

(13) At the stage where the finishing condition is satisfied in step S41 by repeating such a loop, the data of 00 01 02 03 04 05 06 07 08 09 0a 0b 0c 0d 0e 0f is reconstructed for D[0], D[1], and D[2].

The creation of the data train K which is used in the data transfer method of the invention will now be described. Several methods of forming the data train K are considered. The simplest method is a method whereby numbers 1 to $2^m-1$ are formed by using random numbers and used for the data train K.

However, in the creation of the data train K by the random numbers, there is a possibility that even if m packets are received on the reception side, a unit matrix cannot be formed. Therefore, a method whereby $K=2^n$ (where, n is the number of the transmission packet) are sent with respect to the first m packets is considered. In this case, when all of the packets are received without extinction, the original data can be soon reconstructed. Since the number of bits of 1 in the data train K is small, the unit matrix can be easily formed and the equations can be solved at a high speed. Although the packets of the number exceeding m are further sent in consideration of the packet extinction, it is sufficient to use the random numbers as already described above with respect to the data train K after the (m+1)th packet. In this case, numerical values which can be converted into a unit matrix is used with respect to the first one of the random numbers. For example, when m=8, "11111111" is used for the (m+1)th packet
"01010101" is used for the (m+2)th packet
"10101010" is used for the (m+3)th packet
"00001111" is used for the (m+4)th packet
"11110000" is used for the (m+5)th packet As another data transmitting method, a table of the same data train K or a random number forming routine and a kind of algebra are preset on the transmission side and the reception side and the packet to be transmitted is allowed to have packet information showing the nth packet in place of the data train K, thereby enabling the transfer of the data train to be unnecessary. According to the data transmitting method of the invention, data of jm bits can be sent by a bundle of one packet. In this case, if the format of the data packet of FIG. 34 is used, a size of each packet is equal to (j+m) bits. An encoding ratio in this case is equal to j/(j+m). Since there is such a limitation that a size of one packet in the ordinary IP communication is equal to 1500 bytes (=12000 bits), in the case of sending large data, there is a risk of deterioration in encoding ratio.

Figure 57:
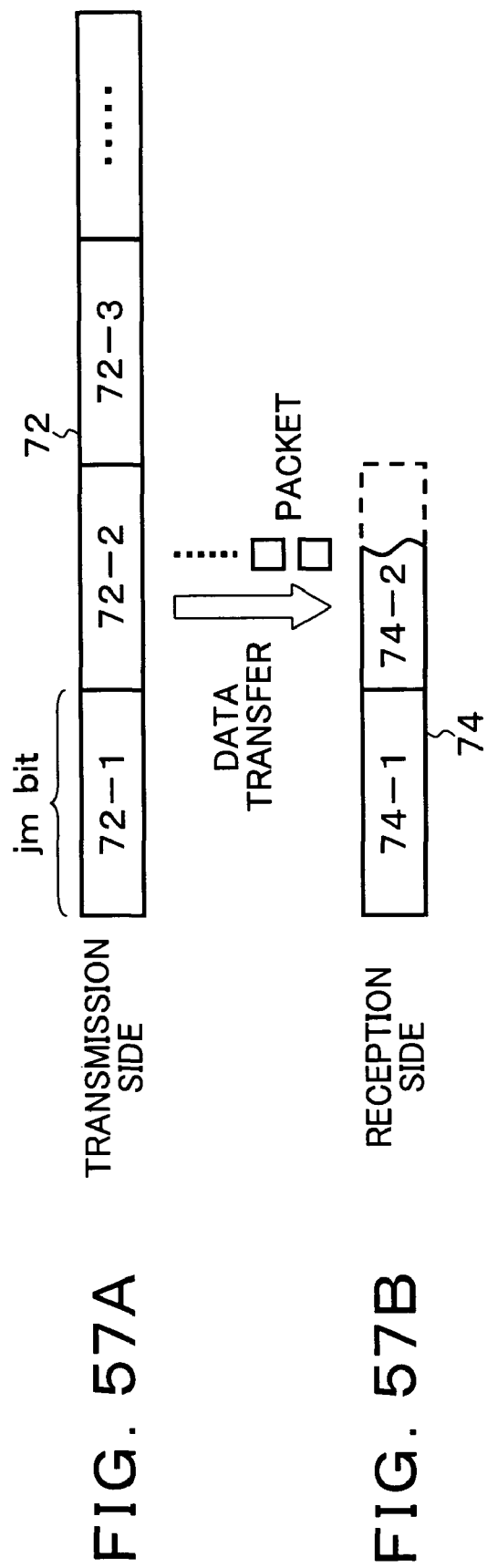
FIGS. 57A-57B are explanatory diagrams in the case where the encoding data is divided and packet-transmitted according to the invention.

In the invention, as shown in FIG. 57, there is a method whereby one large original data 72 is divided into division data 72-1, 72-2, 72-3, ... of a proper size and encoded on the transmission side. At this time, a block number q besides the data packet train K and the solutions P is added to the packet to be transferred, thereby distinguishing the block. When the data is divided and the packets are transferred as mentioned above, there is a problem about how to notify the transmission side of the end of transfer of the block data from the reception side and request the transmission side to transmit the data of the next block at a point of time when the divided data and received by the packet-transfer is decoded.

Figure 58:
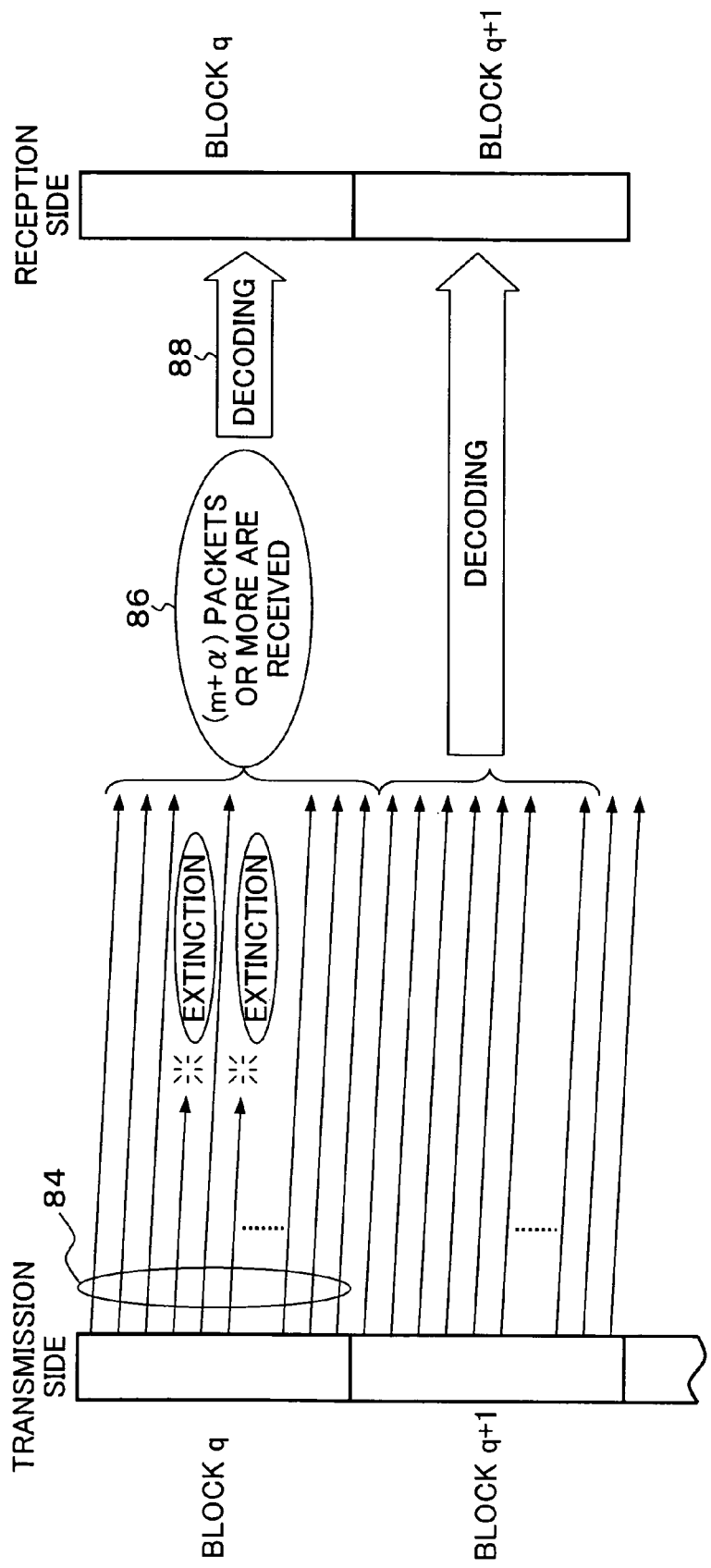
FIG. 58 is an explanatory diagram of a data transmitting method of the invention which takes a packet extinction ratio into consideration.

According to the invention, for example, a method of FIG. 58 is used to solve such a problem. In FIG. 58, the transmission side executes packet transmission 84 for transmitting α packets as many as the number which is decided in consideration of the packet extinction ratio. The reception side executes decoding 88 when there is packet reception 86 of (n+α) or more packets. When the α packets are transmitted, the transmission side shifts to the transmission of the next block. A value of α which is used for decoding on the reception side indicates a safety factor in the case where there is a possibility that if the m packets are merely received, the unit matrix cannot be obtained. Although the method of FIG. 58 is effective when the packet extinction ratio of the transmission path has already been known and its fluctuation is small, if the safety factor α is increased, a possibility that a waste increases is high. As a method of solving such a problem, therefore, there is a method whereby after the packets of all data were transmitted, the reception side notifies the transmission side of the number of the block which failed in the decoding and requests the transmission side to transmit the packets again.

Figure 59:
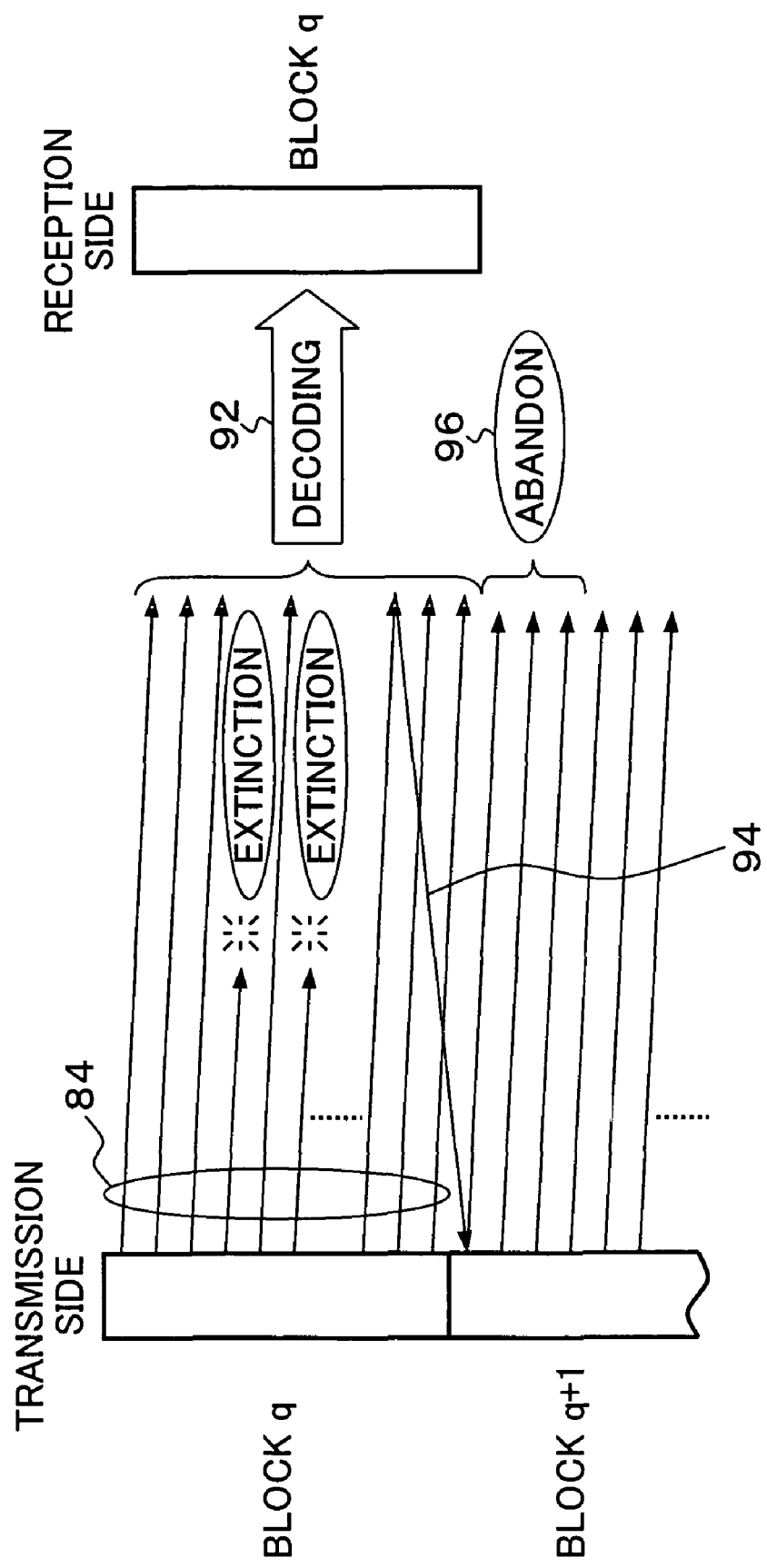
FIG. 59 is an explanatory diagram of a data transmitting method of the invention whereby a decoding completion signal is responded and transmitted every block of the encoding data.

FIG. 59 shows a method of the invention whereby the reception side sends a decoding completion signal 94 to the transmission side at the stage where decoding 92 is completed. In this case, even if the packet extinction ratio of the transmission path fluctuates, the decoding can be performed on the basis of the number of packets which were actually received and the data can be certainly sent. However, according to the method of FIG. 59, on the reception side, the wasteful packets to be abandoned (96) are transmitted for a period of time until the decoding completion signal 94 reaches after the transmission side sent the packets whose encoding is completed. An efficiency deteriorates, particularly, in a line of the large RTT.

Figure 60:
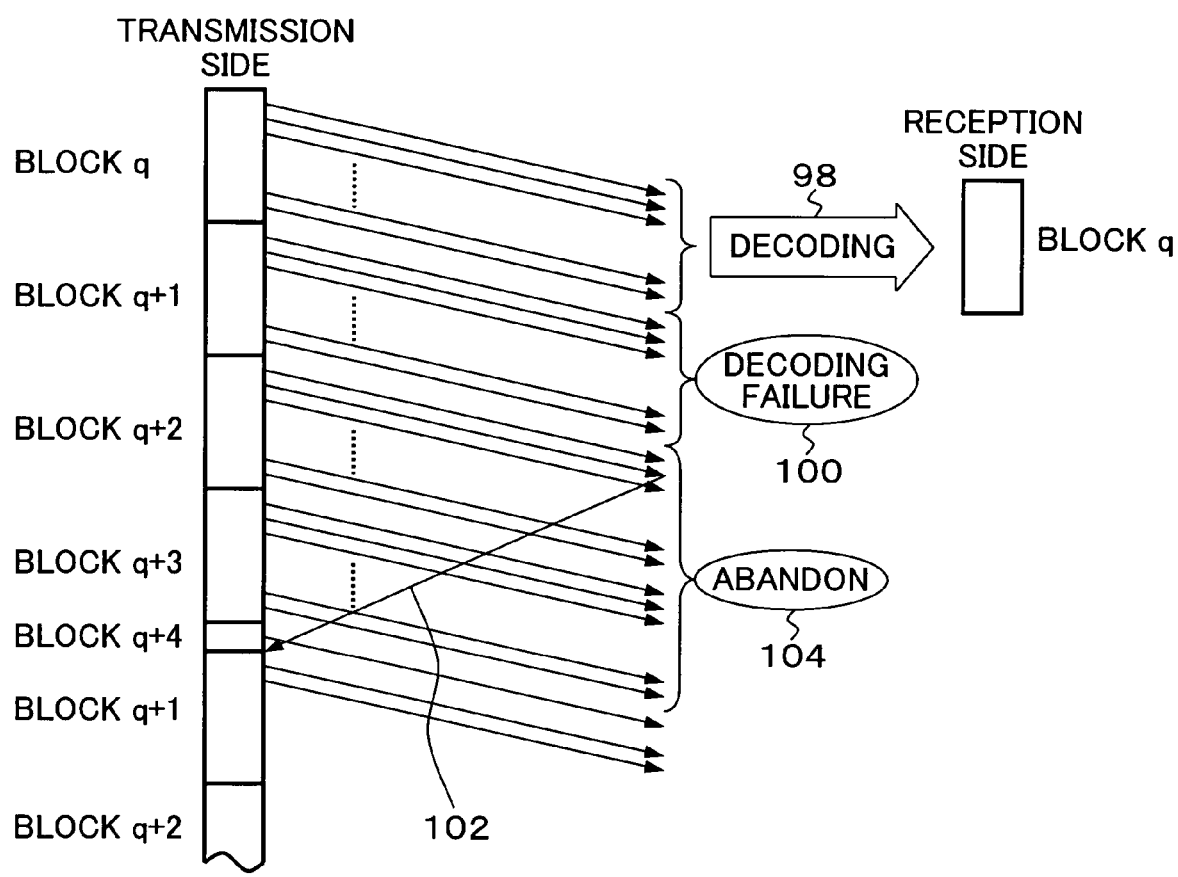
FIG. 60 is an explanatory diagram of a data transmitting method of the invention whereby a decoding failure signal is responded and transmitted and a packet is retransmitted.

FIG. 60 shows a method of the invention obtained by combining both methods of FIGS. 58 and 59. According to this method, for example, after a block q was received and decoded (98), if a decoding failure 100 occurs with respect to a next block q+1 on the reception side, a decoding failure signal 102 is transferred to the transmission side and the transmission side retransmits the data from the block which failed in transmission. However, in the method of FIG. 60, since the blocks received for a period of time until the reception side generates the decoding failure signal 102 and the transmission side retransmits the data of the failed block are abandoned (104), its efficiency is low.

Figure 61:
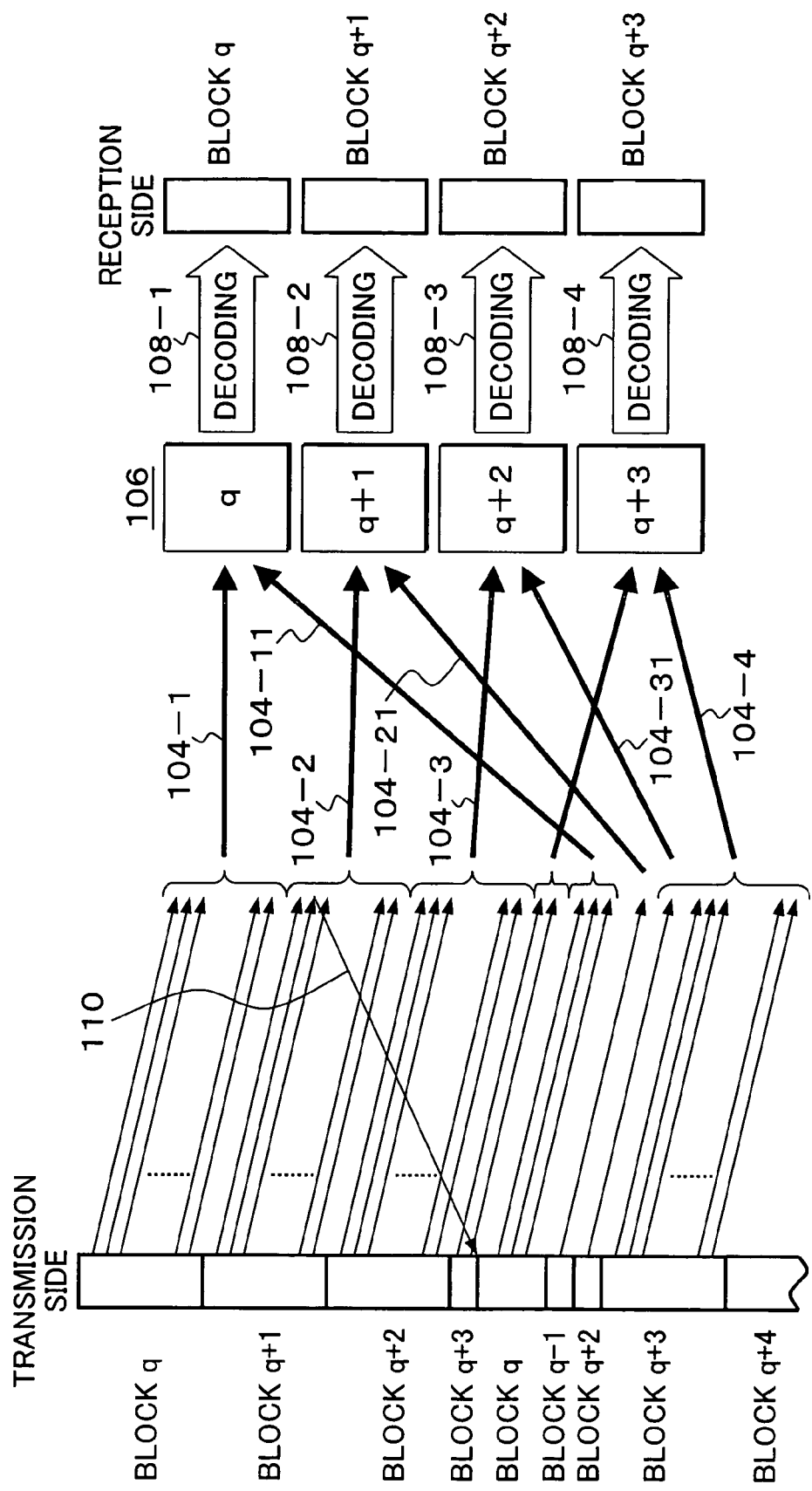
FIG. 61 is an explanatory diagram of a data transmitting method of the invention whereby the reception data is buffered and the number of retransmission packets by the response transmission of the decoding failure signal is reduced.

Such a problem can be improved by a method whereby the data is buffered by an amount corresponding to only the blocks of a proper size according to the values of RTT and n of the line as shown in the method of FIG. 61. In FIG. 61, decoding 108-1 of the block q fails and a decoding failure signal 110 is transmitted. On the transmission side, the transmission of the packets of blocks q, q+1, and q+2 is finished and the decoding failure signal 110 is received during the transmission of the packets of a block q+3. Therefore, a possibility that the packets of the blocks q+1 and q+2 of an amount enough for the decoding have already reached to the reception side is high, when the decoding failure signal 110 is received, the transmission side transmits the packets of the number smaller than the ordinary number with respect to the packet-transfer of the blocks q, q+1, and q+2. Since the packets which had been received have been stored in a buffer 106 every block, the packets of the small number which were transferred first are stored. The packets which are necessary for the decoding can be received as a whole. With respect to the block q+3 as well, since there is a possibility that the packets which had already been sent have reached the reception side, the number of packets which have already been sent is recorded on the transmission side. When the packets of the next block q+3 are transmitted, it is sufficient that the packets of the number obtained by subtracting the number of packets which have already been sent from α as a predetermined amount are transmitted and a packet 104-4 which was received by such transmission is stored into the block q+3 in the buffer 106. Further, the efficiency can be also improved by transferring only information which is necessary upon retransmission as compared with that in the case of transferring information showing that the unit matrix cannot be obtained because other information bits in the data train K do not exist in the decoding failure signal 110 from the reception side upon conversion into the unit matrix on the reception side.

Further, in FIGS. 60 and 61, for example, explanation has been made with respect to the case where the decoding of the block q fails, such a failure is determined during the reception of the packets of the block q+1, and the decoding failure signal is transferred. However, it is also possible to construct in such a manner that in the case where the packets of a predetermined amount or more are received with respect to the next high-speed block q+1 or q+2 at a point of time when the decoding of the block q is not completed, the decoding failure is determined, and the data is retransmitted by the transfer of the decoding failure signal.

Figure 62:
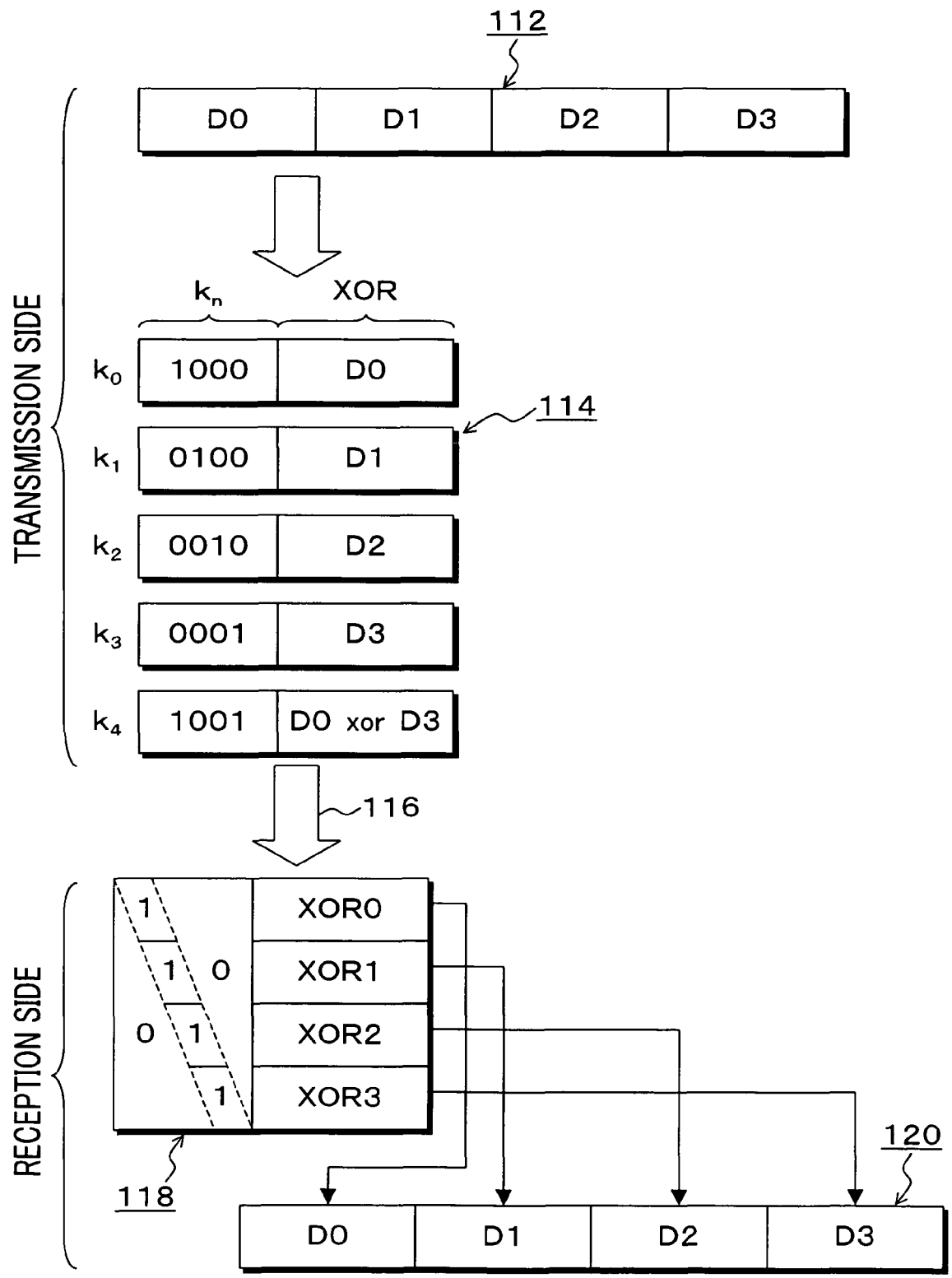
FIG. 62 is an explanatory diagram of a data transmitting method of the invention whereby the data can be corrected without using the solving method of the simultaneous equations.

FIG. 62 shows another embodiment of the data transmitting method of the invention. In this embodiment, the encoding and decoding are performed without using the solving method of the simultaneous equations. In FIG. 62, first, original data 112 is divided into data D0 to D3 of a predetermined length unit. For example, the original data 112 is 12-byte data and it is divided on a 3-byte unit basis into the division data D0 to D3 each consisting of 4 bytes. As mentioned above, with respect to the division data D0 to D3 of the original data 112, $(k_0, k_1, k_2, k_3, k_4)$ are prepared as a predetermined data train Kn. With respect to each of $(k_0$ to $k_4)$ of the data train Kn, the division data of the original data 112 corresponding to the positions of data bit 1 is extracted and the exclusive OR (XOR) is obtained. For example, in $k_0=1000$, the division data D0 corresponding to bit 1 is stored as it is. Also with respect to $k_1$, $k_2$, and $k_3$, since there is only one bit 1, the division data $D_1$, D2, and D3 each corresponding to bit 1 are fetched. In last $k_4=1001$, the two division data D0 and D3 corresponding to bit 1 are fetched and the exclusive OR (XOR) of them is obtained. The above process is encoding 114 in the embodiment. Sets of the data train Kn and the exclusive OR (XOR) by the encoding 114 are packet-transmitted (116) as packets Kp of n=0 to 4. On the reception side, assuming that one of the packets by decoding 118 was extinguished and four packets were received, a matrix layout of the data train Kn and the exclusive OR (XOR) is formed from the four reception packets, after that, the portions of the data train Kn are converted into a unit matrix, and the data of the exclusive OR (XOR) associated with the unit matrix forming process is extracted as division data D0, D1, D2, and D3 in the encoding 114.

The process for the data transmitting method of FIG. 62 can be easily executed because the simultaneous equations are not used. Specifically speaking, in the process of the encoding 114, there is no need to count 1 in the calculation of the exclusive OR of the simultaneous equations. In the decoding 118, the data extracting process 82 shown in the flowchart of FIG. 40 becomes unnecessary. The data transmitting method of the invention in the above embodiment has been described with respect to the case where the data transmission of the peer-to-peer type is executed, that is, the data transmission is executed at a high speed in a one-to-one correspondence relational manner as an example. However, the invention can be also applied to the case where the data is simultaneously transmitted to a number of partners by 1:n by using a technique such as broadcast, multicast, or the like.

In such data transmission of 1:n, the method of transmitting the response showing the decoding completion or decoding failure to the transmission side from the reception side as shown in FIGS. 59, 60, and 61 cannot be used. However, such data transmission can be realized by a method of transmitting the packets of a predetermined amount enough for the codes as shown in FIG. 58. Although the data transmitting method of the invention relates to the UDP communication as a target, a communicating function other than the standard UDP communication can be also added. For example, to further raise the reliability, it is also possible to add such a mechanism that a check sum (CRC) is added to the packet, the check sum is discriminated just after the packet is received, whether or not the packet is correct is discriminated, and when it is incorrect, this packet is abandoned.

The invention is not limited to the foregoing embodiments but incorporates proper modifications without losing the objects and advantages of the invention. The invention is not limited by the numerical values shown in the foregoing embodiments.

INDUSTRIAL APPLICABILITY

As described above, according to the invention, the data distribution of high efficiency can be realized in the peer-to-peer communication and it is possible to dynamically cope with a change in position of each peer or communication environment by the optimum distribution route, the efficient data distribution can be realized.

Since the proxy peer is provided, even if the peer is stopped due to the power-off or the like, when the peer is activated again, the updating data is received from the proxy peer and the consistency of the data in each peer can be guaranteed.

Further, by the encoding transmission and the reception decoding corresponding thereto, the data correction in the case of the packet extinction, packet exchange, or the like can be made, and the high reliability in the UDP communication which does not need any reception response can be obtained.

The invention claimed is:

1. A data distributing method of a peer-to-peer type for communicating information among a plurality of peers which are mutually connected through a network, in which each of said peers comprises:
    a group information forming step wherein when connection of a new peer is received by a group information forming unit, group information in which the new peer has been grouped is formed on the basis of comparison of distances on the network among three peers of the own peer, a representative peer of an existing group, and the new peer;
    a data transmitting step wherein when data is transmitted from the own peer by a data transmitting unit, path information in which destination information of each group which has been grouped on the basis of said group information and the own peer have been registered is formed and said destination information, said path information, and the data are transmitted as distribution information to the representative peer of each group; and
    a data relaying step wherein when distribution information is received from another peer by a data relay unit, if the own peer is included in the destination information, the received data is fetched and the own peer is deleted from the destination information, thereafter, distribution information in which the destination information of each group which has been grouped on the basis of said group information and the own peer have been registered is formed, and said destination information, said path information, and the received data are transmitted as distribution information to the representative peer of each group.

2. A data distributing method according to claim 1, wherein in said group information forming step, the representative peer whose distance from the own peer is the minimum is selected from the representative peers of the existing groups and the group information in which the new peer has been grouped is formed on the basis of the comparison of the distances among the three peers of the own peer, the representative peer of the existing group, and the new peer.

3. A data distributing method according to claim 2, wherein in said group information forming step, as distances among the three peers of the own peer, the representative peer of the existing group, and the new peer, when the distance between the own peer and the new peer is assumed to be a first distance $L_1$, the distance between the own peer and the representative peer is assumed to be a second distance $L_2$, and the distance between the representative peer and the new peer is assumed to be a third distance $L_3$, if there is a first distance relation $$L_1 > L_2 > L_3$$

among the three peers, the new peer is made to belong to the group of the representative peer and the representative peer is maintained as it is, if there is a second distance relation $$L_2 > L_1 > L_3$$

among the three peers, the new peer is made to belong to the group of the representative peer and the representative peer is changed to the new peer, and if there is a distance relation other than said first and second distance relations, a new group is formed with respect to the new peer and this new peer is set to the representative peer.

4. A data distributing method according to claim 3, wherein in said group information forming step, if a plurality of representative peers exist, the representative peer whose distance from the own peer is the minimum is selected from said plurality of representative peers and the grouping process of the new peer based on the comparison of the distances among the three peers of the own peer, the representative peer, and the new peer is executed.

5. A computer-readable storage medium storing a program for allowing a computer constructing a peer for communicating information with other peers which are mutually connected through a network to execute:
    a group information forming step wherein when connection of a new peer is received by a group information forming unit, group information in which the new peer has been grouped is formed on the basis of comparison of distances on the network among three peers of the own peer, a representative peer of an existing group, and the new peer;
    a data transmitting step wherein when data is transmitted from the own peer by a data transmitting unit, path information in which destination information of each group which has been grouped on the basis of said group information and the own peer have been registered is formed and said destination information, said path information, and the data are transmitted as distribution information to the representative peer of each group; and
    a data relaying step wherein when distribution information is received from another peer by a data relay unit, if the own peer is included in the destination information, the received data is fetched and the own peer is deleted from the destination information, thereafter, distribution information in which the destination information of each group which has been grouped on the basis of said group information and the own peer have been registered is formed, and said destination information, said path information, and the received data are transmitted as distribution information to the representative peer of each group.

6. A computer readable storage medium according to claim 5, wherein in said group information forming step, the representative peer whose distance from the own peer is the minimum is selected from the representative peers of the existing groups and the group information in which the new peer has been grouped is formed on the basis of the comparison of the distances among the three peers of the own peer, the representative peer of the existing group, and the new peer.

7. A computer readable storage medium according to claim 6, wherein in said group information forming step,
as distances among the three peers of the own peer, the representative peer of the existing group, and the new peer, when the distance between the own peer and the new peer is assumed to be a first distance $L_1$, the distance between the own peer and the representative peer is assumed to be a second distance $L_2$, and the distance between the representative peer and the new peer is assumed to be a third distance $L_3$,
if there is a first distance relation $L_1 > L_2 > L_3$ among the three peers, the new peer is made to belong to the group of the representative peer and the representative peer is maintained as it is,
if there is a second distance relation $L_2 > L_1 > L_3$ among the three peers, the new peer is made to belong to the group of the representative peer and the representative peer is changed to the new peer, and
if there is a distance relation other than said first and second distance relations, a new group is formed with respect to the new peer and this peer is set to the representative peer.

8. A computer readable storage medium according to claim 7, wherein in said group information forming step, if a plurality of representative peers exist, the representative peer whose distance from the own peer is the minimum is selected from said plurality of representative peers and the grouping process of the new peer based on the comparison of the distances among the three peers of the own peer, the representative peer, and the new peer is executed.

9. A peer for communicating information with other peers which are mutually connected through a network, comprising:
a group information forming unit which, when connection of a new peer is received, forms group information in which the new peer has been grouped on the basis of comparison of distances on the network among three peers of the own peer, a representative peer of an existing group, and the new peer;
a data transmitting unit which, when data is transmitted from the own peer, forms path information in which destination information of each group which has been grouped on the basis of said group information and the own peer have been registered and transmits said destination information, said path information, and the data as distribution information to the representative peer of each group; and
a data relay unit which, when distribution information is received from another peer, if the own peer is included in the destination information, fetches the received data and deletes the own peer from the destination information, thereafter, forms distribution information in which the destination information of each group which has been grouped on the basis of said group information and the own peer have been registered, and transmits said destination information, said path information, and the received data as distribution information to the representative peer of each group.

10. A data distribution system comprising:
a plurality of peers mutually connected through a network, each peer of the plurality of peers requesting, as a requesting source peer, at least two proxy peers of the plurality of peers, wherein while a respective requesting source peer is not operating, a respective proxy peer of the at least two proxy peers requested by the respective requesting source peer stores updating data distributed to the respective requesting source peer and, after the respective requesting source peer starts operating, the respective proxy peer transfers the stored updating data to the respective requesting source peer, and
when the respective proxy peer is stopped while the updating data is being distributed to the respective requesting source peer, residual updating data is stored by different proxy peer of the at least two proxy peers requested by the respective requesting source peer.

11. A data distribution system according to claim 10, wherein the respective proxy peer shares the data with the respective requesting source peer, updates the shared data by the updating data distributed to the respective requesting source peer while the respective requesting source peer is not operating, and overwrites the updated shared data into the shared data of the respective requesting source peer when the respective requesting source peer starts operating.

12. A data distribution system according to claim 10, wherein
in a case where a group is formed by a plurality of peers and distribution information received by a representative peer of the group is distributed to other peers in the group, a proxy peer is set as said representative peer, and
while one or more of peers in the group are not operating, updating data distributed to said one or more of peers in the group which are not operating is stored, and the stored updating data is transferred when said one or more of peers in the group operate.

13. A data transmitting method of packet-transmitting data, comprising:
an encoding transmitting step wherein, by an encoding transmitting unit, solutions are obtained by substituting original data into simultaneous equations of a Boolean algebra together with a predetermined data train and sets of said data train and said solutions are packet-transmitted as encoding data; and
a reception decoding step wherein, by a reception decoding unit, the original data is decoded by substituting said data train and said solutions obtained from a received encoding data into said simultaneous equations.

14. A data transmitting method according to claim 13, wherein
in said encoding transmitting step,
in the case where the transferring source data is assumed to be data $(b_0, b_1, b_2, b_3, \ldots, b_{m-1})$ of m bits, by substituting a data train $K=(K_{n0}, k_{n1}, k_{n2}, \ldots, k_{nm-1})$ of n series of m bits into the simultaneous equations of the Boolean algebra $b_0 k_{n0} + b_1 k_{n2} + \ldots + b_{m-1} k_{nm-1} = P_n$ n solutions $P_n=(p_0, p_1, p_2, p_3, \ldots, p_{n-1})$ are obtained, and the encoding data comprising sets of said data train K and said solutions $P_n$ is packet-transferred, and
in said reception decoding step, the data of mm bits serving as said transferring source data is decoded by substituting said data train K and said solutions $P_n$ obtained from said received encoding data into said simultaneous equations.

15. A data transmitting method according to claim 14, wherein said the reception decoding step comprises the steps of:

forming a matrix data layout of the data train and the solutions $P_n$ in which the portion of the data train K obtained from the received encoding data becomes an upper triangle;

converting the portion of the data train K of said matrix data layout into a unit matrix; and reconstructing the transferring source data from data positions of the solutions $P_n$ in which the data train K has been converted into the unit matrix.

16. A data transmitting method according to claim 14, wherein the series number (n) of said data train K is set to a value which is equal to or larger than said number (m) of bits.

17. A data transmitting method according to claim 14, wherein the series number (n) of said data train is equal to the number (m+α) obtained by adding a value α based on a packet extinction ratio of a transmission path to said number (m) of bits.

18. A data transmitting method according to claim 14, wherein said data train K which is used to form the encoding data to be transferred by n packets is set to a specific numerical value train which can be easily converted into a unit matrix on a reception side with respect to a predetermined number of packets from the first packet.

19. A data transmitting method according to claim 14, wherein a numerical value train of the data train K is determined on the basis of a predetermined table or a predetermined equation and said table or said equation is shared by a transmission side and a reception side, thereby making the packet transfer of said data train K unnecessary.

20. A data transmitting method according to claim 14, wherein in said encoding transmitting step, the encoding data of one block is divided into a plurality of packets and transferred, and in said reception decoding step, when the packets of one block are received and the decoding of the original data is completed, a decoding success signal is transmitted to a transmission side, and when the decoding fails, a decoding failure signal is transmitted and the data is transmitted again.

21. A data transmitting method according to claim 20, wherein a buffer is provided for said reception side, the packet data is held in said buffer, thereafter, the decoding is executed, and when the decoding fails, the packet data which was received until the retransmission is started is stored in said buffer, thereby reducing the number of packets of the block to be retransmitted.

22. A data transmitting method of packet-transmitting data, comprising:

a transmitting step wherein, by an encoding transmitting unit, transferring source data is divided into m division data $(D_0, D_1, D_2, \ldots, D_{m-1})$, the division data corresponding to a position of bit 1 of a data train $K=(k_{n0}, k_{n1}, k_{n2}, \ldots, k_{nm-1})$ of n series of m bits is selected, exclusive OR data is obtained, and encoding data comprising sets of said data train K and said exclusive OR data is packet-transferred; and a receiving step wherein, by a reception decoding unit, the data train K and the exclusive OR obtained from said received encoding data are arranged in a matrix shape, thereafter, the portion of said data train K is converted into a unit matrix, and the exclusive OR after said unit matrix was formed is decoded as said division data.

23. A computer-readable storage medium storing a program which allows a computer to execute:

an encoding transmitting step wherein, by an encoding transmitting unit, solutions are obtained by substituting original data into simultaneous equations of a Boolean algebra together with predetermined constant data and sets of said constant data and said solutions are packet-transmitted as encoding data; and a reception decoding step wherein, by a reception decoding unit, the original data is decoded by substituting said constant data and said solutions obtained from the received encoding data into said simultaneous equations.

24. A computer readable storage medium according to claim 23, wherein in said an encoding transmitting step, in the case where the transferring source data is assumed to be data $(b_0, b_2, b_3, \ldots, b_{m-1})$ of m bits, by substituting a data train $K=(k_{n0}, k_{n1}, k_{n2}, \ldots, k_{nm-1})$ of n series of m bits into the simultaneous equations of the Boolean algebra $$b_0 k_{n0} + b_1 k_{n2} + \ldots + b_{m-1} k_{nm-1} = P_n$$

n solutions $P_n = (p_0, p_1, p_2, \ldots, p_{n-1})$ are obtained, and the encoding data comprising sets of said data train K and said solutions $P_n$ are packet-transferred, and in said reception decoding step, the data of m bits serving as said transferring source data is decoded by substituting said data train K and said solutions $P_n$ obtained from said received encoding data into said simultaneous equations.

25. A computer readable storage medium according to claim 24, wherein said reception decoding step comprises the steps of:

forming a matrix data layout in which said data train K obtained from the received encoding data becomes an upper triangle;

converting the portion of the data train K of said matrix data layout into a unit matrix; and reconstructing the transferring source data from data positions of said solutions $P_n$ in which the data train K has been converted into the unit matrix.

26. A computer readable storage medium according to claim 24, wherein the series number (n) of said data train K is set to a value which is equal to or larger than said number (m) of bits.

27. A computer readable storage medium according to claim 24, wherein the series number (n) of said data train is equal to the number (m+α) obtained by adding a value α based on a packet extinction ratio of a transmission path to said number (m) of bits.

28. A computer readable storage medium according to claim 24, wherein said data train K which is used to form the encoding data to be transferred by n packets is set to a specific numerical value train which can be easily converted into a unit matrix on a reception side with respect to a predetermined number of packets from the first packet.

29. A computer readable storage medium according to claim 24, wherein a numerical value train of the data train K is determined on the basis of a predetermined table or a predetermined equation and said table or said equation is shared by a transmission side and a reception side, thereby making the packet transfer of said data train K unnecessary.

30. A computer readable storage medium according to claim 24, wherein in said encoding transmitting step, the encoding data of one block is divided into a plurality of packets and transferred, and in said reception decoding step, when the packets of one block are received and the decoding of the original data is completed, a decoding success signal is transmitted to a transmission side, and when the decoding fails, a decoding failure signal is transmitted and the data is transmitted again.

31. A computer readable storage medium according to claim 30, wherein a buffer is provided for said reception side, the packet data is held in said buffer, thereafter, the decoding is executed, and when the decoding fails, the packet data which was received until the retransmission is started is stored in said buffer, thereby reducing the number of packets of the block to be retransmitted.

32. A computer-readable storage medium storing a program which allows a computer to execute:
  a transmitting step wherein, by an encoding transmitting unit, transferring source data is divided into m division data ($D_0, D_1, D_2, \ldots, D_{m-1}$), the division data corresponding to a position of bit 1 of a data train $K=(k_{n0}, k_{n1}, k_{n2}, \ldots, k_{nm-1})$ of n series of m bits is selected, exclusive OR data is obtained, and encoding data comprising sets of said data train K and said exclusive OR data is packet-transferred; and
  a receiving step wherein, by a reception decoding unit, the data train K and the exclusive OR data obtained from said received encoding data are arranged in a matrix shape, thereafter, the portion of said data train K is converted into a unit matrix, and the exclusive OR data after said unit matrix was formed is decoded as said division data.

* * * * *

UNITED STATES PATENT AND TRADEMARK OFFICE
CERTIFICATE OF CORRECTION

PATENT NO.      : 7,813,302 B2  
APPLICATION NO. : 11/043122  
DATED           : October 12, 2010  
INVENTOR(S)     : Yosuke Senta et al.

Page 1 of 1

It is certified that error appears in the above-identified patent and that said Letters Patent is hereby corrected as shown below:

Column 35, Line 30, change "claim 14" to --claim 14 or 22--.

Signed and Sealed this
Twentieth Day of September, 2011

David J. Kappos
*Director of the United States Patent and Trademark Office*